United States Patent
Li et al.

(10) Patent No.: US 11,848,417 B2
(45) Date of Patent: Dec. 19, 2023

(54) GEL POLYMER ELECTROLYTE INCLUDING CROSSLINKED NETWORK OF POSS AND PEG, IONIC LIQUID, AND LITHIUM SALT, LITHIUM BATTERY INCLUDING THE SAME, AND PROCESS OF PREPARING THE SAME

(71) Applicants: Xiaowei Li, Philadelphia, PA (US); Yongwei Zheng, Philadelphia, PA (US); Christopher Li, Bala Cynwyd, PA (US)

(72) Inventors: Xiaowei Li, Philadelphia, PA (US); Yongwei Zheng, Philadelphia, PA (US); Christopher Li, Bala Cynwyd, PA (US)

(73) Assignee: DREXEL UNIVERSITY, Philadelphia, PA (US)

( * ) Notice: Subject to any disclaimer, the term of this patent is extended or adjusted under 35 U.S.C. 154(b) by 65 days.

(21) Appl. No.: 17/246,681

(22) Filed: May 2, 2021

(65) Prior Publication Data

US 2022/0013807 A1  Jan. 13, 2022

Related U.S. Application Data

(60) Provisional application No. 63/018,772, filed on May 1, 2020.

(51) Int. Cl.
*H01M 10/0565* (2010.01)
*H01M 10/0525* (2010.01)
(Continued)

(52) U.S. Cl.
CPC ...... *H01M 10/0565* (2013.01); *C08G 65/336* (2013.01); *H01M 10/0525* (2013.01);
(Continued)

(58) Field of Classification Search
CPC ......... H01M 10/0565; H01M 10/0525; H01M 10/0567; H01M 10/4235; C08G 65/336
(Continued)

(56) References Cited

U.S. PATENT DOCUMENTS

2018/0226679 A1* 8/2018 Pan ................. H01M 4/364

FOREIGN PATENT DOCUMENTS

WO  2020/185631 A1  9/2020

OTHER PUBLICATIONS

Li et al., Study on properties of gel polymer electrolytes based on ionic liquid and amine-terminated butadiene-acrylonitrile copolymer chemically crosslinked by polyhedral oligomeric silsesquioxane, Jul. 2012, Journal of Applied Polymer Science, 126, 273-273 (Year: 2012).*

(Continued)

*Primary Examiner* — Sean P Cullen
(74) *Attorney, Agent, or Firm* — Mendelsohn Dunleavy, PC

(57) ABSTRACT

Ionic liquid N-methyl-N-propyl-pyrrolidinium bis(fluorosulfonyl)imide ($Pyr_{13}FSI$) was introduced into a hybrid network to obtain a series of gel polymer electrolytes (GPEs). Mechanical and electrochemical properties of the GPEs were tuned through controlling the network structure and ionic liquid contents, and ionic conductivity higher than 1 mS cm$^{-1}$ at room temperature was achieved. The newly developed GPEs are flame-retardant and show excellent thermal and electrochemical stability as well as ultra-stability with lithium metal anode. Symmetrical lithium cells with the GPEs exhibit a stable cycling over 6800 h at a current density of 0.1 mA cm$^{-2}$ and stable lithium stripping-plating at 1 mA cm$^{-2}$, the highest current density reported for ionic liquid-based GPEs. Moreover, Li/LiFePO$_4$ batteries with the obtained GPEs exhibit desirable cycling stability and rate (Continued)

performance over a wide temperature range from 0° C. to 90° C.

19 Claims, 43 Drawing Sheets
(14 of 43 Drawing Sheet(s) Filed in Color)

(51) Int. Cl.
    C08G 65/336     (2006.01)
    H01M 10/42      (2006.01)
    H01M 10/0567    (2010.01)
    H01M 4/02       (2006.01)
    C08G 77/04      (2006.01)

(52) U.S. Cl.
    CPC ... *H01M 10/0567* (2013.01); *H01M 10/4235* (2013.01); *C08G 77/045* (2013.01); *C08G 2220/00* (2013.01); *C08G 2650/20* (2013.01); *C08G 2650/50* (2013.01); *H01M 2004/027* (2013.01); *H01M 2300/0025* (2013.01); *H01M 2300/0085* (2013.01)

(58) Field of Classification Search
    USPC .................................. 429/300, 302, 303, 339
    See application file for complete search history.

(56) References Cited

OTHER PUBLICATIONS

Park et al., Polymer electrolytes integrated with ionic liquids for future electrochemical devices, Jun. 2013, Journal of Applied Polymer Science, 129, 2363-2376 (Year: 2013).*
Kim et al., Phase Behavior and Conductivity of Sulfonated Block Copolymers Containing Heterocyclic Diazole-Based Ionic Liquids, Oct. 2012, Macromolecules, 45, 8702-88713 (Year: 2012).*
Kim et al., Morphology and Conductivity in Ionic Liquid Incorporated Sulfonated Block Copolymers, Jun. 2011, 44, 5289-5298 (Year: 2011).*
Appetecchi, G. B., et al. "Ternary polymer electrolytes containing pyrrolidinium-based polymeric ionic liquids for lithium batteries." Journal of Power Sources 195.11 (2010): 3668-3675.
Armand, Michel, et al. "Ionic-liquid materials for the electrochemical challenges of the future." Nature Materials 8.8 (2009): 621-629.
Bruce, Peter G., et al. "Li—O2 and Li—S batteries with high energy storage." Nature Materials 11.1 (2012): 19-29.
Etacheri, Vinodkumar, et al. "Challenges in the development of advanced Li-ion batteries: a review." Energy & Environmental Science 4.9 (2011): 3243-3262.
Fan, Lei, et al. "Recent progress of the solid-state electrolytes for high-energy metal-based batteries." Advanced Energy Materials 8.11 (2018): 1702657 (31 pages).
Fisher, Aaron S., et al. "Solid polymer electrolytes with sulfur based ionic liquid for lithium batteries." Journal of Power Sources 196.22 (2011): 9767-9773.
Fisher, Aaron S., et al. "Anion effects on solid polymer electrolytes containing sulfur based ionic liquid for lithium batteries." Journal of the Electrochemical Society 159.5 (2012): A592-A597.
Goodenough, John B., et al. "Challenges for rechargeable Li batteries." Chemistry of Materials 22.3 (2010): 587-603.
Grande, Lorenzo, et al. "The lithium/air battery: still an emerging system or a practical reality?." Advanced materials 27.5 (2015): 784-800.
Jung, Hun-Gi, et al. "A high-rate long-life Li4Ti5O12/Li[Ni0.45Co0.1Mn1.45]O4 lithium-ion battery." Nature Communications 2.1 (2011): 516-520.

Kalhoff, Julian, et al. "Safer electrolytes for lithium-ion batteries: state of the art and perspectives." ChemSusChem 8.13 (2015): 2154-2175.
Khurana, Rachna, et al. "Suppression of lithium dendrite growth using cross-linked polyethylene/poly(ethylene oxide) electrolytes: a new approach for practical lithium-metal polymer batteries." Journal of the American Chemical Society 136.20 (2014): 7395-7402.
Kim, Guk-Tae, et al. "UV cross-linked, lithium-conducting ternary polymer electrolytes containing ionic liquids." Journal of Power Sources 195.18 (2010): 6130-6137.
Leng, Feng, et al. "Effect of temperature on the aging rate of Li ion battery operating above room temperature." Scientific Reports 5.1 (2015): 12967 (12 pages).
Li, Xiaowei, et al. "Polymerized ionic liquid-containing interpenetrating network solid polymer electrolytes for all-solid-state lithium metal batteries." ACS Applied Materials & Interfaces 11.38 (2019): 34904-34912.
Liu, S., et al. "Lithium dendrite formation in Li/Poly(ethylene oxide)-Lithium Bis(trifluoromethanesulfonyl)imide and N-Methyl-N-propylpiperidinium Bis(trifluoromethanesulfonyl)imide/Li cells." Journal of the Electrochemical Society 157.10 (2010): A1092-A1098.
Noda, Akihiro, et al. "Highly conductive polymer electrolytes prepared by in situ polymerization of vinyl monomers in room temperature molten salts." Electrochimica Acta 45.8-9 (2000): 1265-1270.
Pan, Qiwei, et al. "Hybrid electrolytes with controlled network structures for lithium metal batteries." Advanced Materials 27.39 (2015): 5995-6001.
Que, Mingming, et al. "Safe and flexible ion gel based composite electrolyte for lithium batteries." Journal of Materials Chemistry A 4.37 (2016): 14132-14140.
Raghavan, Prasanth, et al. "Electrochemical performance of electrospun poly(vinylidene fluoride-co-hexafluoropropylene)-based nanocomposite polymer electrolytes incorporating ceramic fillers and room temperature ionic liquid." Electrochimica Acta 55.4 (2010): 1347-1354.
Shin, Joon-Ho, et al. "Ionic liquids to the rescue? Overcoming the ionic conductivity limitations of polymer electrolytes." Electrochemistry Communications 5.12 (2003): 1016-1020.
Shin, Joon-Ho, et al. "PEO-based polymer electrolytes with ionic liquids and their use in lithium metal-polymer electrolyte batteries." Journal of the Electrochemical Society 152.5 (2005): A978-A983.
Shin, Joon-Ho, et al. "Solid-state Li/LiFePO4 polymer electrolyte batteries incorporating an ionic liquid cycled at 40 C." Journal of Power Sources 156.2 (2006): 560-566.
Sun, Chunwen, et al. "Recent advances in all-solid-state rechargeable lithium batteries." Nano Energy 33 (2017): 363-386.
Sutto, Thomas E. "Hydrophobic and hydrophilic interactions of ionic liquids and polymers in solid polymer gel electrolytes." Journal of the Electrochemical Society 154.10 (2007): p. 101-p. 107.
Tigelaar, Dean M., et al. "Composite electrolytes for lithium batteries: Ionic liquids in APTES cross-linked polymers." Macromolecules 40.12 (2007): 4159-4164.
Watanabe, Masayoshi, et al. "High ionic conductivity of new polymer electrolytes consisting of polypyridinium, pyridinium and aluminium chloride." Journal of the Chemical Society, Chemical Communications 11 (1993): 929-931.
Xu, Kang. "Electrolytes and interphases in Li-ion batteries and beyond." Chemical Reviews 114.23 (2014): 11503-11618.
Yan, Pengfei, et al. "Tailoring grain boundary structures and chemistry of Ni-rich layered cathodes for enhanced cycle stability of lithium-ion batteries." Nature Energy 3.7 (2018): 600-605.
Zheng, Yongwei, et al. "High-capacity all-solid-state sodium metal battery with hybrid polymer electrolytes." Advanced Energy Materials 8.27 (2018): 1801885 (9 pages).
Zu, Chen-Xi, et al. "Thermodynamic analysis on energy densities of batteries." Energy & Environmental Science 4.8 (2011): 2614-2624.

* cited by examiner

- □ P(EO)$_{20}$LiTFSI/Pyr$_{13}$TFSI @ 60°C [1]
- ○ P(EO)$_{18}$LiTFSI/PP$_{13}$TFSI @ 60°C [12]
- ◇ P(EO)$_{18}$LiTFSI/nano-silica/ PP$_{13}$TFSI @ 60°C [14]
- ◁ PDADMATFSI/P$_{111i4}$DMP/LiFSI/Al$_2$O$_3$ @ 50°C [21]
- △ P(EO)$_{20}$LiTFSI/S$_2$TFSI @ 45°C [15, 16]
- ▽ APTES cross-linked polymer/LiTFSI/Pyr$_{13}$TFSI @ 40°C [6]
- ▷ PDADMATFSI/LiTFSI/Pyr$_{14}$TFSI @ 40°C [10]
- ☆ UV cross-linked PEO/LiFSI/Pyr$_{14}$TFSI @ 40°C [11]
- ● POSS/PEG/LiFSI/Pyr$_{13}$FSI @ 20°C (THIS WORK)

GEL POLYMER ELECTROLYTE INCLUDING CROSSLINKED NETWORK OF POSS AND PEG, IONIC LIQUID, AND LITHIUM SALT, LITHIUM BATTERY INCLUDING THE SAME, AND PROCESS OF PREPARING THE SAME

CROSS REFERENCE TO RELATED APPLICATIONS

This application claims the benefit of U.S. Provisional Application No. 63/018,772, filed on May 1, 2020, the entire disclosure of which is hereby incorporated by reference as if set forth fully herein.

STATEMENT OF GOVERNMENT INTEREST

This invention was made with government support under contract nos. 1510092 and 1603520 awarded by the National Science Foundation. The Government has certain rights in the invention.

BACKGROUND OF THE INVENTION

Lithium metal batteries (LMBs) that use lithium metal as the anode are considered to be one of the most promising energy storage systems because of their high specific capacity and the extremely negative potential of lithium.[1] Combinations of lithium metal with unlithiated cathodes also leads to next generation energy storage systems including lithium-air and lithium-sulfur batteries.[2, 3] However, for LMBs using traditional carbonate-based liquid electrolytes, the operating temperature is normally limited to being close to room temperature.

Practical handheld device applications require a broader temperature range.[4] This temperature limitation is believed to arise from solid electrolyte interphase (SEI) formation at elevated temperature associated with increased side reactions of the electrolytes and electrodes.[5, 6] Moreover, uncontrollable lithium dendrite growth due to uneven lithium plating and stripping during cycling and intrinsic properties such as flammability, volatility and potential leakage of the carbonate-based liquid electrolytes[7, 8] can lead to safety hazards and thus prevent practical application of LMBs.

Replacing liquid electrolytes with solid polymer electrolytes (SPEs) can effectively improve lithium dendrite resistance.[9-11] The employment of SPEs also mitigates the above-mentioned safety issues caused by organic solvents, and improves device processability.[12-14] However, SPEs have low ionic conductivity and poor interfacial contact with electrodes which hinders their application in handheld devices.[15]

Room temperature ionic liquids (RTILs) have attracted significant attention due to their unique properties, such as nonflammability, excellent thermal stability and ultralow vapor pressure,[16] rendering them competitive candidates as high-safety electrolyte systems when compared to carbonate-based electrolytes.[17-19] The incorporation of RTILs with polymers to form gel polymer electrolytes (GPE) has been demonstrated since 1993.[20] Watanabe and Noda[21] reported in-situ polymerization of vinyl monomers in RTILs, 1-ethyl-3-methylimidazolium tetrafluoroborate (EMIBF$_4$) and 1-butylpyridinium tetrafluoroborate (BPBF$_4$), and the obtained electrolytes showed an ionic conductivity of 1 mS cm$^{-1}$ at 30° C. Passerini et al. reported a series of ternary systems prepared using poly(ethylene oxide) (PEO), lithium bis(trifluoromethanesulfonyl)imide (LiTFSI) and a pyrrolidinium-based RTIL.[17, 22, 23] These electrolyte systems exhibited an ionic conductivity of 0.1 mS cm$^{-1}$ at room temperature, nearly two orders of magnitude higher than without the RTIL.[24]

Besides PEO, other polymers such as poly(vinylidene-fluoride-co-hexafluoropropene) (PVDF-HFP),[25, 26] polymer blends,[27] cross-linked polymers,[28] and polymeric ionic liquids[18] have also been employed as the polymer matrices to prepare GPEs. In addition, several types of ionic liquid systems were synthesized and introduced into the GPE system.[29-31] While the performance of the polymer electrolytes can be significantly improved by introducing RTILs, applying GPE systems in room temperature LMBs is still a difficult challenge and thus most of the previously reported GPEs were investigated at ~40° C. This is largely because of the delicate property tradeoff upon incorporating ionic liquid into polymer matrices. While increasing the ionic liquid content can enhance the electrochemical performance by, for example, enhancing the ionic conductivity of the GPEs, a high liquid content in the electrolyte can deteriorate the mechanical strength of the electrolytes, leading to poor performance of the device.

SUMMARY OF THE INVENTION

In a first aspect, the disclosure relates to a lithium gel polymer electrolyte composition including a crosslinked network, an ionic liquid, and one or more lithium salts, wherein the crosslinked network is formed by reacting an inorganic polyhedral oligomeric silsesquioxane with a functionalized poly(ethylene glycol) or functionalized poly(ethylene oxide).

In the foregoing embodiment, the polyhedral oligomeric silsesquioxane may be reacted with an amine-terminated diterminal functionalized poly(ethylene glycol). In an alternative embodiment, the polyhedral oligomeric silsesquioxane is reacted with an amine-terminated diterminal functionalized (polyethylene oxide).

In each of the foregoing embodiments, the inorganic polyhedral oligomeric silsesquioxane may have the following structure:

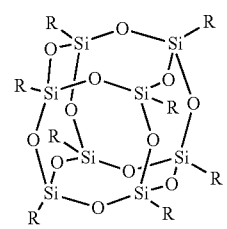

wherein each R group is independently selected from hydrogen, hydrocarbyl, reactive functional groups and functionalized hydrocarbyl groups and at least one of the R groups contains a functional group suitable for the cross-linking reaction.

In each of the foregoing embodiments, the inorganic polyhedral oligomeric silsesquioxane may be selected from octakis(3-glycidyloxypropyldimethylsiloxy)octasilsesquioxane, epoxycyclohexylethyl polysilsesquioxane, glycidyl polyhedral oligomeric silsesquioxane, and octa epoxycyclohexyldimethylsilyl polyhedral oligomeric silsesquioxane.

In each of the foregoing embodiments, the inorganic polyhedral oligomeric silsesquioxane may be reacted with functionalized poly(ethylene glycol) in a molar ratio of from about 1:100 to about 10:1, or from about 1:4 to about 1:2.

In each of the foregoing embodiments, the ionic liquid may be selected from N-methyl-N-propylpyrrolidinium bis(fluorosulfonyl)imide, 1-ethyl-3-methylimidazolium tetrafluoroborate, and 1-butylpyridinium tetrafluoroborate.

In each of the foregoing embodiments, the ionic liquid may be present in an amount of from about 1 wt. % to about 90 wt. %, or from about greater than 5 wt. %, or from about greater than 10 wt. %, or from about greater than 15 wt. %, or from about greater than about 20 wt. %, or from about greater than about 50 wt. %, or from about greater than 60 wt. %, or less than about 80 wt. %, or less than about 70 wt. %, or less than about 60 wt. %, less than about 40 wt. %, or any range made from combinations of the foregoing upper and lower limits, based on a total weight of the lithium gel polymer electrolyte.

In each of the foregoing embodiments, the lithium salt may be present in an amount of from 50 wt. % to about 90 wt. %, or from about greater than about 55 wt. %, or from about greater than 60 wt. %, or from about greater than about 65 wt. %, or from about greater than 70 wt. %, or less than about 85 wt. %, or less than about 80 wt. %, or less than about 70 wt. %, or any range made from combinations of the foregoing upper and lower limits, based on a total weight of the lithium gel polymer electrolyte.

In each of the foregoing embodiments, the lithium salt may be a lithium salt with an anion of bis(trifluoromethane)sulfonamide, hexafluoroarsenate, hexafluorophosphate, perchlorate, tetrafluoroborate, tris(pentafluoroethyl)trifluorophosphate, trifluoromethanesulfonate, bis(fluorosulfonyl)imide, cyclo-difluoromethane-1,1-bis(sulfonyl)imide, cyclo-hexafluoropropane-1,1-bis(sulfonyl)imide, bis(perfluoroethanesulfonyl)imide, bis(oxalate)borate, difluoro(oxalato)borate, dicyanotriazolate, tetracyanoborate, dicyanotrifluoromethyl-imidazole, and dicyano-pentafluoroethyl-imidazole.

In each of the foregoing embodiments, the amine-terminated poly(ethylene glycol), may have a number average molecular weight of from about 2,000 g/mol to about 6,000 g/mol.

In each of the foregoing embodiments, the composition may further comprise a solvent, wherein the solvent is selected from tetrahydrofuran, diethyl ether, acetonitrile, ethyl acetate, and methyl acetate.

In each of the foregoing embodiments, the composition may have an overall ionic conductivity of 1 mS cm$^{-1}$ or greater at 20° C.

In second aspect, the disclosure relates to a battery comprising the composition of any one of the foregoing embodiments and a metal anode.

In the foregoing embodiment, the battery may deliver a stable cycling performance of over 6800 hours at a current density of 0.1 mA cm$^{-2}$, or the battery delivers a stable cycling performance over at least 2250 charge-discharge steps, at a current density of 0.1 mA cm$^{-2}$, wherein stable cycling performance means having a repeatable voltage profile with no insubstantial noise attributable to pulverization, delamination, corrosion, or other side reactions and one cycle equals 1 charge plus 1 discharge, and wherein a charge-discharge cycle takes a total of about 3 hours, wherein stable cycling performance means having a repeatable voltage profile with no insubstantial noise attributable to pulverization, delamination, corrosion, or other side reactions and one cycle equals 1 charge plus 1 discharge.

In each of the foregoing battery embodiments, the metal anode may be lithium.

In a third aspect, the disclosure relates to a process of preparing the lithium gel polymer electrolyte of each of the foregoing embodiments, including reacting an inorganic polyhedral oligomeric silsesquioxane with a functionalized poly(ethylene glycol) or a functionalized poly(ethylene oxide) to form a crosslinked network in a single-step polymerization process in the presence of an ionic liquid, and one or more lithium salts.

The present invention is thus directed to the provision of a GPE with a good ionic conductivity that employs an electrolyte that possesses sufficient mechanical strength to provide acceptable performance of the device. The present invention creates a homogeneous, mechanically stable hybrid network that is capable of housing ionic liquid. Also, dendrite-free, wide temperature range lithium metal batteries (LMBs) can be achieved by the present invention. To this end, a functional polyhedral oligomeric silsesquioxane (POSS)-crosslinked poly(ethylene glycol) (PEG) hybrid network was selected as the host polymer because such networks have excellent mechanical properties and lithium dendrite resistance in all-solid-state LMBs.[9, 32] N-methyl-N-propylpyrrolidinium bis(fluorosulfonyl)imide (Pyr$_{13}$FSI) was chosen because of its enhanced physical properties and low viscosity.[33-36] LiFSI was used as the lithium salt to achieve higher ionic conductivity.[37]

In the obtained hybrid network-RTIL GPEs, the hybrid network provides sufficient mechanical strength while retaining the ionic liquid in the GPEs to ensure acceptable ionic conductivity. Pyr$_{13}$FSI has been proven to exhibit excellent electrochemical properties and superior compatibility with lithium.[38, 39] The two main properties, i.e. electrochemical performance and mechanical properties, of the GPEs were tuned by controlling the network molecular structure and Pyr$_{13}$FSI contents. Ionic conductivity of over 1 mS cm$^{-1}$ at 20° C. and excellent lithium dendrite growth resistance even at 1 mA cm$^{-2}$, were achieved. Dendrite-free lithium metal batteries (LMBs) with excellent cycling performance between 0° C. and 90° C. were realized in the devices using the hybrid network GPEs.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 1A shows the synthetic route for making the gel polymer electrolytes.

FIG. 1B shows schematics of the ideal network structures of the gel polymer electrolytes, wherein spheres denote polyhedral oligomeric silsesquioxane (POSS) crosslinkers. The left panel of FIG. 1B shows a denser network structure as compared to the right panel of FIG. 1B.

FIG. 1C shows a scanning electron microscope (SEM) image of the 2PEG2k-60 gel polymer electrolyte sample.

FIGS. 1D, 1E and 1F show energy-dispersive X-ray spectroscopy (EDS) elemental mapping of the 2PEG2k-60 GPE sample.

in FIG. 14A and after cycling at 90° C. in FIG. 14B.

DETAILED DESCRIPTION OF EMBODIMENTS

Figure 1A:
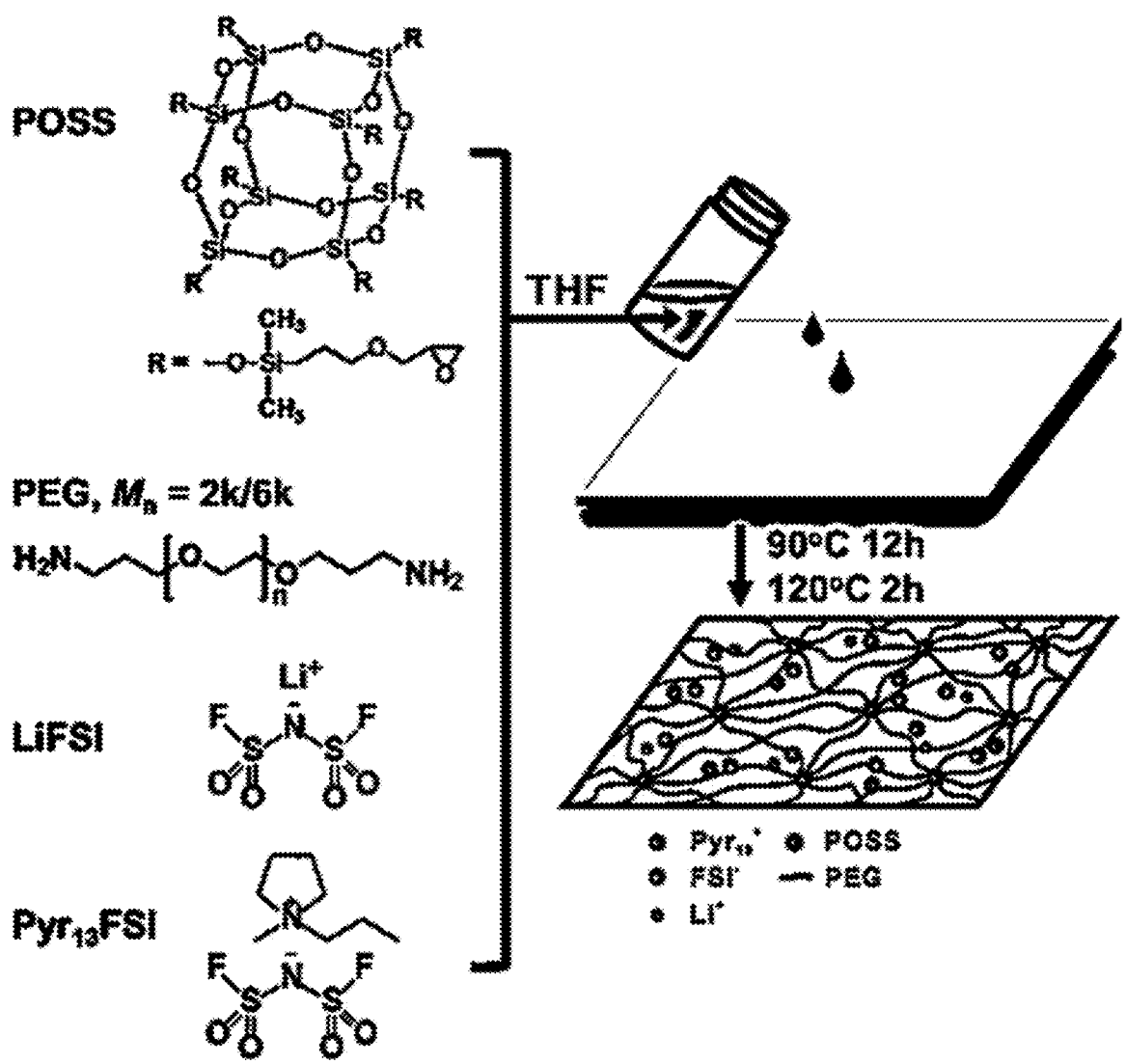
FIGS. 1A-1F show the design, synthesis, and characterization of hybrid network-room temperature ionic liquid (RTIL)—gel polymer electrolytes (GPEs).

The following definitions of terms are provided in order to clarify the meanings of certain terms as used herein.

It must be noted that as used herein and in the appended claims, the singular forms "a", "an", and "the" include plural references unless the context clearly dictates otherwise. Furthermore, the terms "a" (or "an"), "one or more," and "at least one" can be used interchangeably herein. The terms "comprising," "including," "having," and "constructed from" can also be used interchangeably.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It is to be understood that each component, compound, substituent or parameter disclosed herein is to be interpreted as being disclosed for use alone or in combination with one or more of each and every other component, compound, substituent or parameter disclosed herein.

It is also to be understood that each amount/value or range of amounts/values for each component, compound, substituent or parameter disclosed herein is to be interpreted as also being disclosed in combination with each amount/value or range of amounts/values disclosed for any other component (s), compounds(s), substituent(s) or parameter(s) disclosed herein and that any combination of amounts/values or ranges of amounts/values for two or more component(s), compounds(s), substituent(s) or parameters disclosed herein are thus also disclosed in combination with each other for the purposes of this description.

It is further understood that each lower limit of each range disclosed herein is to be interpreted as disclosed in combination with each upper limit of each range disclosed herein for the same component, compounds, substituent or parameter. Thus, a disclosure of two ranges is to be interpreted as a disclosure of four ranges derived by combining each lower limit of each range with each upper limit of each range. A disclosure of three ranges is to be interpreted as a disclosure of nine ranges derived by combining each lower limit of each range with each upper limit of each range, etc. Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

The hybrid network-RTIL GPEs were prepared by dissolving POSS, amine-terminated PEG, Pyr$_{13}$FSI and lithium bis(fluorosulfonyl)imide (LiFSI) in tetrahydrofuran, casting the solution on glass slides and curing under vacuum. The reaction between POSS epoxide and PEG diamine forms a molecularly homogeneous hybrid network,[9, 32] in which lithium salt LiFSI-ionic liquid Pyr$_{13}$FSI (Li-IL) solution is immobilized and acts as the main Li$^+$ conducting medium. The reaction scheme is shown in FIG. 1A.

The structure of the POSS may be as follows:

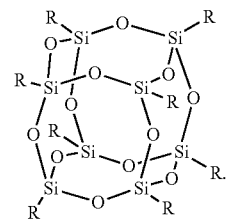

The R group(s) on the surface of the POSS may include any functional group that is cross-linkable to provide a network structure, such as shown in FIG. 1A. The R groups may be selected from hydrogen, hydrocarbyl, reactive functional groups and functionalized hydrocarbyl groups. The POSS could have 3-8 R groups selected from the reactive functional groups and functionalized hydrocarbyl groups. Each of the POSS materials disclosed in the references cited herein may be employed in the present invention to provide the network structure. To this end, other particles in addition to POSS might be useful if such particles function as both a nanoparticle and a crosslinker to provide the required network structure.

Some examples of POSS that may be used in the present invention include these with an epoxy group at a distal end of one or more of the R groups. These compounds can be represented by the following formula:

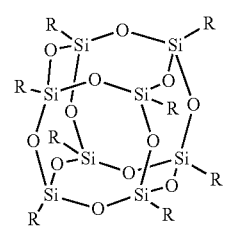

wherein each R group may be represented by the following substituent, wherein ─┼─ indicates the bond that is the point of attachment of the R group:

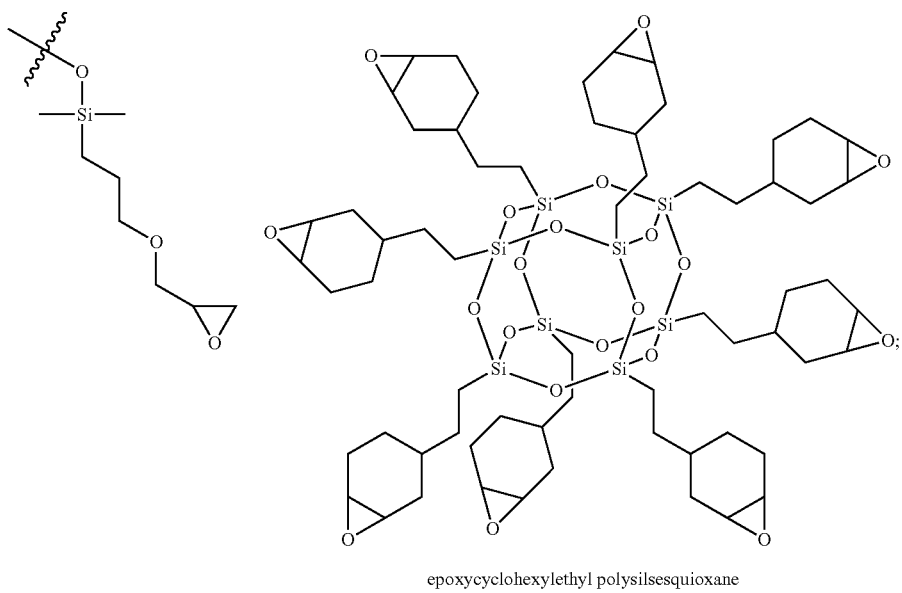
epoxycyclohexylethyl polysilsesquioxane
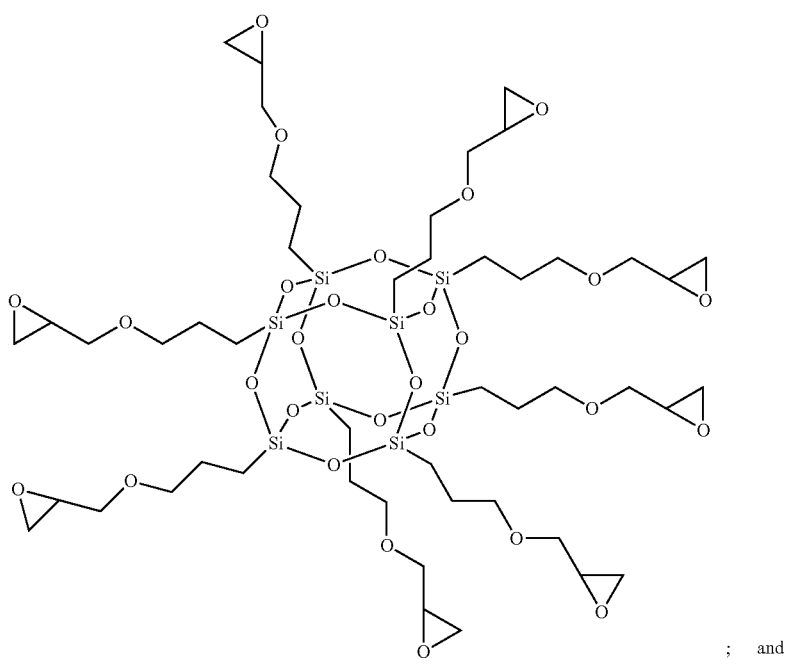
glycidyl POSS
; and

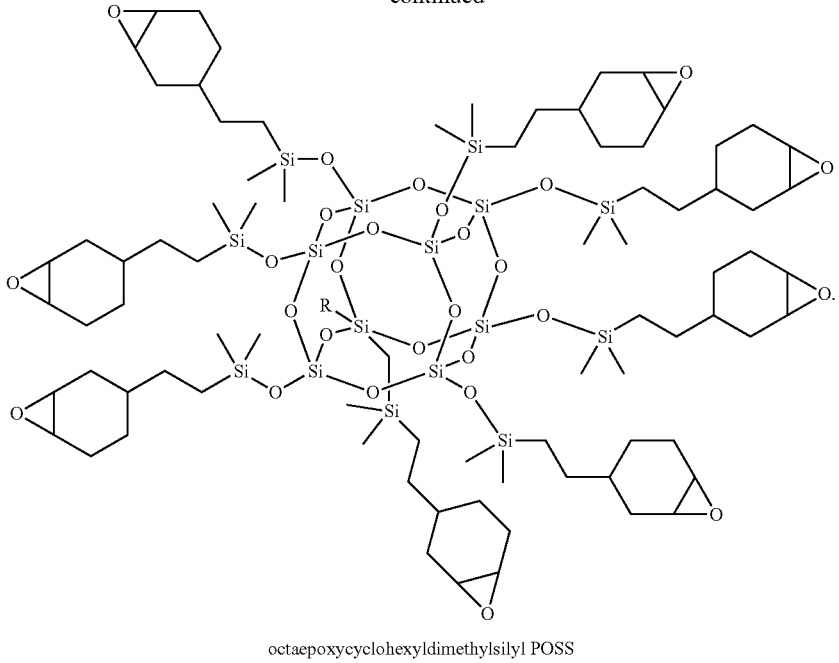

octaepoxycyclohexyldimethylsilyl POSS

Though many examples of the POSS discussed herein have eight R groups each comprising a reactive functional group or a functionalized hydrocarbyl group, POSS molecules with only some of the R groups comprising a functionalized group suitable for a cross-linking reaction may be used. For example, POSS with 1 to 7 R groups each comprising a reactive functional group or a functionalized hydrocarbyl group may be suitable for the present invention. In some embodiments, the number of R groups in a POSS that comprise a reactive functional group or a functionalized hydrocarbyl group may be from 1 to 6, or from 2 to 6, or from 3 to 6, or from 1-2.

In some embodiments, the POSS is reacted with a functionalized poly(ethylene glycol) or functionalized poly(ethylene oxide). In some embodiments, the functionalized poly(ethylene glycol) or functionalized poly(ethylene oxide) may be an amine-terminated diterminal functionalized poly (ethylene glycol) or an amine-terminated diterminal functionalized poly(ethylene oxide) having a molecular weight in a range of from about 1000 Dalton to 10,000 Dalton or from about 1500 Dalton to about 7,000 Dalton, or from about 2000 Dalton to about 6000 Dalton, as measured by gel permeation chromatography. In some embodiments, the amine-terminated PEG may be a diterminal functionalized poly (ethylene glycol).

The lithium gel polymer electrolyte composition is prepared in the presence of an ionic liquid which may be selected from N-methyl N-propylpyrrolidinium bis(fluorosulfonyl)imide, 1-ethyl-3-methylimidazolium tetrafluoroborate, and 1-butylpyridinium tetrafluoroborate.

Preferably, the ionic liquid is present in an amount of from about 1 wt. % to about 90 wt. %, or from about greater than 5 wt. %, or from about greater than 10 wt. %, or from about greater than 15 wt. %, or from about greater than about 20 wt. %, or from about greater than about 50 wt. %, or from about greater than 60 wt. %, or less than about 80 wt. %, or less than about 70 wt. %, or less than about 60 wt. %, less than about 40 wt. %, or any range made from combinations of the foregoing upper and lower limits, based on a total weight of the lithium gel polymer electrolyte.

The lithium gel polymer composition is prepared in the presence of one or more lithium salts which may be selected from lithium salts with an anion of bis(trifluoromethane) sulfonamide, hexafluoroarsenate, hexafluorophosphate, perchlorate, tetrafluoroborate, tris(pentafluoroethyl)trifluorophosphate, trifluoromethanesulfonate, bis(fluorosulfonyl) imide, cyclo-difluoromethane-1,1-bis(sulfonyl)imide, cyclo-hexafluoropropane-1,1-bis(sulfonyl)imide, bis(perfluoroethanesulfonyl)imide, bis(oxalate)borate, difluoro(oxalato)borate, dicyanotriazolate, tetracyanoborate, dicyano-trifluoromethyl-imidazole, and dicyano-pentafluoroethyl-imidazole.

Preferably, the one or more lithium salts is present in an amount of from 50 wt. % to about 90 wt. %, or from about greater than about 55 wt. %, or from about greater than 60 wt. %, or from about greater than about 65 wt. %, or from about greater than 70 wt. %, or less than about 85 wt. %, or less than about 80 wt. %, or less than about 70 wt. %, any range made from combinations of the foregoing upper and lower limits, based on a total weight of the lithium gel polymer electrolyte.

In some embodiments, the lithium gel polymer composition is prepared in the presence of a solvent. Suitable solvents may be selected from tetrahydrofuran, diethyl ether, acetonitrile, ethyl acetate, and methyl acetate.

Figure 1B:
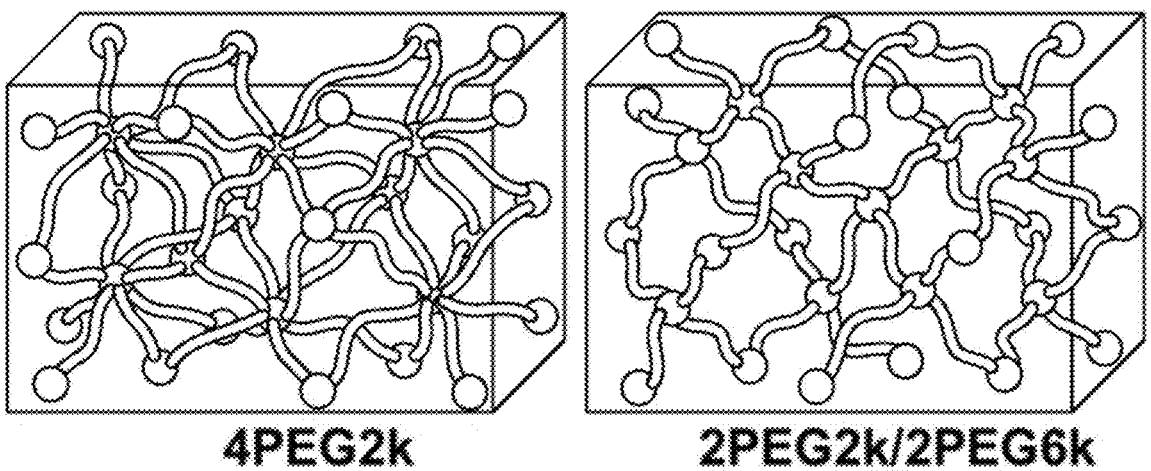

The GPE samples are denoted as nPEGm-x, in which n, m and x denote the PEG/POSS molar ratio, PEG molecular weight and Li-IL weight percent in the GPEs, respectively. Different PEG/POSS molar ratios n and PEG molecular weights m result in different cross-linked POSS-PEG network structures (denoted as nPEGm, such as 4PEG2k, 2PEG2k, 2PEG6k as shown in FIG. 1B, where n is used to control the network crosslinking density while m is used for the mesh size control, both can affect the mechanical and electrochemical properties of GPEs.

Figure 9A:
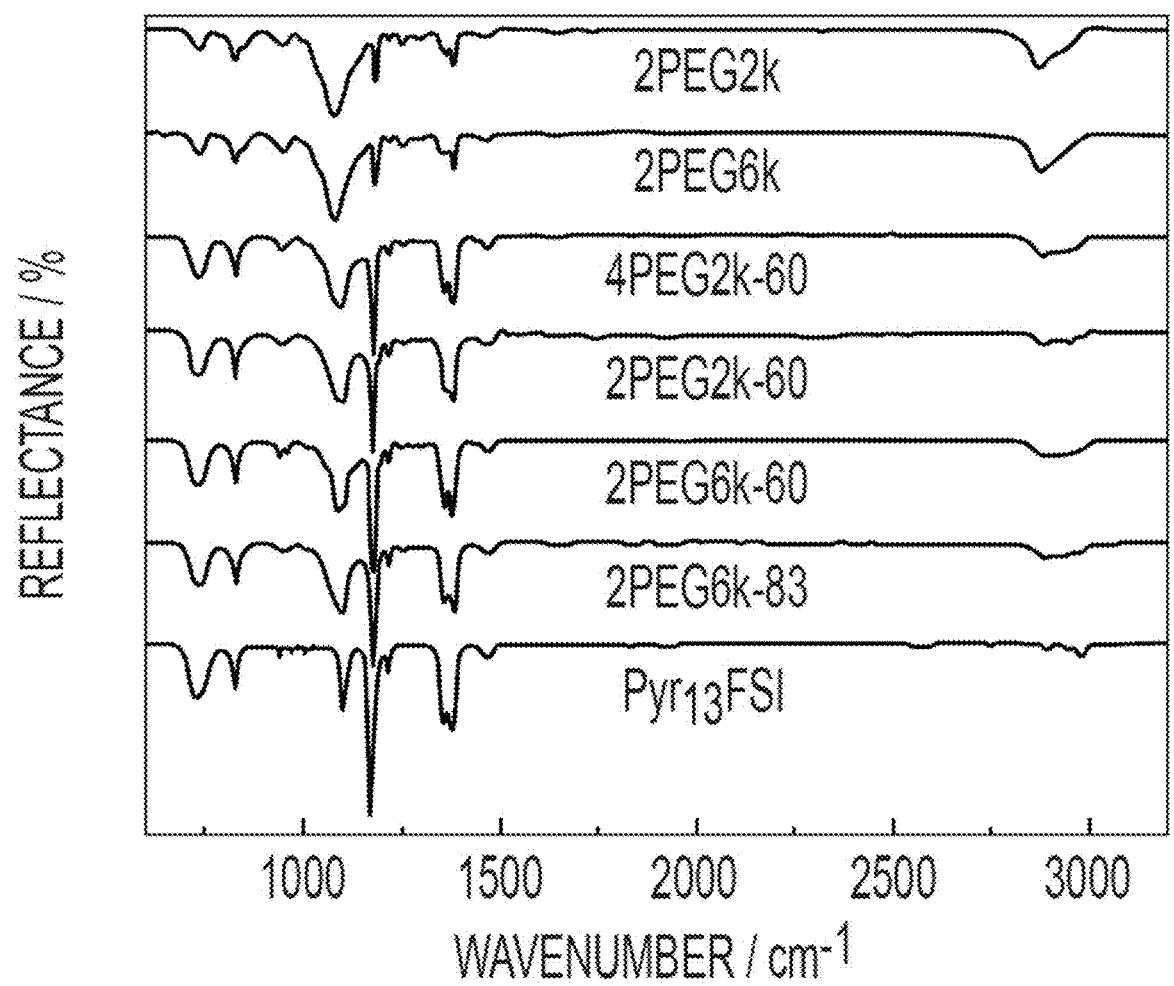
FIG. 9A shows the Fourier-transform infrared spectroscopy (FTIR) spectra of Pyr$_{13}$FSI, SPE, and the GPE samples.
Figure 9B:
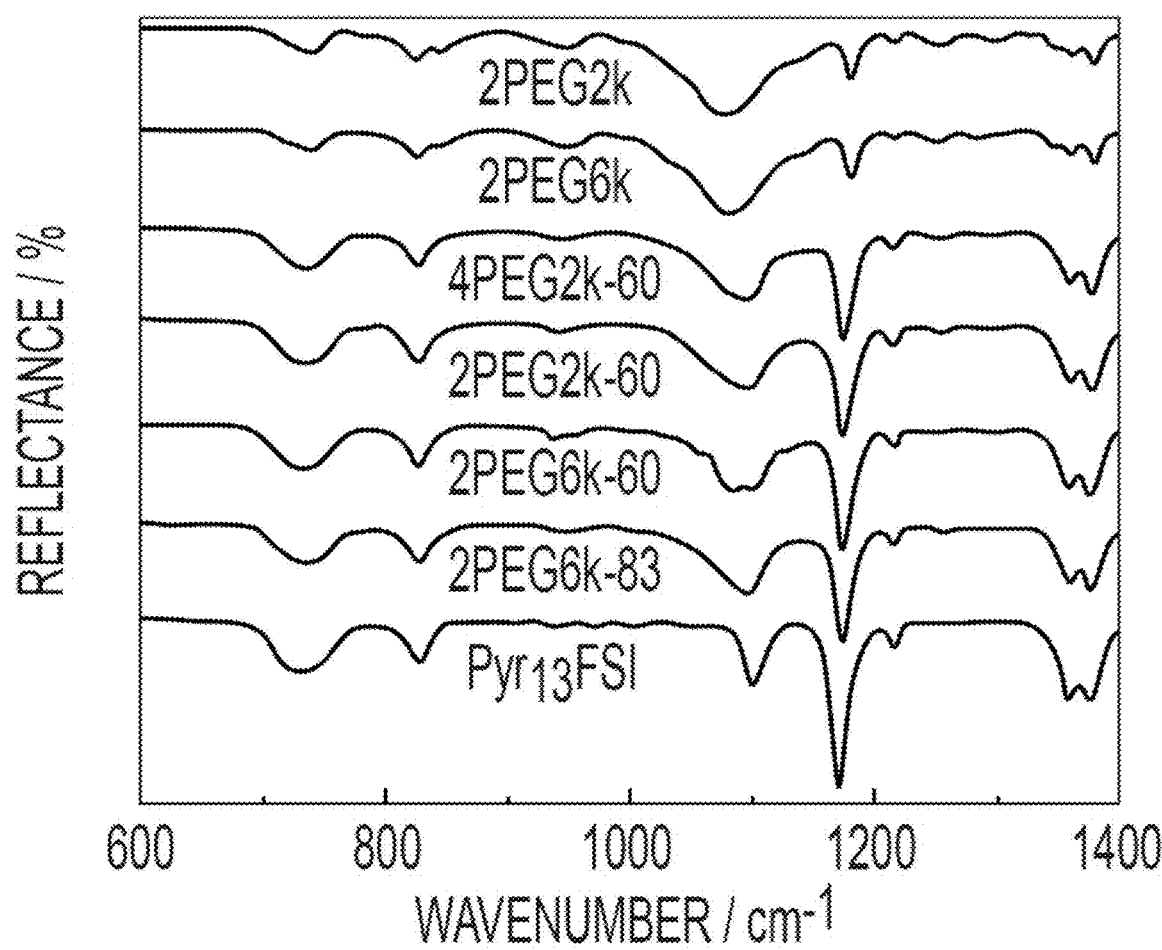
FIG. 9B shows the FTIR spectra of FIG. 9A enlarged between 600 and 1400 cm$^{-1}$.

As shown in FIG. 9, bands at around 2910, 2870, 1350 and 950 cm$^{-1}$ are related to the CH$_2$ groups. The bands of the FSI anion are located at 1378, 1216, 1172, 827, 730 cm$^{-1}$. The band at around 1080 cm$^{-1}$ corresponds to the stretching of C—O—C of PEG chains and Si—O—Si of POSS. The absence of characteristic peak of the epoxy group at 910 cm$^{-1}$ indicating that most of the epoxy groups have reacted in the SPEs and GPEs.

Figure 1C:
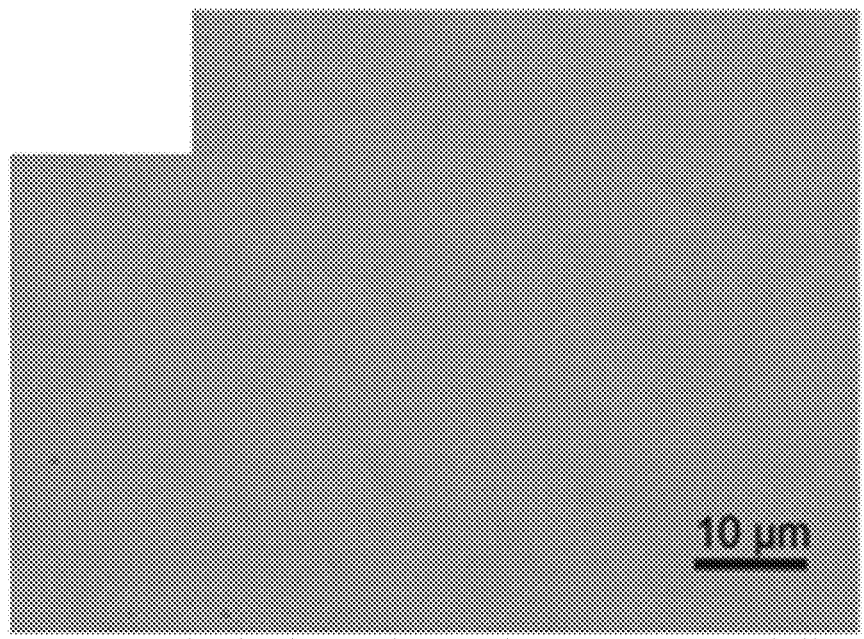
Figure 1D:
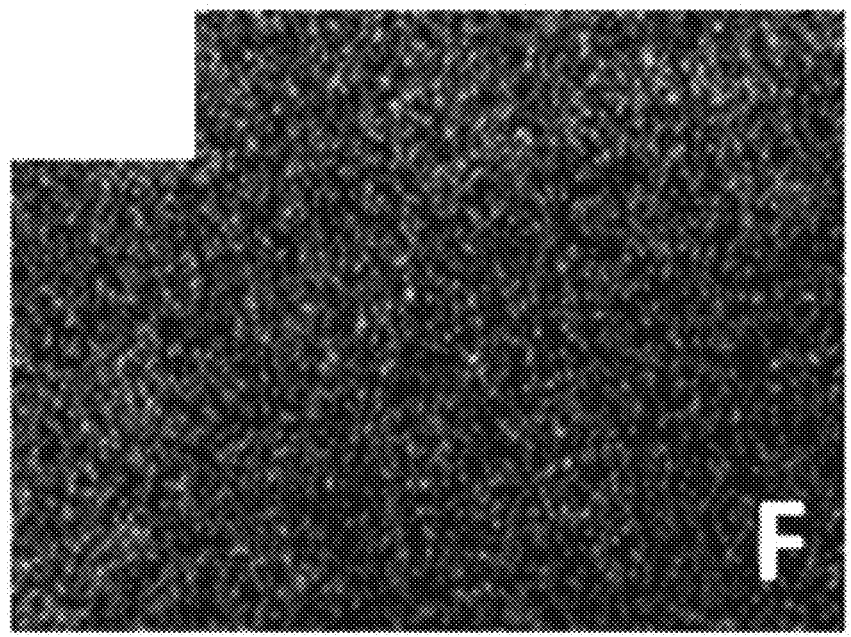
Figure 1E:
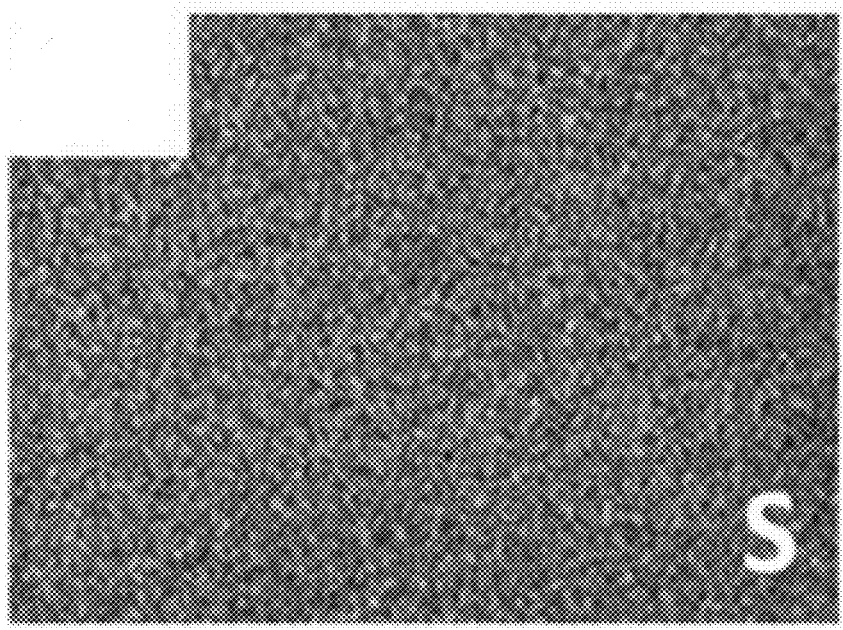
Figure 1F:
Figure 2A:
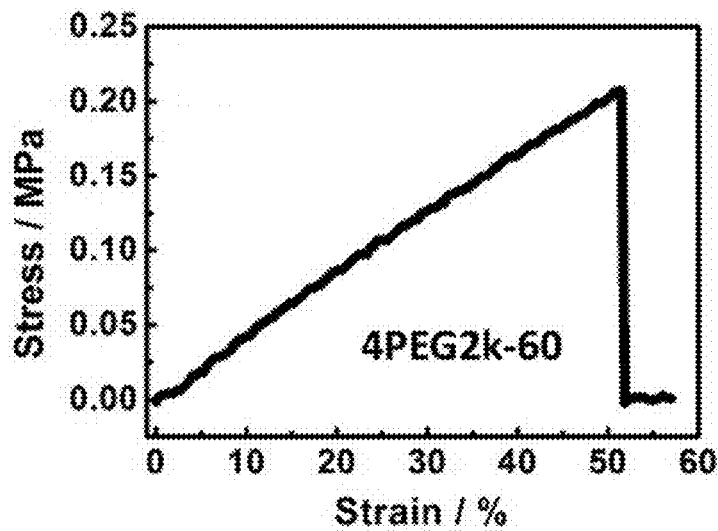
FIG. 2A shows a stress-strain curve of a 4PEG2k-60 sample.
Figure 2B:
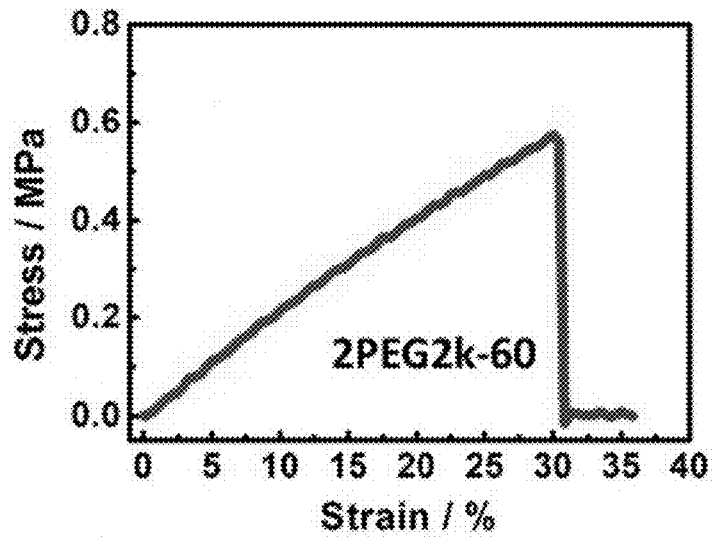
FIG. 2B shows a stress strain curve of a 2PEG2k-60 sample.
Figure 2C:
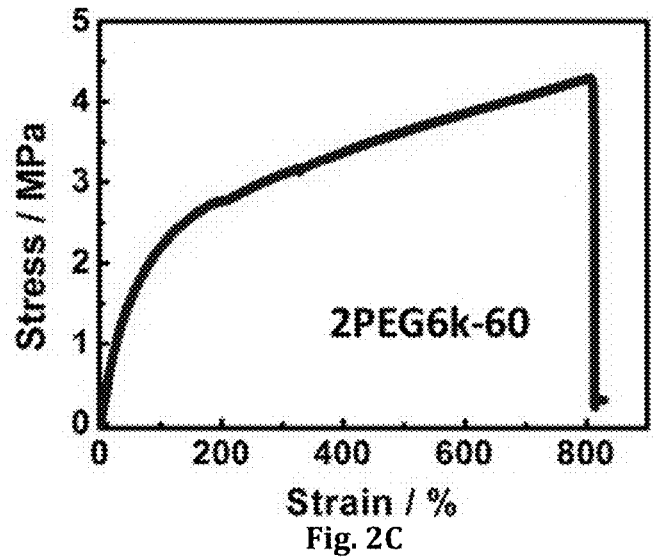
FIG. 2C shows a stress strain curve of a 2PEG6k-60 sample.
Figure 2D:
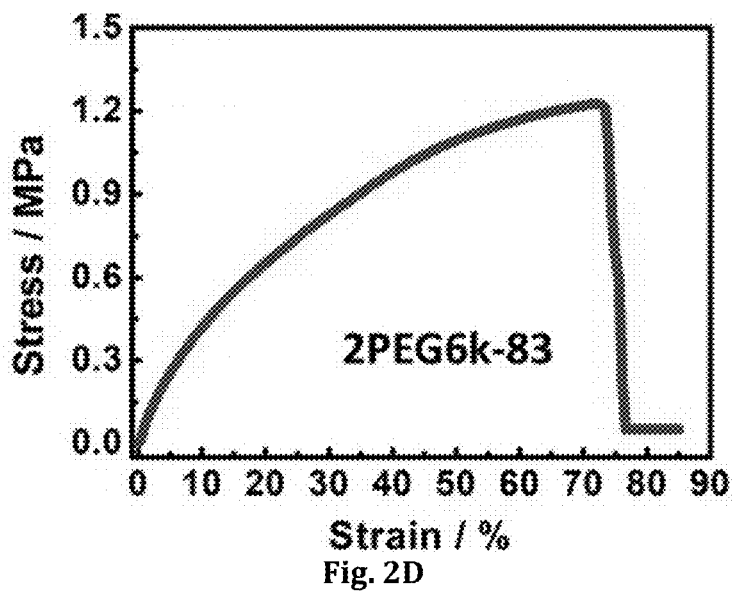
FIG. 2D shows a stress-strain curve of a 2PEG6k-83 sample.

FIG. 9 shows the typical Fourier transform infrared (FTIR) spectra of the GPEs, suggesting that most of the epoxy groups have reacted.[9] Scanning electron microscope (SEM) images (FIG. 1C) and energy dispersive spectroscopy (EDS) elemental mapping (FIGS. 1D-1F) reveal that the GPE is homogeneous and its surface is smooth without particle aggregation.

Figure 3A:
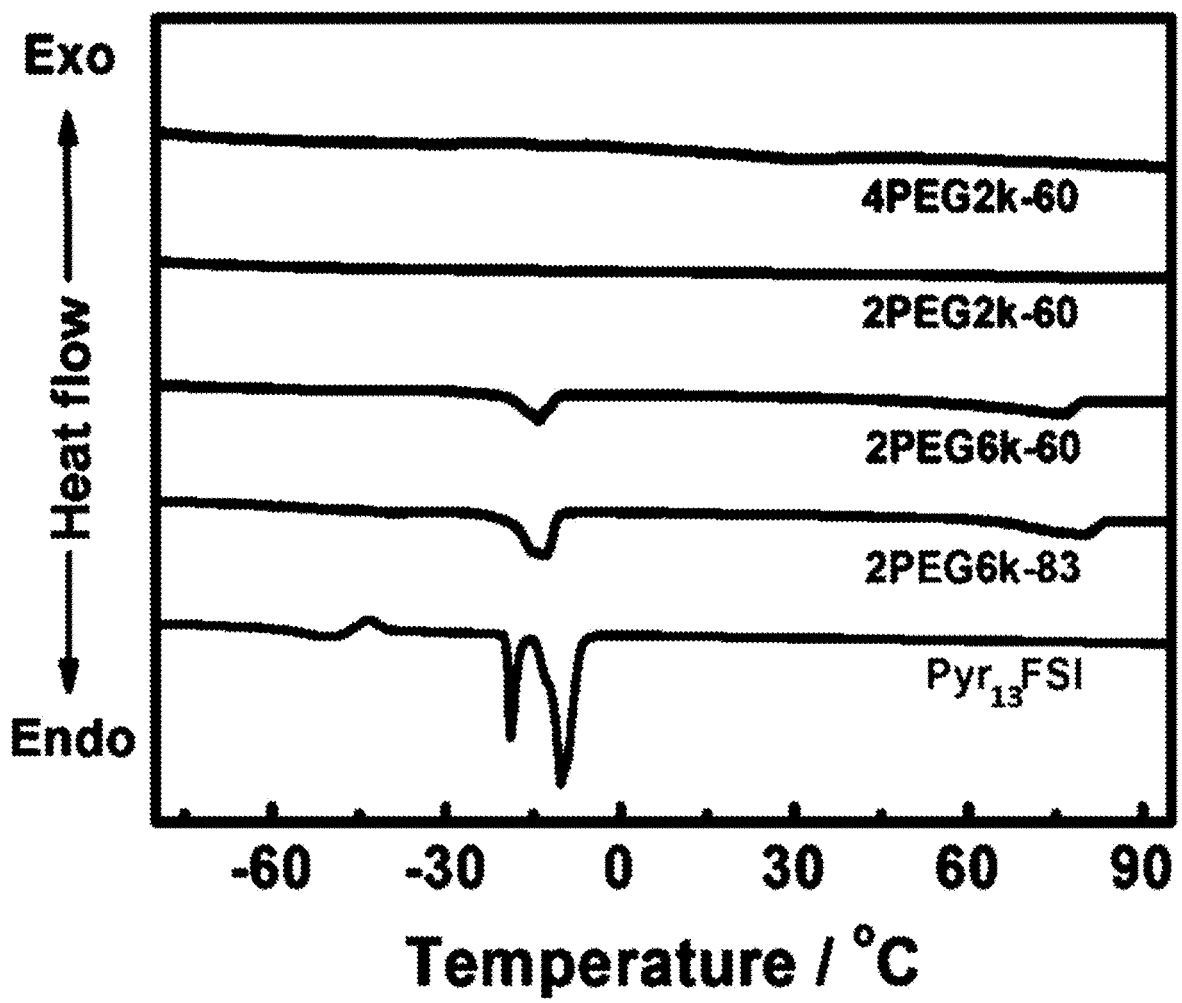
FIG. 3A shows a differential scanning calorimetry (DSC) curve of the GPE samples.
Figure 10:
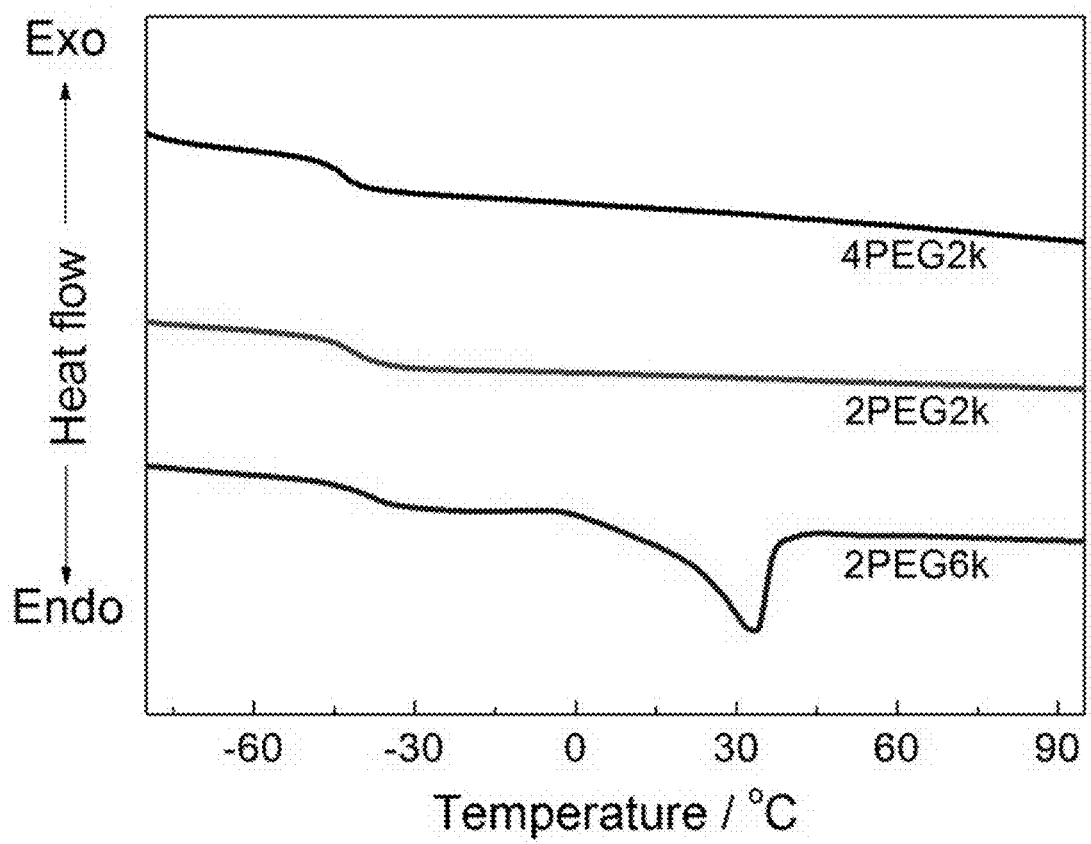
FIG. 10 shows the DSC curves of the SPE samples.

Pyr$_{13}$FSI (FIG. 3A shows a possible phase melting and crystallization (−49.7/−43.0° C.), a solid-solid phase transition (−18.9° C.), and a terminal melting temperature at −10.2° C.[40] For 4PEG2k and 2PEG2k SPE samples (FIG. 10), only glass transition temperatures (T$_g$) at −44.1° C. and −41.2° C. are observed, suggesting that PEG crystallization is suppressed. For the 2PEG6k SPE sample, besides the glass transition that occurs at −37.8° C., PEG crystallization with a melting temperature of 33.5° C. was observed. When incorporated with Li-IL, glass transition was not observed in the tested temperature range for the GPE samples.

The 2PEG6k-60 and 2PEG6k-83 GPE samples show two endothermic peaks, which can be assigned to the melting of Pyr$_{13}$FSI (−14.0° C. and −13.0° C.) and PEG (76.6° C. and 79.8° C.), respectively. Using a melting enthalpy of 196.6 J

TABLE 1

Mechanical properties, ionic conductivity σ and lithium ion transference number t$_{Li+}$ of the GPEs.

| GPEs | Young's modulus/MPa | Tensile strength/MPa | Elongation at break/% | Toughness/ 10$^4$ J m$^{-3}$ | σ at 20° C./mS cm$^{-1}$ | t$_{Li+}$ |
|---|---|---|---|---|---|---|
| 4PEG2k-60 | 0.5 | 0.2 | 52 | 5.5 | 0.75 | 0.48 |
| 2PEG2k-60 | 2.3 | 0.6 | 31 | 9.4 | 0.61 | 0.22 |
| 2PEG6k-60 | 4.0 | 4.3 | 812 | 2600 | 0.66 | 0.27 |
| 2PEG6k-83 | 4.5 | 1.2 | 73 | 64.4 | 1.22 | 0.18 |

Sufficient mechanical properties are crucial for the successful application of polymer electrolytes in LMBs and are particularly important for GPEs because their mechanical strength deteriorates compared with SPEs due to the liquid content. In the as-prepared SPE samples, the uniform hybrid POSS-PEG network can provide high mechanical strength. [9] For the networks of 4PEG2k, 2PEG2k and 2PEG6k, when incorporated with 60 wt. % Li-IL, uniform and self-standing membranes were obtained for all the GPE samples. The maximum Li-IL content that can be incorporated in the hybrid network-based GPEs is network-dependent, and decreases from 2PEG6k to 2PEG2k and 4PEG2k. For GPE samples with 4PEG2k, the maximum Li-IL content was 67 wt. %, while for the 2PEG6k network, self-standing membranes can be obtained even with a Li-IL content of 83 wt. %, which can be ascribed to the large mesh size and rigid network structure derived from the longer PEG chain length.

Tensile tests were carried out to quantitatively investigate GPE mechanical properties. As shown in FIGS. 2A-2D and Table 1, when incorporated with the same amount of Li-IL, for GPEs with different network structures, Young's modulus and tensile strength range from 0.5-4.5 MPa and 0.2-4.3 MPa, respectively, confirming that the rigid network structure can retain higher mechanical strength when incorporated with liquid components. Toughness, which is the area under the stress-strain curve, reflects the strength and ductility of the materials and is more suitable for describing the resistance to fracture. The elongation at break of 2PEG6k-60 reaches up to 812%, indicating excellent elasticity. Due to the high tensile strength and elongation at break, the toughness of the 2PEG6k-60 sample can reach up to 2.6×10$^7$ J m$^{-3}$, which was 474 and 277 times than that of 4PEG2k-60 and 2PEG2k-60 samples, respectively. Even when the Li-IL content was increased to 83 wt. %, the obtained 2PEG6k-83 sample still had a high toughness of 6.44×10$^5$ J m$^{-3}$, demonstrating good mechanical properties of the GPEs.

Thermal behavior of the GPE samples was investigated using differential scanning calorimetry (DSC) and thermal gravimetric analysis (TGA). The DSC thermogram of g$^{-1}$ for 100% crystalline PEO,[41-43] the normalized degrees of crystallinity were calculated to be 23.8%, 25.8% and 47.6% for 2PEG6k, 2PEG6k-60 and 2PEG6k-83, respectively. The increase in crystallinity with Li-IL content might be due to more swelling of the PEG chains for higher IL-containing GPEs.

Figure 3B:
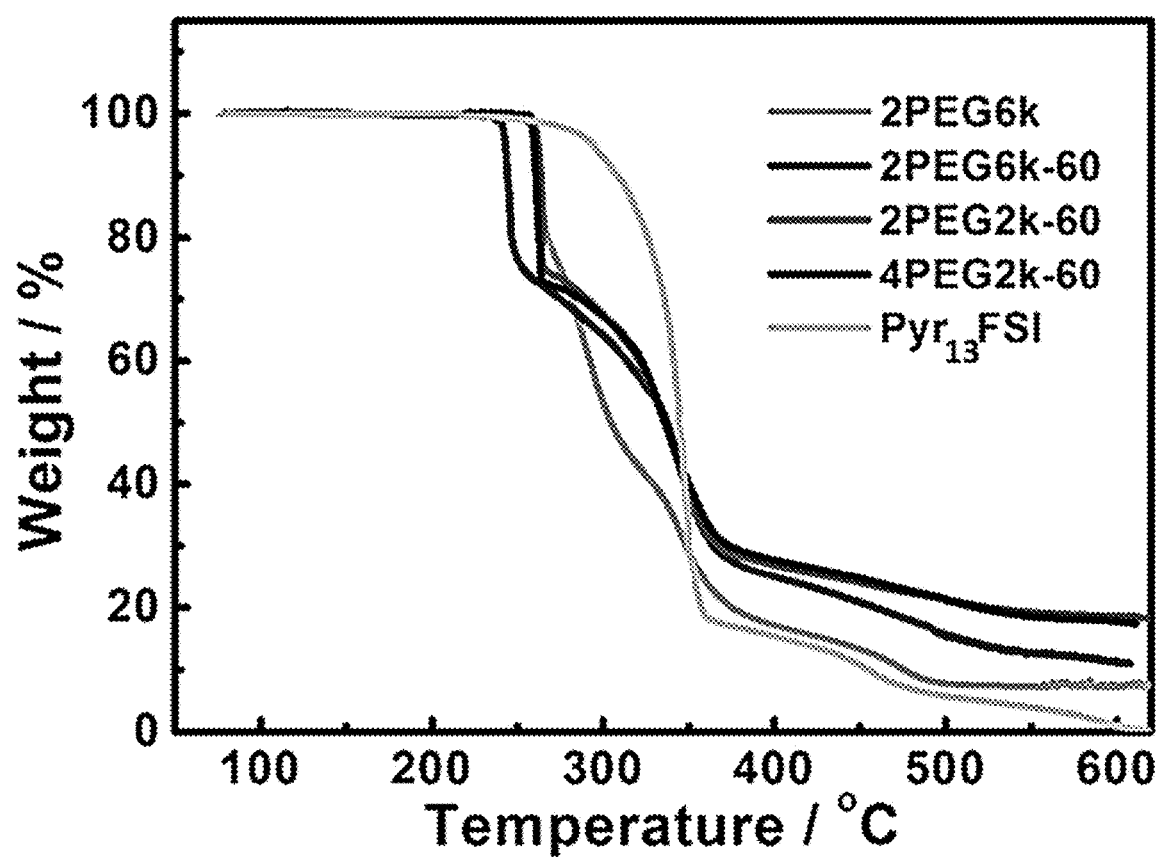
FIG. 3B shows a thermogravimetric analysis (TGA) curve of the GPE samples.
Figure 3C:
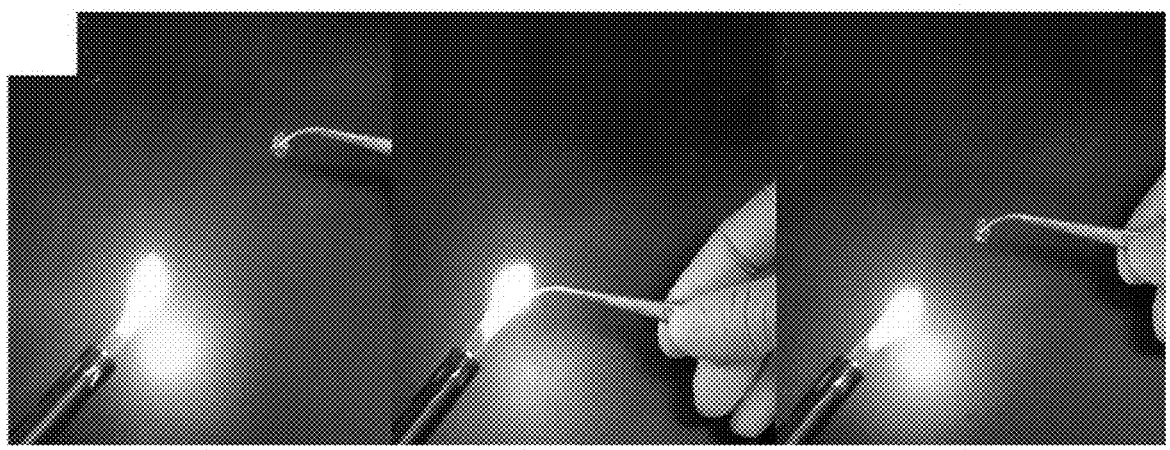
FIG. 3C shows the flammability test results for the GPE samples.

From the TGA curves shown in FIG. 3B, it was observed that all three of the GPE samples 4PEG2k-60, 2PEG2k-60 and 2PEG6k-60 exhibited two-step thermal decomposition below 450° C., corresponding to the decomposition of the POSS-PEG network and Pyr$_{13}$FSI, respectively. The 5% weight loss temperatures of the 4PEG2k-60, 2PEG2k-60 and 2PEG6k-60 were 259° C., 262° C. and 244° C., respectively, indicating their high thermal stability. Also, the samples with lower EO content showed better thermal stability. FIG. 3C shows the flammability test conducted for the 4PEG2k-60 GPE sample. Only slight shrinkage occurred in the sample when it was exposed to an ignited lighter, confirming the low flammability of the electrolyte, which is important for battery safety.

Figure 4A:
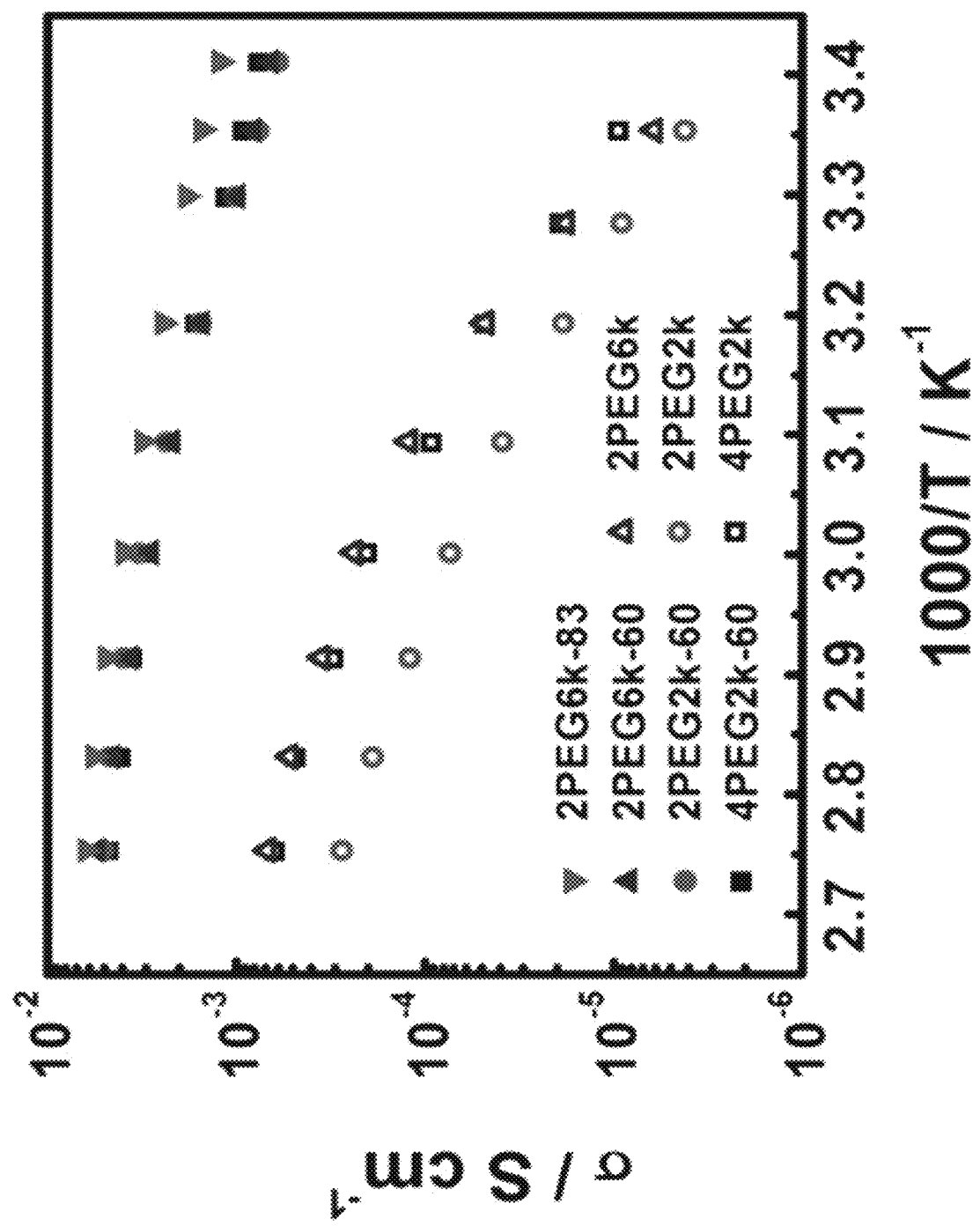
FIG. 4A shows the temperature dependence of the ionic conductivity for the solid polymer electrolytes (SPE) and the GPE samples.
Figure 4B:
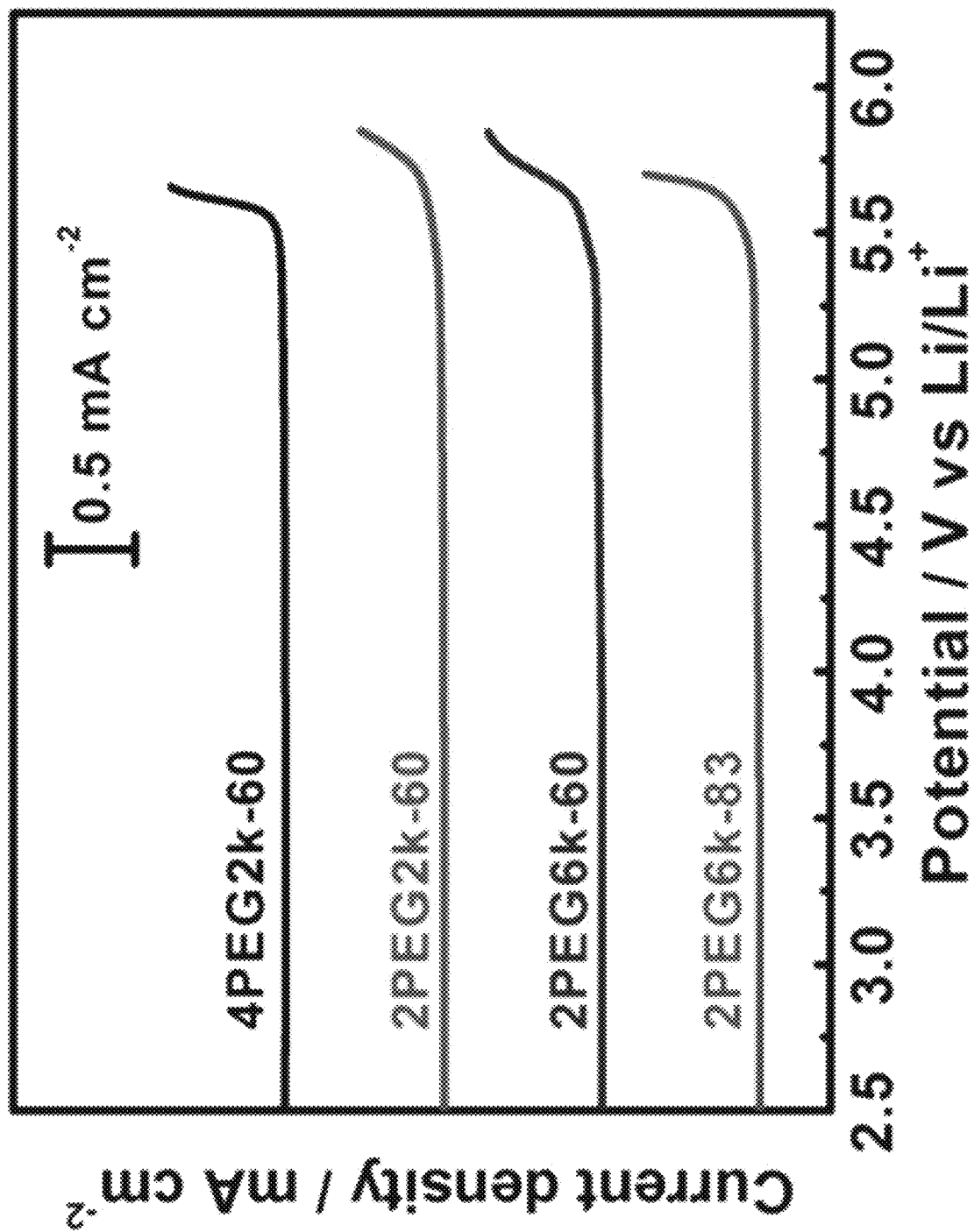
FIG. 4B shows the linear sweep voltammetry (LSV) curves of the GPE samples.
Figure 5A:
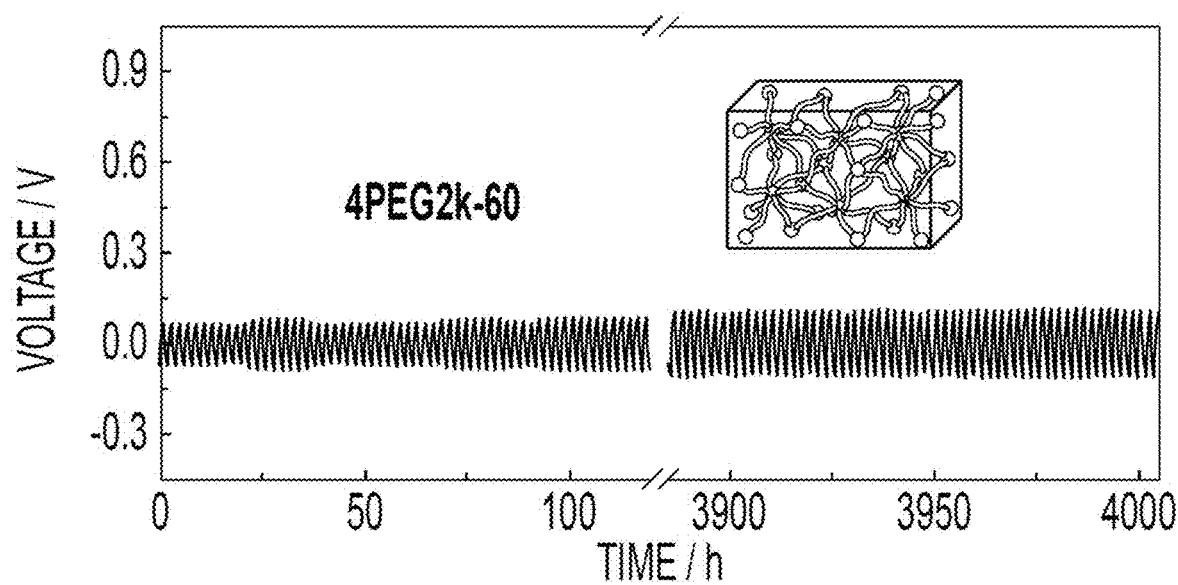
FIG. 5A shows the voltage-time profiles of symmetrical lithium cells at 20° C. under 0.1 mA cm$^{-2}$ with an areal capacity of 0.1 mAh cm$^{-2}$ for 4PEG2k-60 with a small mesh size and dense network. The inset shows the hybrid network structure for 4PEG2k-60.
Figure 5B:
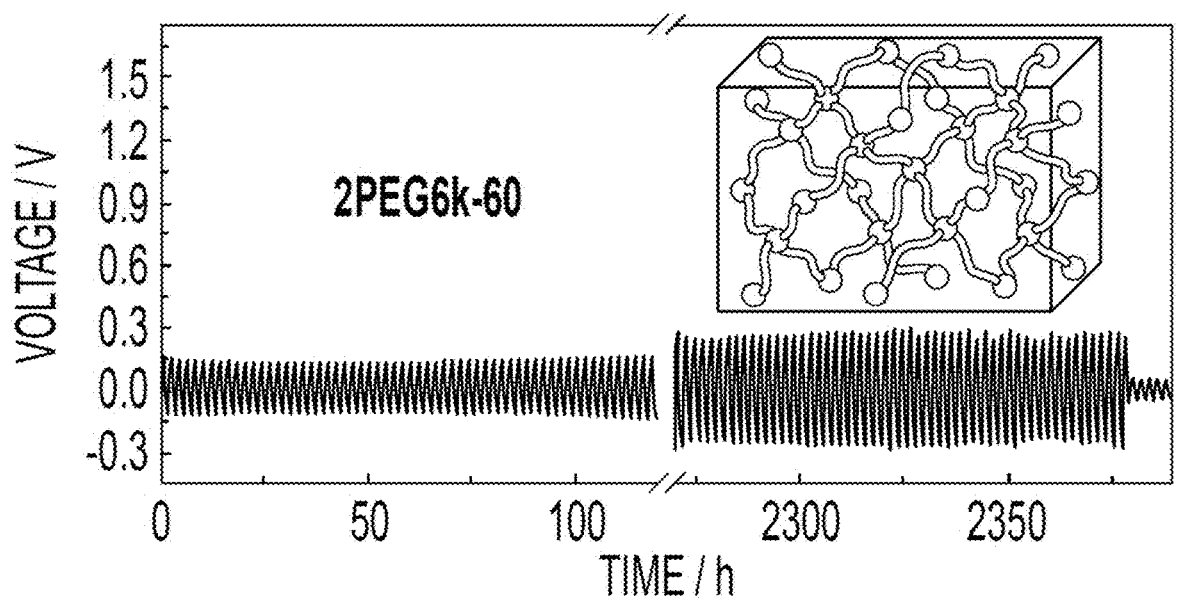
FIG. 5B shows the voltage-time profiles of symmetrical lithium cells at 20° C. under 0.1 mA cm$^{-2}$ with an areal capacity of 0.1 mAh cm$^{-2}$ for 2PEG2k-60 with a small mesh size and loose network. The inset shows the hybrid network structure for 2PEG2k-60.
Figure 5C:
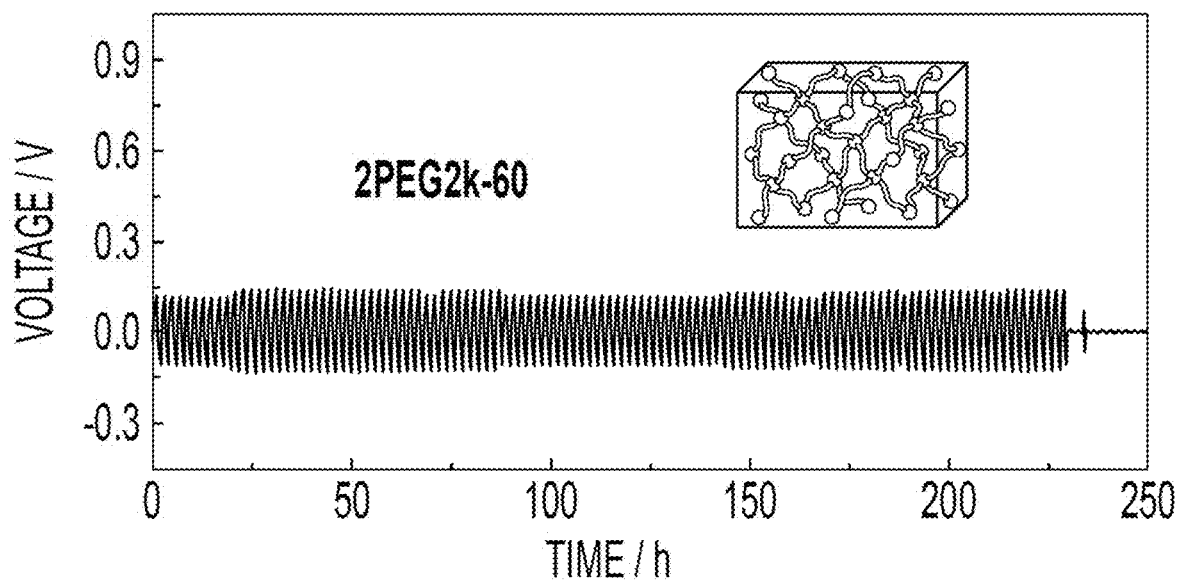
FIG. 5C shows the voltage-time profiles of symmetrical lithium cells at 20° C. under 0.1 mA cm$^{-2}$ with an areal capacity of 0.1 mAh cm$^{-2}$ for 2PEG6k-60 with a large mesh size and loose network. The inset shows the hybrid network structure for 2PEG6k-60.
Figure 5D:
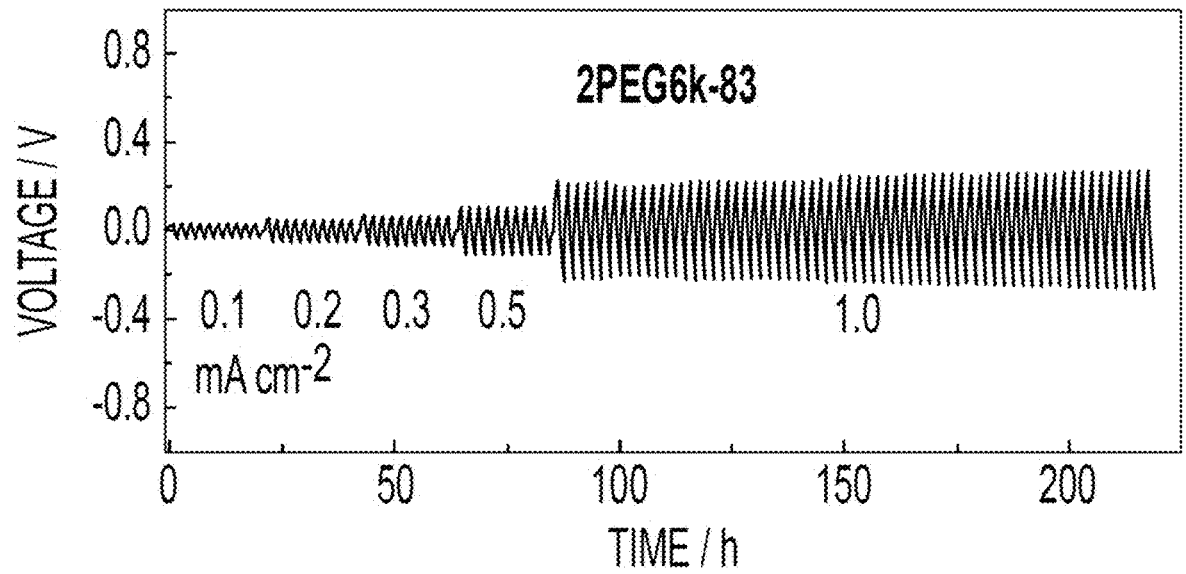
FIG. 5D shows the voltage-time profiles of symmetrical lithium cells at 20° C. under 0.1 mA cm$^{-2}$ with an areal capacity of 0.1 mAh cm$^{-2}$ under different current densities for 2PEG6k-83.
Figure 5E:
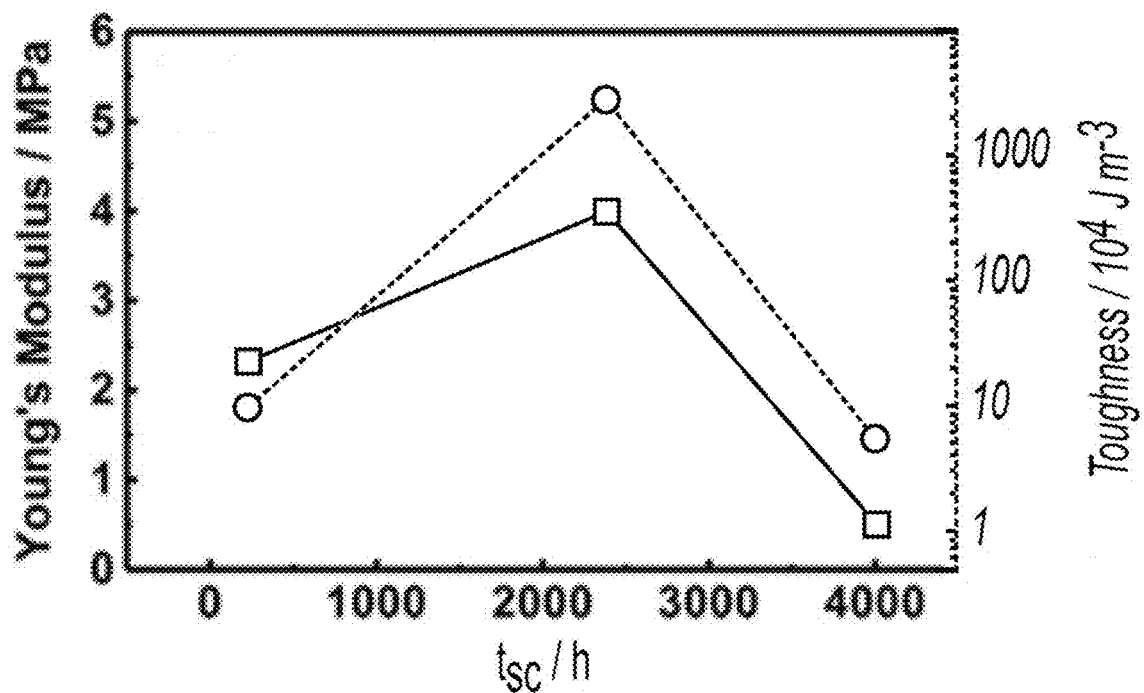
FIG. 5E shows the short-circuit time $t_{sc}$ of Li/GPE/Li cells (0.1 mA cm$^{-2}$, 0.1 mAh cm$^{-2}$) versus the Young's modulus and toughness of the GPEs.
Figure 5F:
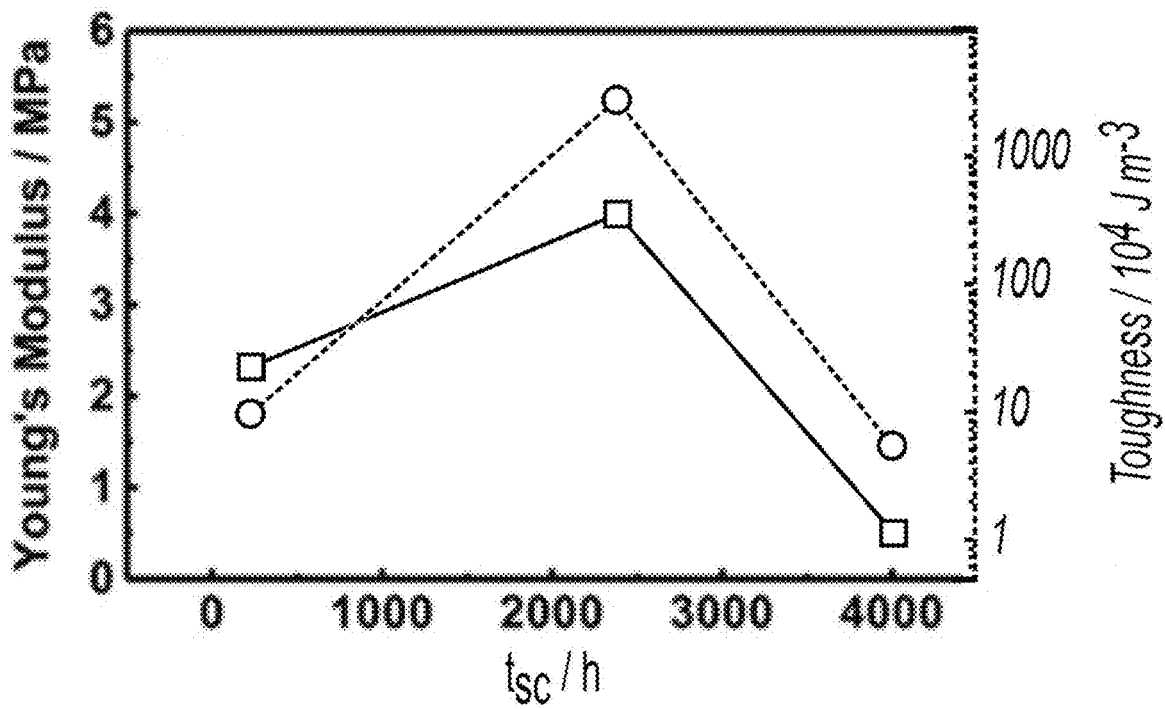
FIG. 5F shows the short-circuit time $t_{sc}$ of Li/GPE/Li cells (0.1 mA cm$^{-2}$, 0.1 mAh cm$^{-2}$) versus the solid electrolyte interphase (SEI) conductivity $\sigma_{SEI}$ and GPE conductivity $\sigma$.
Figure 6A:
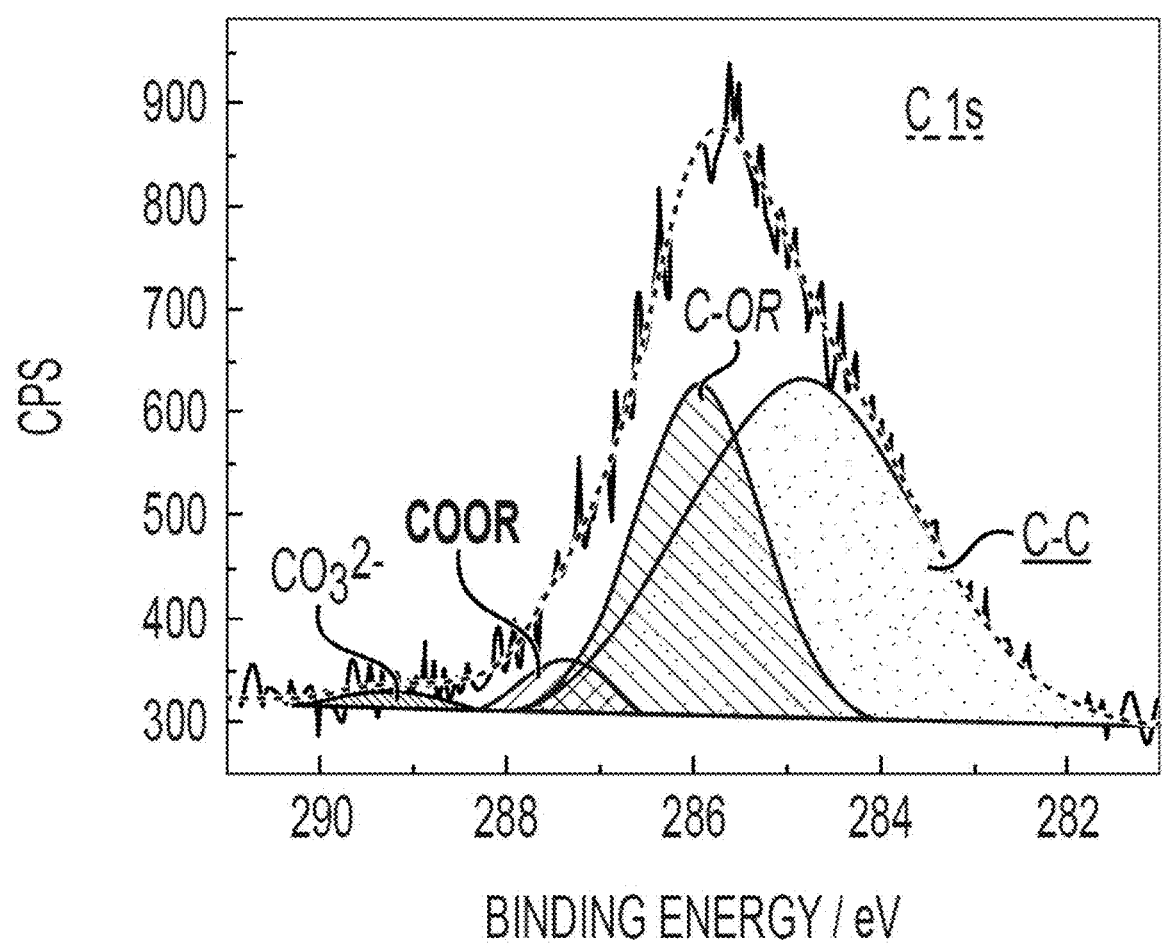
FIG. 6A shows C 1s X-ray photoelectron spectroscopy (XPS) spectra of the lithium electrode in the Li/2PEG6k-75/Li cell after cycling before 1 minute of argon ion sputtering.
Figure 6B:
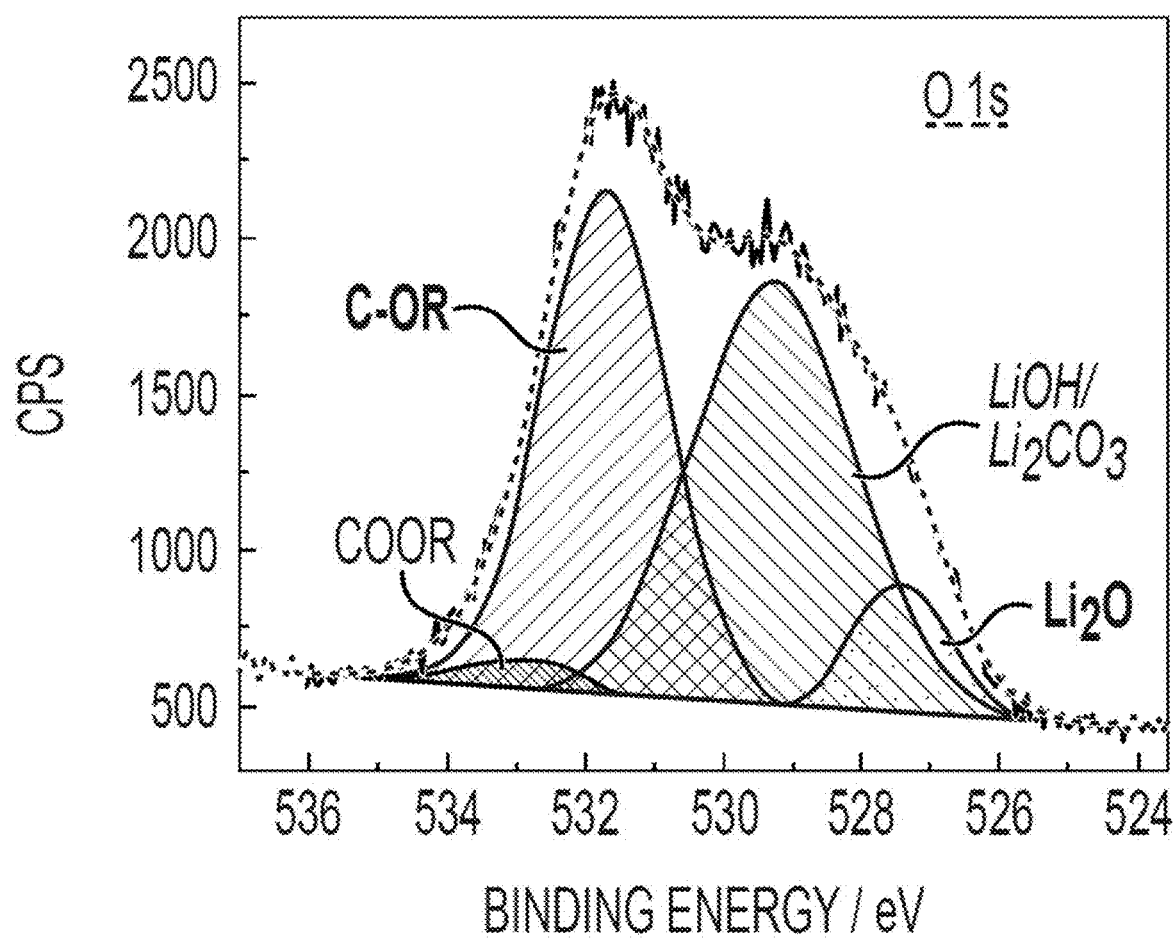
FIG. 6B shows O 1s XPS spectra of the lithium electrode in the Li/2PEG6k-75/Li cell after cycling before 1 minute of argon ion sputtering.
Figure 6C:
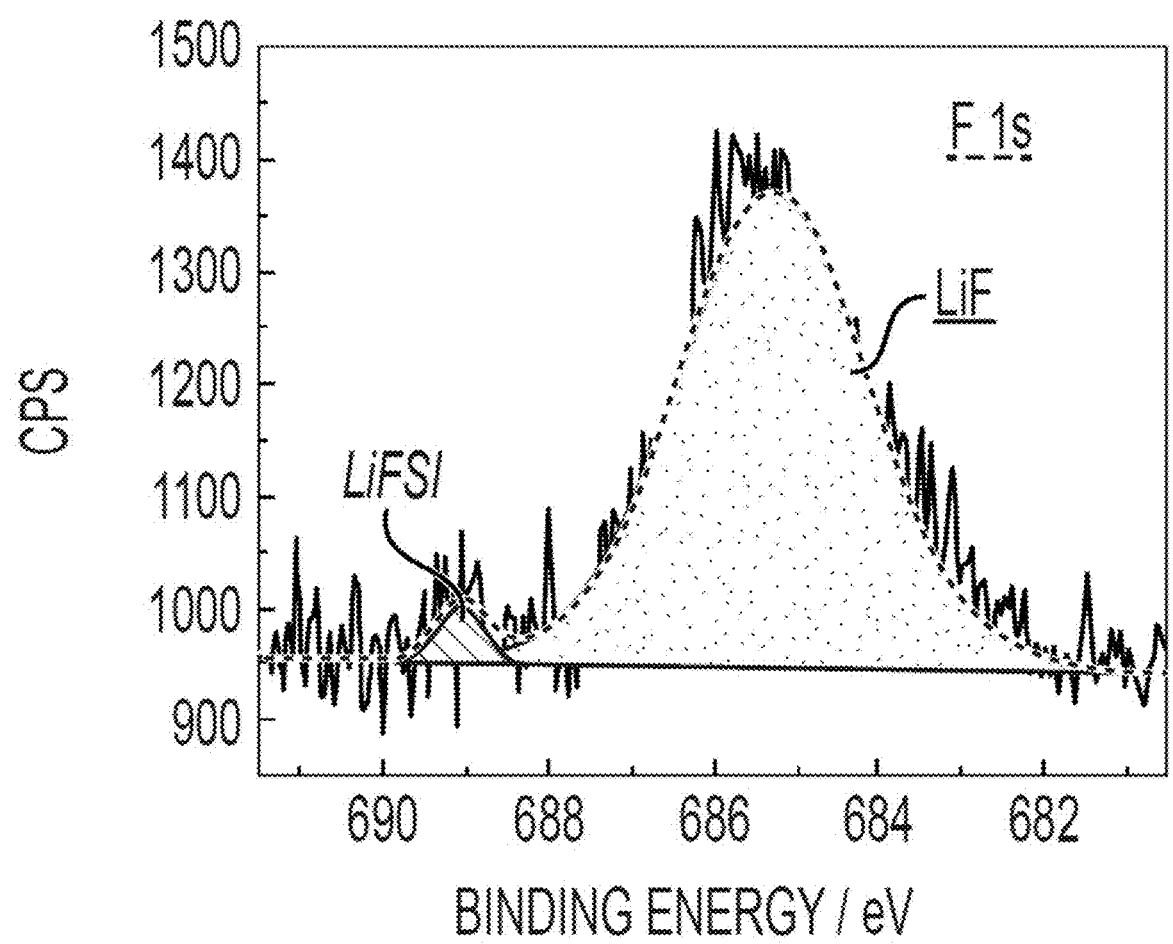
FIG. 6C shows F 1s XPS spectra of the lithium electrode in the Li/2PEG6k-75/Li cell after cycling before 1 minute of argon ion sputtering.
Figure 6D:
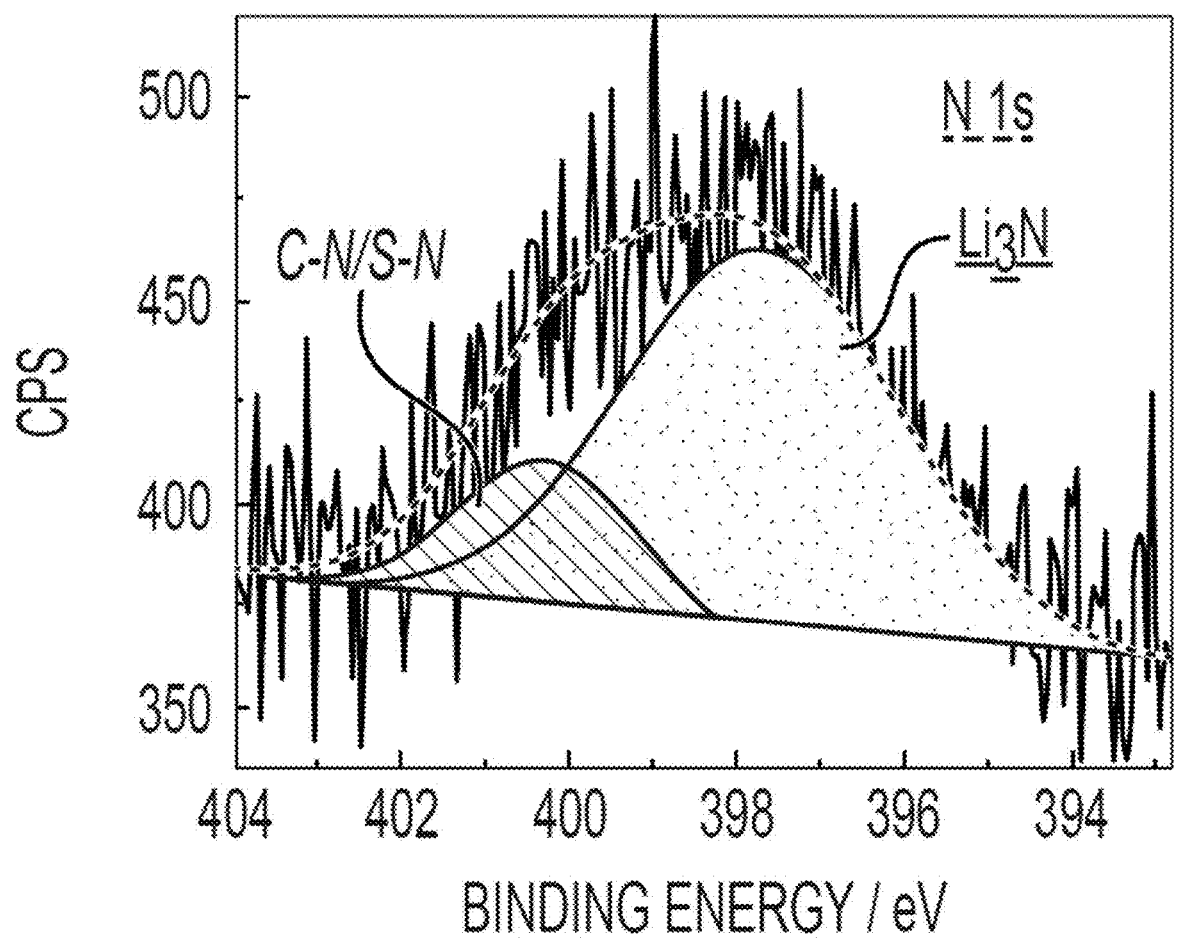
FIG. 6D shows N 1s XPS spectra of the lithium electrode in the Li/2PEG6k-75/Li cell after cycling before 1 minute of argon ion sputtering.
Figure 6E:
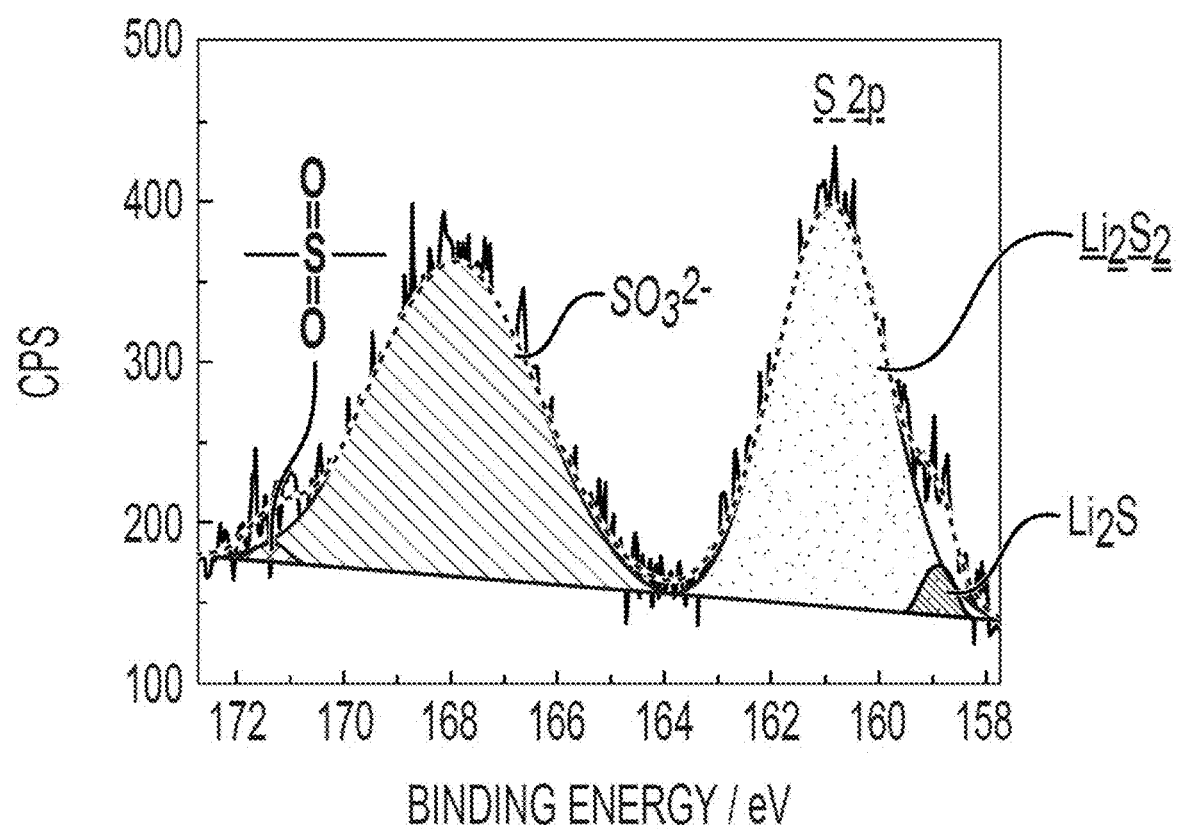
FIG. 6E shows S 2p XPS spectra of the lithium electrode in the Li/2PEG6k-75/Li cell after cycling before 1 minute of argon ion sputtering.
Figure 6F:
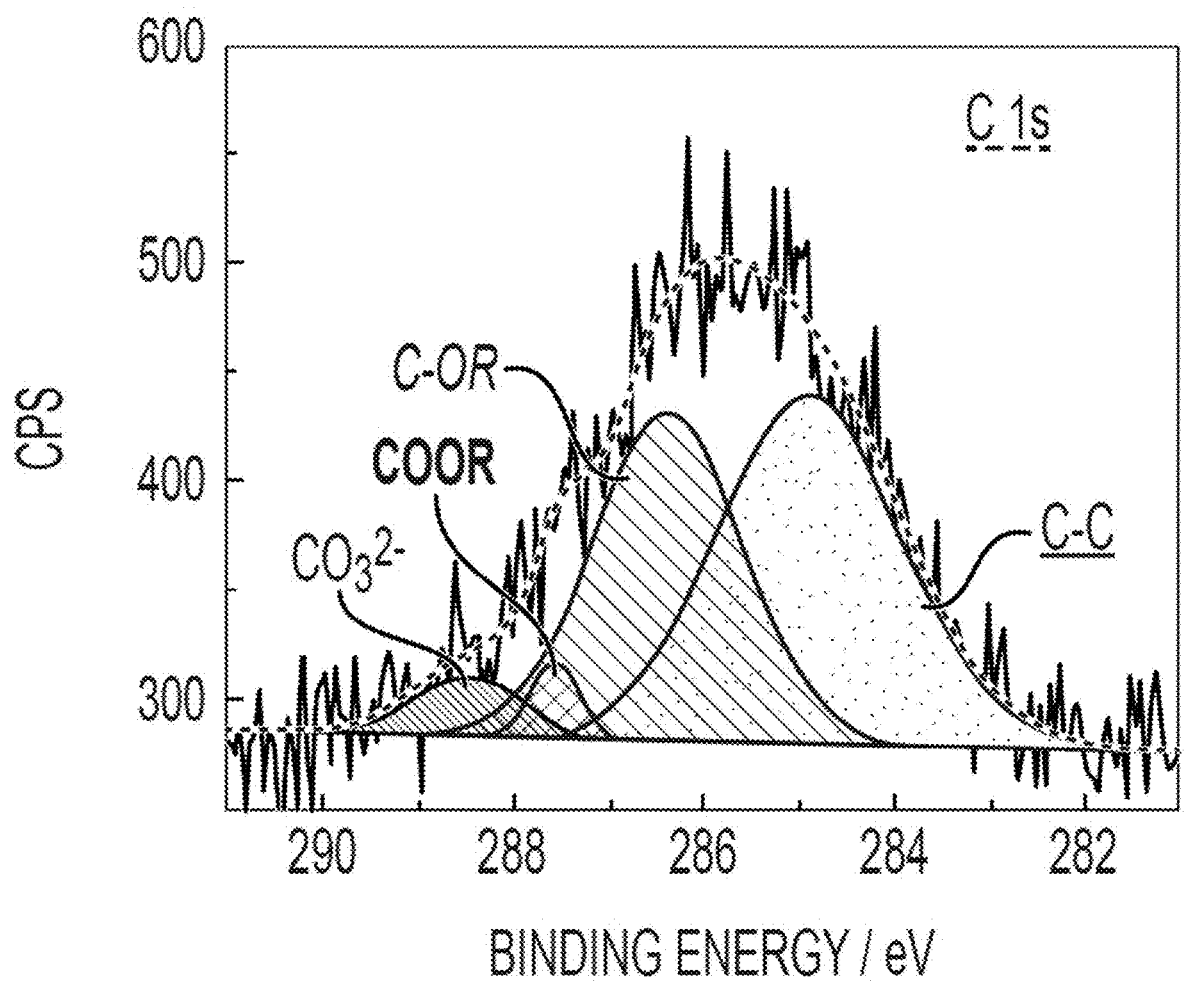
FIG. 6F shows C 1s XPS spectra of the lithium electrode in the Li/2PEG6k-75/Li cell after cycling after 1 minute of argon ion sputtering.
Figure 6G:
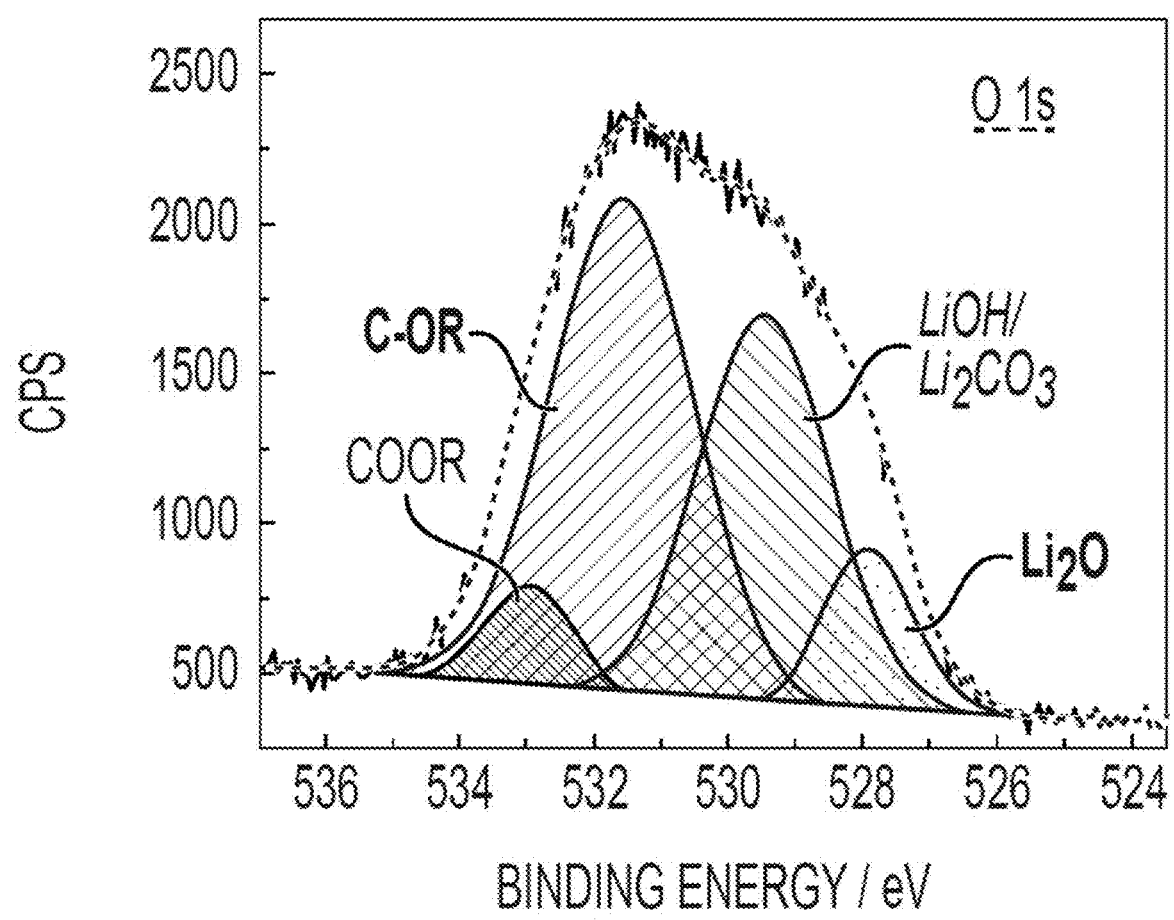
FIG. 6G shows O 1s XPS spectra of the lithium electrode in the Li/2PEG6k-75/Li cell after cycling after 1 minute of argon ion sputtering.
Figure 6H:
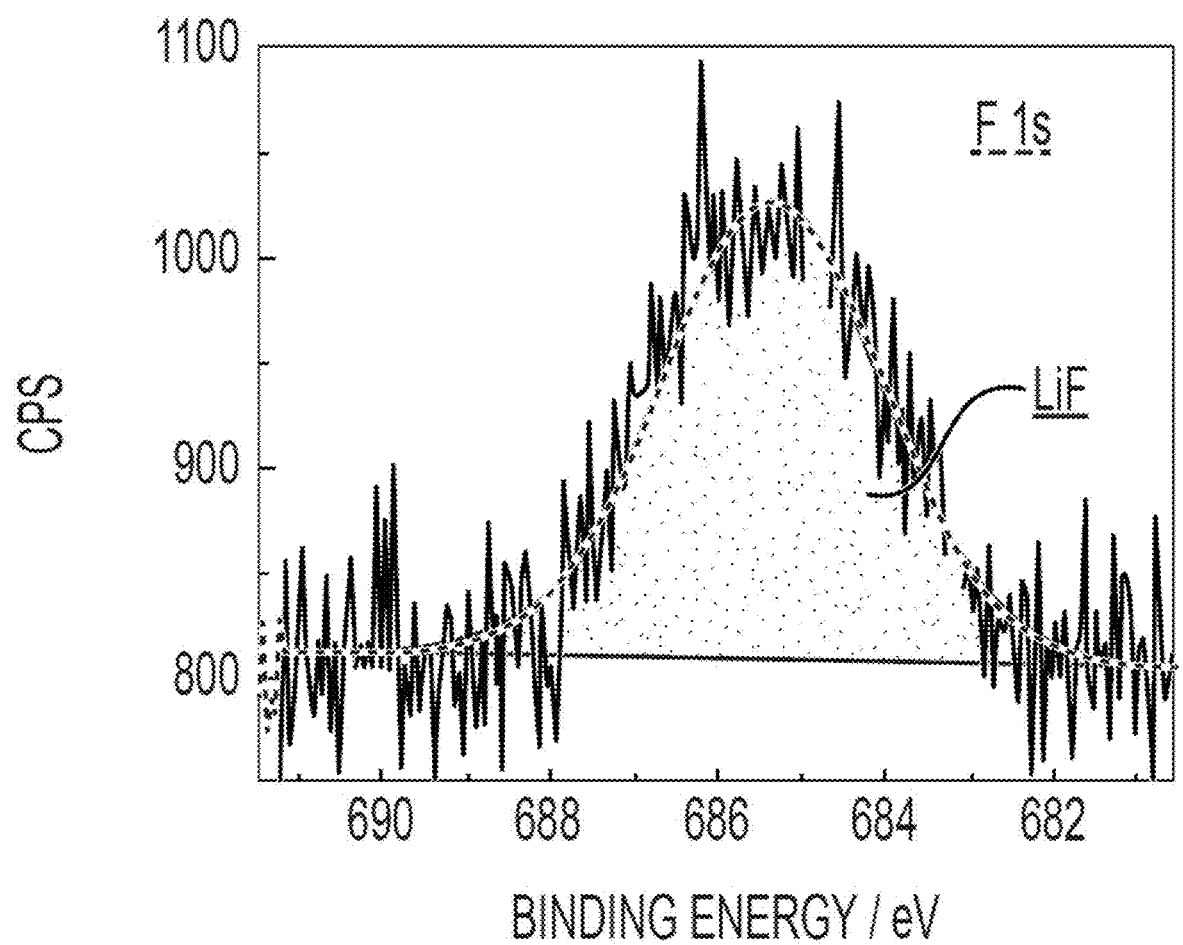
FIG. 6H shows F 1s XPS spectra of the lithium electrode in the Li/2PEG6k-75/Li cell after cycling after 1 minute of argon ion sputtering.
Figure 6I:
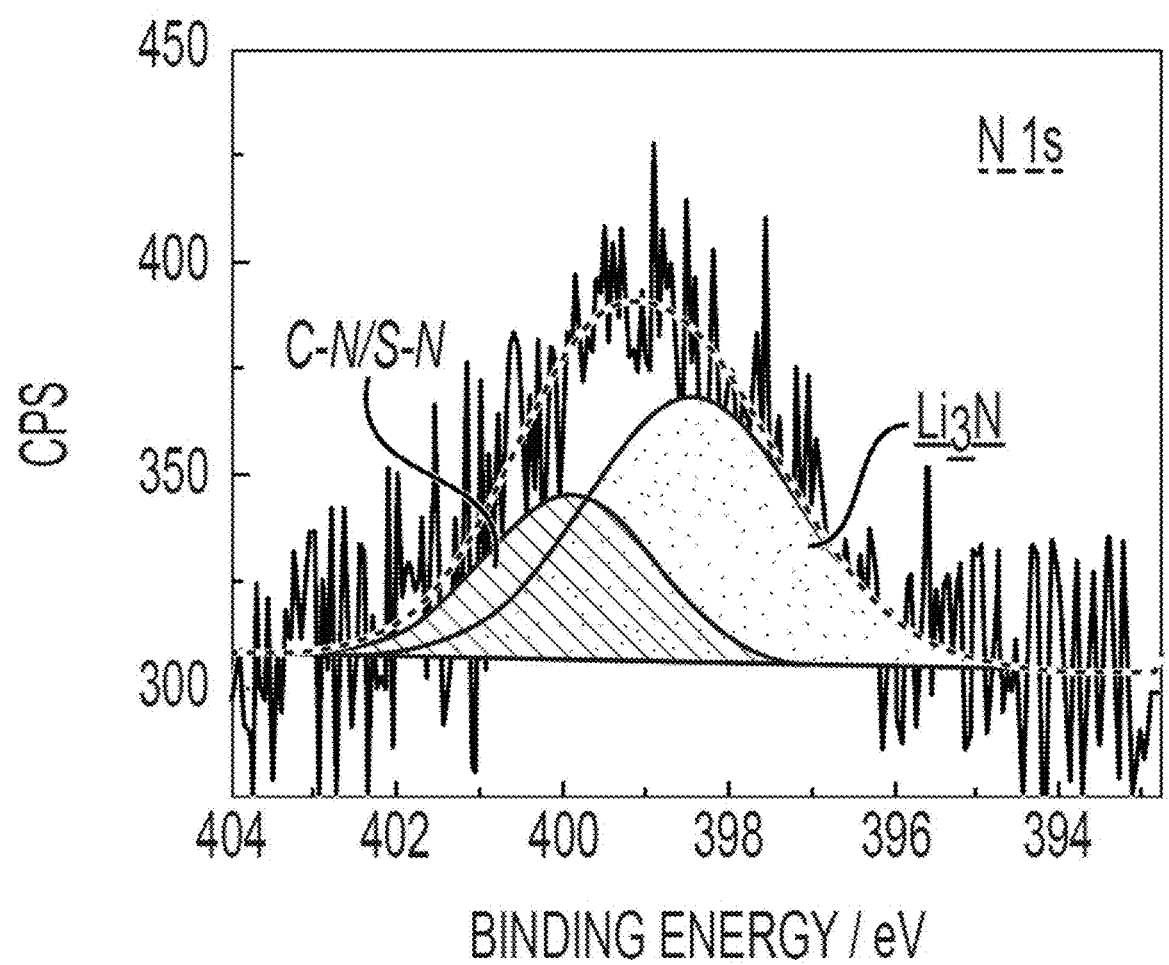
FIG. 6I shows N 1s XPS spectra of the lithium electrode in the Li/2PEG6k-75/Li cell after cycling after 1 minute of argon ion sputtering.
Figure 6J:
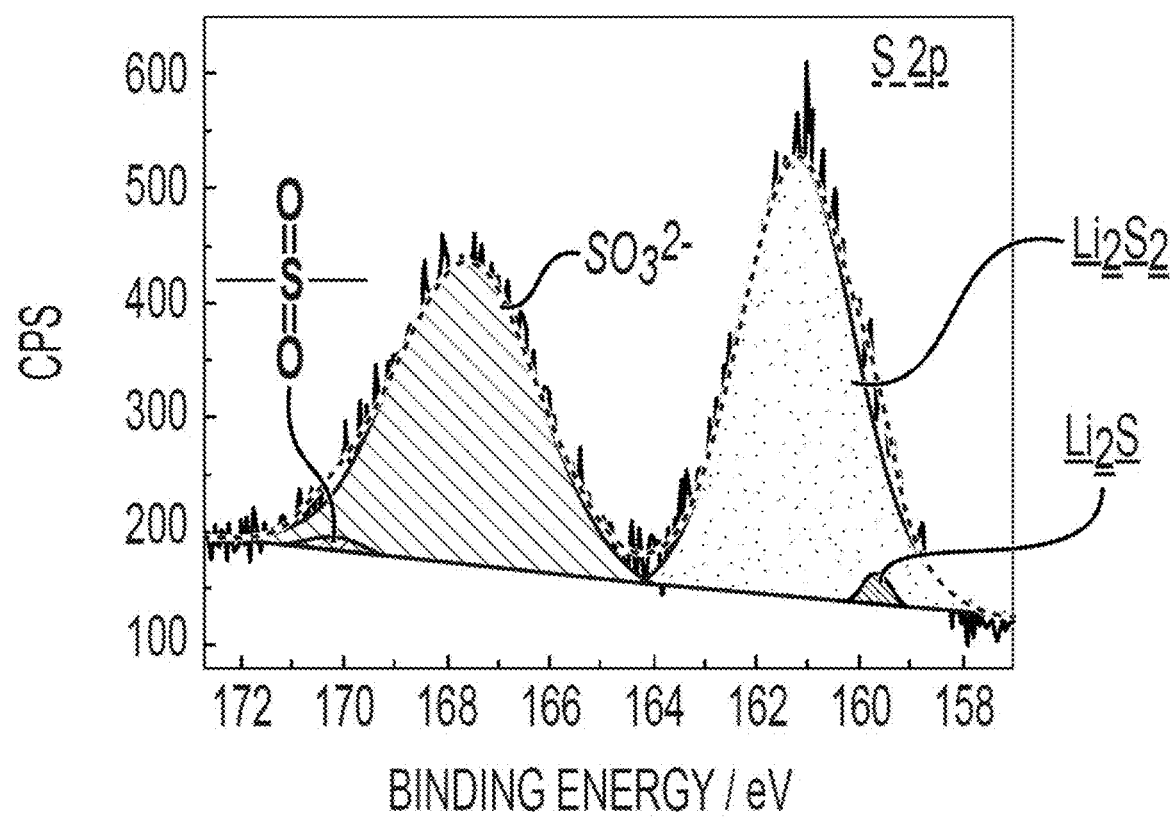
FIG. 6J shows S 2p XPS spectra of the lithium electrode in the Li/2PEG6k-75/Li cell after cycling after 1 minute of argon ion sputtering.

The temperature-dependence of the ionic conductivity for the GPE samples is shown in FIGS. 4A-4B, and the ionic conductivity values at 20° C. are presented in Table 1. Compared with IL-free SPE samples, incorporating 60 wt. % Li-IL in GPEs increases the ionic conductivity by two orders of magnitude. The curves are well fitted with the Vogel-Tammann-Fulcher (VTF) equation (Table 2), suggesting that the ionic conductivity behavior follows a chain reptation based mechanism as observed in other amorphous polymer electrolytes.[19, 18, 44, 45] Room temperature (20° C.) ionic conductivity of 0.61-0.75 mS cm$^{-1}$ was achieved for the three GPE samples. When increasing the Li-IL content to 83 wt. %, the ionic conductivity at 20° C. increases up to 1.22 mS cm$^{-1}$, which is among the highest values for IL-based GPEs (Table 2), and sufficiently high for LMB applications.

TABLE 2

VTF fitting parameters of the GPE samples.

| Sample | A (S cm$^{-1}$ K$^{1/2}$) | B (K) | T$_0$ (K) | E$_a$ (kJ mol$^{-1}$) |
|---|---|---|---|---|
| 4PEG2k-60 | 0.54 | 232.8 | 232.9 | 1.94 |
| 2PEG2k-60 | 0.37 | 137.2 | 258.5 | 1.14 |
| 2PEG6k-60 | 1.97 | 471.6 | 203.2 | 3.92 |
| 2PEG6k-83 | 0.90 | 299.9 | 213.8 | 2.49 |

Ionic conductivities of GPE samples are fit with the Vogel-Tammann-Fulcher (VTF) formula, $\sigma = A*T^{1/2}*\exp(-B/(T-T_0))$. The parameters A, B, and T$_0$ and activation energy E$_a$ are shown in Table 2.

5.3 V (vs. Li/Li$^+$), demonstrating superior electrochemical stability. The lithium ion transference number ($t_{Li+}$) of the GPE samples was tested using chronoamperometry and AC impedance, and the results are listed in Table 1. It is shown that although including the same amount of IL, GPE samples with different network structures display different $t_{Li+}$ values between 0.27 and 0.48, indicating that the network structure affects ion transport in GPEs. The dense network of 4PEG2k-60 limits the transport of IL cations and anions due to their larger sizes, and therefore increases the lithium ion transference number. Compared with 2PEG2k-60, increasing the PEG chain length enhances the polymer segmental motion and lithium ion mobility, resulting in slightly higher $t_{Li+}$ for 2PEG6k-60. In addition, when the IL content increases, the $t_{Li+}$ value decreases, which can be explained by the decrease of the lithium ion mole fraction in the GPE. [46]

TABLE 3

Comparison with previously reported ionic liquid-based GPEs.

| GPE | Mechanical properties | Symmetrical Li cell performance | Discharge capacity of Li/LiFePO$_4$ battery/mAh g$^{-1}$ |
|---|---|---|---|
| P(EO)$_{20}$LiTFSI/Pyr$_{13}$TFSI | | >300 h (60° C., 0.2 mA cm$^{-2}$, 1 h) | 40° C.: 148 (0.05 C), 135 (0.1 C), 98 (0.2 C), 90 (0.33 C) |
| P(EO)$_{10}$LiTFSI/Pyr$_{14}$TFSI | | | 20° C.: 138 (0.02 C) |
| APTES cross-linked polymer/LiTFSI/Pyr$_{13}$TFSI | | within 200 h at 40° C. and 0.1 mA cm$^{-2}$ | |
| PEO/PVdF-HFP/MMPIBF$_4$/LiBF$_4$ | | | |
| P([AMPS-Li]-VF)/Im$_{12}$TCM | | | |
| P(VdF-HFP)/BMITFSI/LiTFSI/BaTiO$_3$ | | | 25° C.: 165.8 (0.1 C) |
| PDADMATFSI/LiTFSI/Pyr$_{14}$TFSI | | >4200 h (40° C., 0.05 mA cm$^{-2}$, 1 h) | 40° C.: 148.4 (0.05 C), 144.1 (0.1 C), 135.3 (0.2 C), 51.1 (0.5 C) |
| UV cross-linked PEO/LiTFSI/Pyr$_{14}$TFSI | | >2000 h (40° C., 0.078 mA cm$^{-2}$, 1 h) | 40° C.: 164 (0.1 C); ~140 (0.2 C); ~75 (0.5 C); ~60 (1 C); ~50 (2 C) |
| PEO$_{18}$LiTFSI/PP$_{13}$TFSI | | >900 h (60° C., 0.3 mA cm$^{-2}$, 30 h); max: 60° C., 0.5 mA cm$^{-2}$, 2 h | |
| PVdF-HFP/Ig13TFSI/LiTFSI | | | 50° C.: 150 (0.1 C); 25° C.: 142 (0.1 C) |
| PEO$_{18}$LiTFSI/nano-silica/PP13TFSI | | >1800 h (60° C., 0.3 mA cm$^{-2}$, 30 h) | |
| P(EO)$_{20}$LiTFSI/S$_2$TFSI | | >200 h (45° C., 0.1 mA cm$^{-2}$, 1 h) | |
| PHEMO/PVDF-HFP/LiTFSI/EMITFSI | Tensile strength: 2.9-4.8 MPa | | 40° C.: 101.6 (0.1 C) |
| ionic monomer copolymer/nitrile butadiene rubber/Pyr$_{13}$FSI/LiTFSI | Tensile strength: 80 kPa, elongation: 60% | | 40° C.: 142 (0.02 C) |
| PVDF-HFP/3P(MPBIm-TFSI)/EMIm-TFSI/LiTFSI | Tensile strength: 8.6 MPa; elongation: 165% | | 30° C.: 120 (0.1 C); 50° C.: 151 (0.1 C); 140 (0.2 C); 124 (0.5 C); 101 (1 C) |
| PEG/silica/BMImTf/EMImTf/LiTf | Storage modulus: 10$^3$-10$^4$ Pa at 25° C. | 50 cycles (0.04 mA cm$^{-2}$, 1000 s Li) | |
| PDADMATFSI/P$_{111i4}$DMP/LiFSI/Al$_2$O$_3$ | Storage modulus 6.4 MPa at 30° C. and 4.4 MPa at 95° C. | >200 h (50° C., 0.05 mA cm$^{-2}$, 1 h) | |
| POSS/PEG/LiFSI/Pyr$_{13}$FSI | Tensile strength: 4.3 MPa; elongation: 812% | 20° C.: >6800 h (0.1 mA cm$^{-2}$, 3 h) >130 h (1 mA cm$^{-2}$, 1 h) | 0° C.: 85 (0.1 C); 20° C.: 145 (0.1 C); 141 (0.2 C); 114 (0.5 C); 99 (1 C); 72 (2 C); 90° C.: 161 (0.2 C); 151 (0.5 C); 135 (1 C) |

The electrochemical stability is another important property for electrolyte applications. As shown from the linear sweep voltammetry (LSV) curves in FIG. 4B, owing to the high anodic limit of Pyr$_{13}$FSI (5.37 V vs. Li/Li$^+$),[40] anodic stability limit potentials of GPE samples were greater than

TABLE 4

Short-circuit time $t_{sc}$, toughness, SEI conductivity $\sigma_{SEI}$ and ionic conductivity $\sigma$ of the GPE samples with 60 wt. % Li-IL.

| GPE | $t_{sc}$/h (0.1 mA cm$^{-2}$, 1 h) | Toughness/10$^4$ J m$^{-3}$ | $f_{max}$/Hz | $\sigma_{SEI}$/S cm$^{-1}$ | $\sigma$/mS cm$^{-1}$ |
|---|---|---|---|---|---|
| 4PEG2k-60 | >4000 | 5.5 | 790 | 2.2 × 10$^{-9}$ | 0.75 |
| 2PEG2k-60 | 230 | 9.4 | 357 | 1.0 × 10$^{-9}$ | 0.61 |
| 2PEG6k-60 | 2379 | 2605 | 629 | 1.7 × 10$^{-9}$ | 0.66 |

Figure 11:
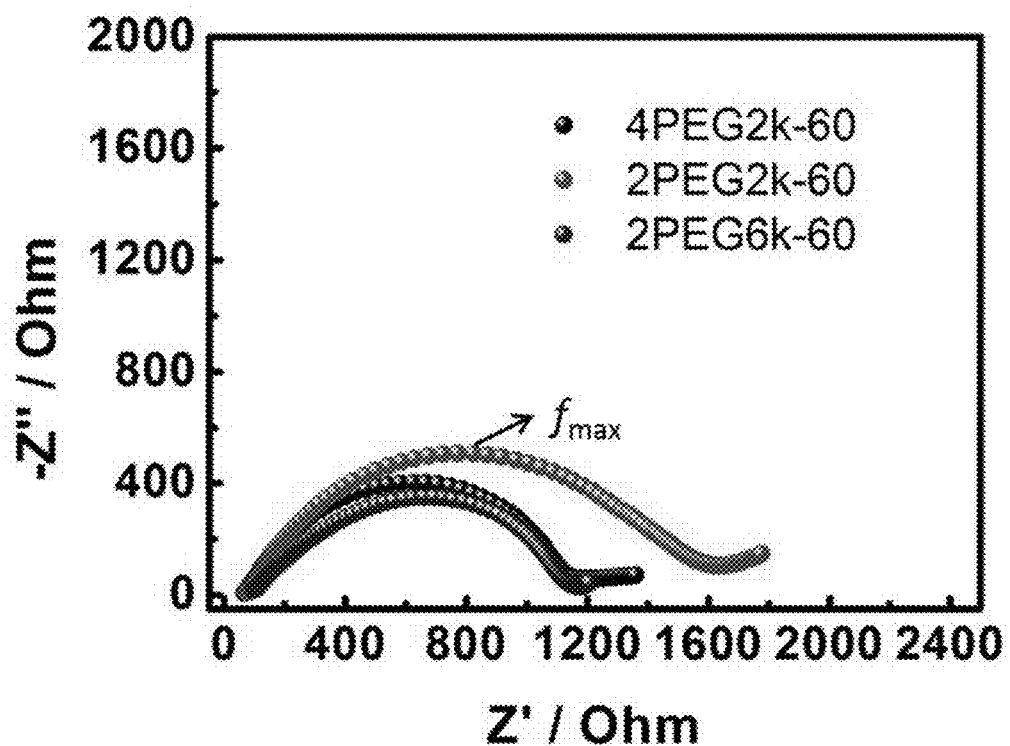
FIG. 11 shows Nyquist plots of the Li/GPE/Li cells before cycling at 20° C. with a 0.1 mA cm$^{-2}$ current density.
Figure 12A:
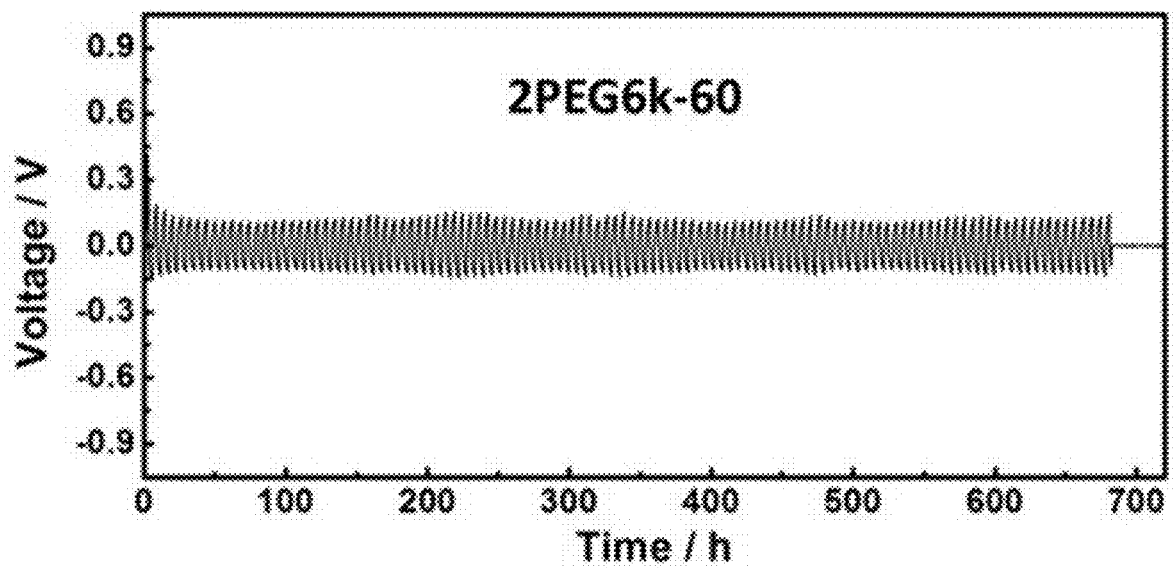
FIGS. 12A-12C show time dependent voltage profiles for symmetrical Li/GPE/Li cells at 20° C., under a current density of 0.1 mA chm$^{-2}$ with an areal capacity of 0.3 mAh cm$^{-2}$ for the 2PEG6k-60 sample in FIG. 12A, the 2PEG6k-75 sample in FIG. 12B, and the 2PEG6k-83 sample in FIG. 12C.
Figure 12B:
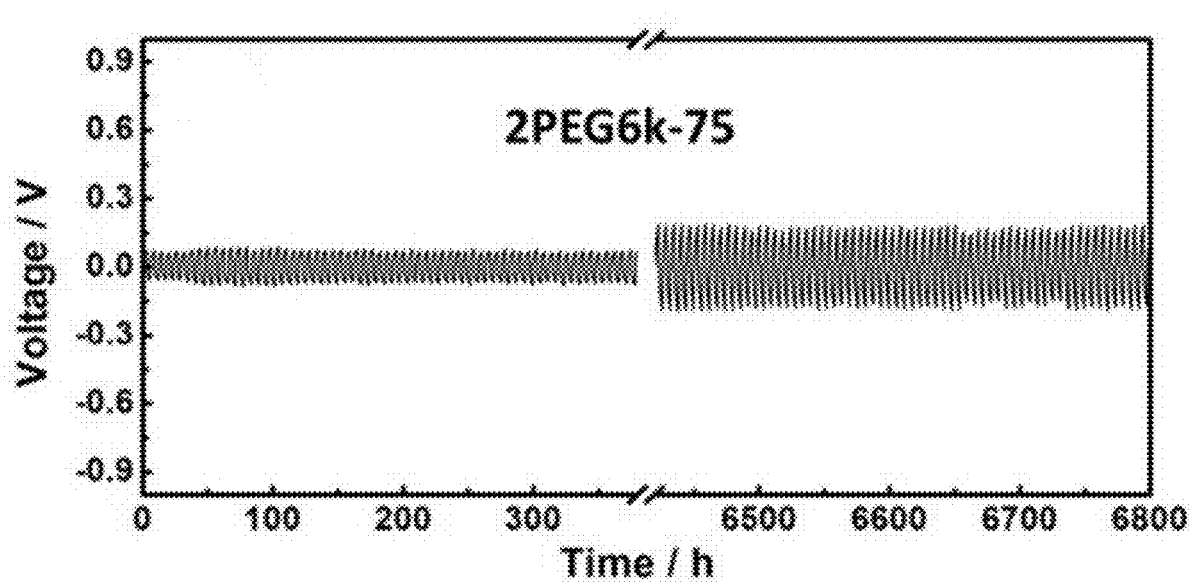
Figure 12C:
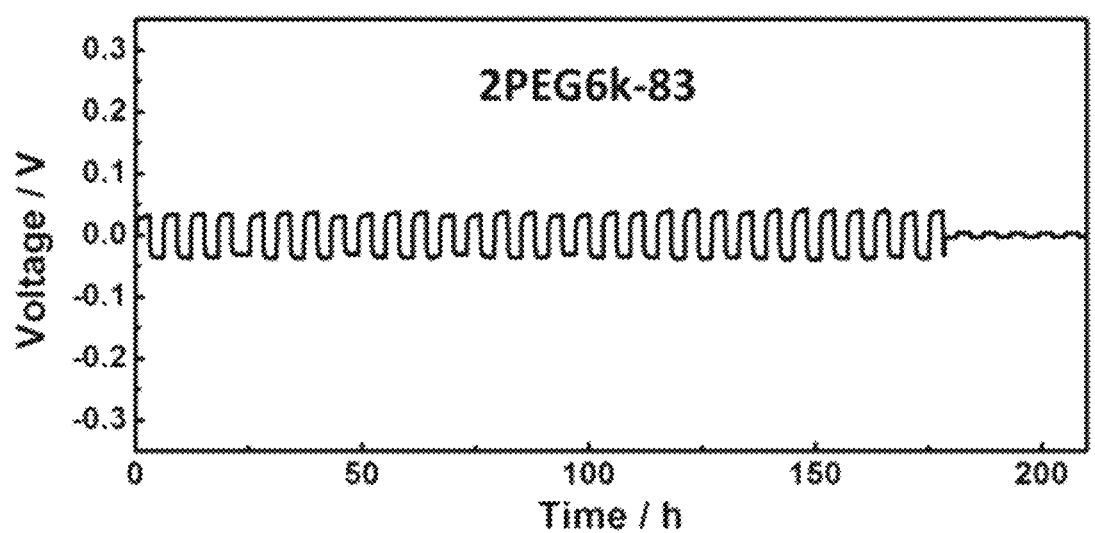
Figure 12D:
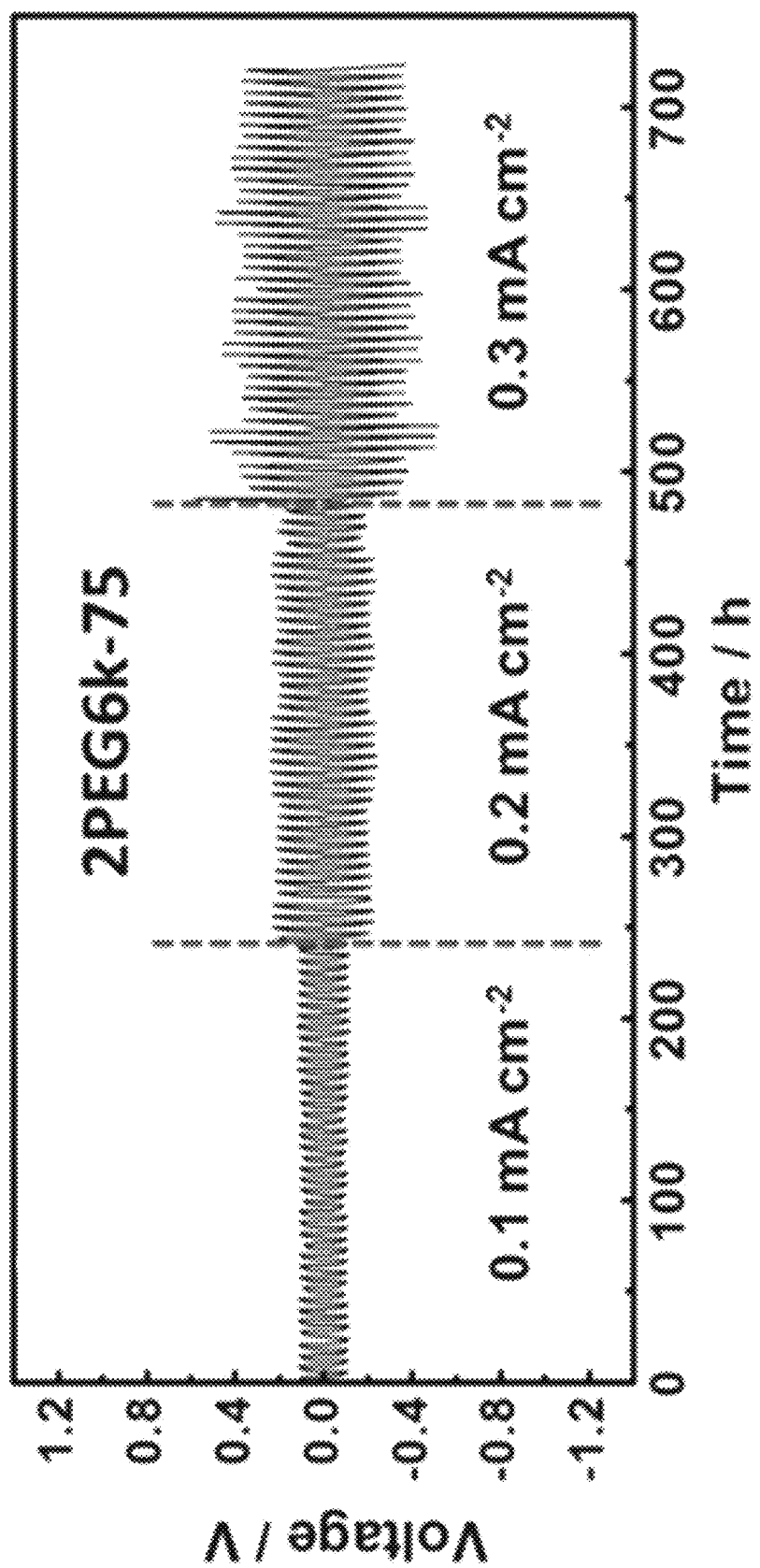
FIG. 12D shows time dependent voltage profiles for symmetrical Li/GPE/Li cells at 20° C. with the 2PEG6k-75 sample at current densities of 0.1 mA cm$^{-2}$, 0.2 mA cm$^{-2}$ and 0.3 mA cm$^{-2}$, with 3-h charge/discharge cycling.

Symmetrical lithium cells were tested with galvanostatic cycling to study the lithium electrodeposition behavior with the prepared GPEs. FIG. 5A-5F shows the voltage-time profiles of symmetrical lithium cells with prepared GPEs at 20° C. under 0.1 mA cm$^{-2}$ with the areal capacity of 0.1 mAh cm$^{-2}$. In order to correlate the cycling performance with the properties of the GPE and/or the GPE/Li interface, the short-circuit time $t_{sc}$ and related materials characteristics are summarized and plotted in Table 4 and FIGS. 5E-5Fe-f). The SEI layer conductivity $\sigma_{SEI}$ was obtained from the following equation[47-49]

$$\sigma_{SEI} = 2\pi f_{max} \varepsilon_0 \varepsilon_r \quad (1)$$

in which $f_{max}$ is the peak frequency of the arc corresponding to the interfacial resistance in the Nyquist plots (FIG. 11), $\varepsilon_0$ is the free space permittivity, and the SEI layer permittivity $\varepsilon_r = 5$ is adopted.[48, 49] Among the three GPE samples with 60 wt. % Li-IL, the cell containing 4PEG2k-60 with small mesh size and dense network delivered the best cycling performance, which was stable even after over 4000 h of cycling. From FIGS. 5E-5F it can be concluded that using the present cycling procedure (0.1 mA cm$^{-2}$, 0.1 mAh cm$^{-2}$), that the cycling performance is determined by the ionic conductivity of the GPE and SEI layer rather than mechanical properties (Young's modulus or toughness). Deriving from the soft network and improved Li$^+$ transport ability, a better contact with lithium and more ionic conductive SEI layer was formed for the 4PEG2k-60 and 2PEG6k-60 samples as compared with the 2PEG2k-60 sample,[32] resulting in a much longer cycle life. Due to the high ionic conductivity and good interfacial property, the cell with 2PEG6k-83 sample exhibited stable cycling even when the current density increased to 1.0 mA cm$^{-2}$, which is a very high current density for IL-based GPEs (Table 3). More importantly, this excellent cycling was performed at 20° C., demonstrating the superior performance of the present GPEs compared with the previously reported results that were obtained in tests conducted at temperatures above 40° C.[28, 30, 31, 50] When the cells were cycled at harsher electrochemical conditions with the areal capacity increasing to 0.3 mAh cm$^{-2}$, the mechanical strength played an important role, and only samples with the 2PEG6k network exhibited long and stable cycling (FIG. 12). Compared with the 2PEG6k-60 sample, the 2PEG6k-75 sample which had a higher Li-IL content showed a much longer cycling life of over 6800 h, which can be related to the increased conductivity. Further increasing the Li-IL content to 83 wt. % will decrease the $t_{sc}$. Therefore, with this cycling procedure (0.1 mA cm$^{-2}$, 0.3 mAh cm$^{-2}$), the cycling performance of symmetrical lithium cells is affected by the combination of the mechanical strength and the conductivity of the GPEs and the GPE/Li interface, and the extremely long cycling life indicates the ultra-stability of the hybrid network-based GPEs with lithium, as well as excellent lithium dendrite resistance.

To further investigate the SEI of Li and GPEs, a Li/2PEG6k-75/Li cell was disassembled after cycling to evaluate the surface chemistry of the lithium electrode by X-ray photoelectron spectroscopy (XPS), and the results are shown in FIGS. 6A-6I. The SEI layer formed on the lithium electrode surface was found to be composed of organic species including aliphatic carbon (C—C), ether carbon (C—OR), ROLi and ROCO$_2$Li, and inorganic species including Li$_2$O, LiF, LiOH, Li$_2$S$_2$, Li$_2$S, Li$_2$SO$_3$, Li$_2$CO$_3$ and Li$_3$N. After sputtering with an argon ion gun for 1 minute to remove excess organic components, few changes were observed for the SEI components except that the weak signal from LiFSI disappeared due to the removal of residual LiFSI or its intermediate decomposition product, which confirmed stable SEI formation. Compared with the hybrid network POSS-PEG SPEs with LiTFSI as the lithium salt, [32] for the present hybrid network-RTIL GPE, the signals of C 1s and O 1s are lower, while the signals of F 1s, S 2p and N 1s are higher, indicating higher contents of LiF, Li$_2$S$_2$/Li$_2$S, Li$_2$SO$_3$ and Li$_3$N in the SEI layer. Pyr$_{13}$FSI and LiFSI employed in the GPEs are responsible for this inorganic-rich SEI, which is beneficial for forming a stable and uniform SEI layer, improving the stability of lithium electrodeposition and preventing lithium dendrite growth.[51-53]

Figure 7A:
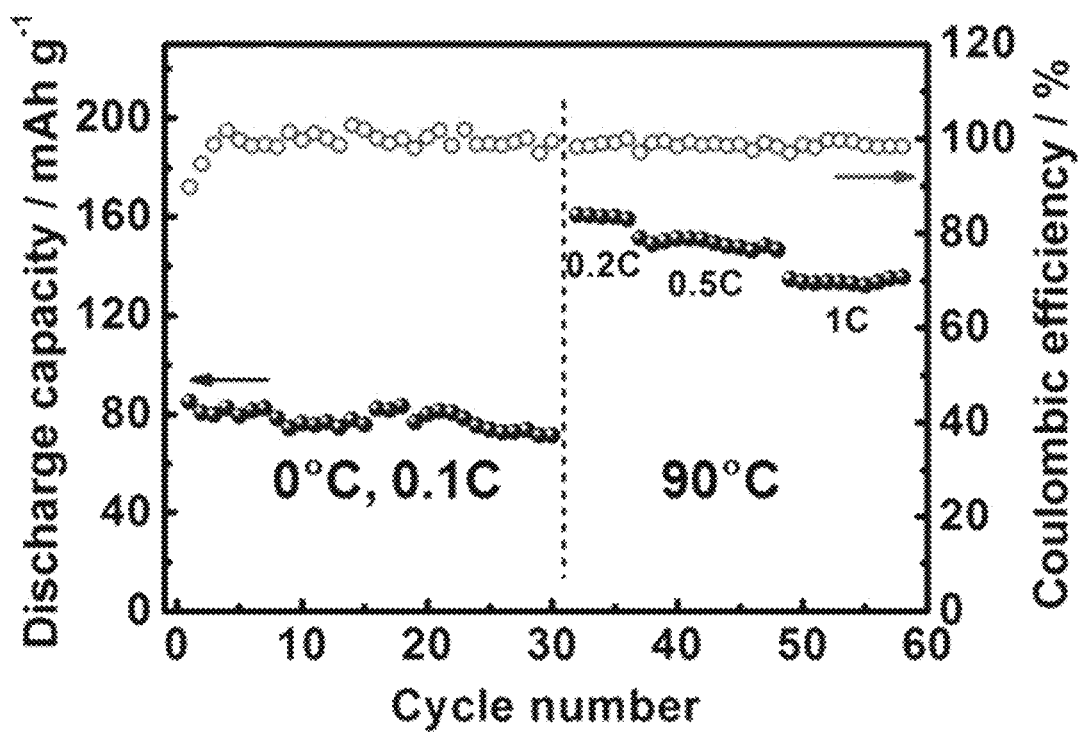
FIG. 7A shows the discharge capacity and Coulombic efficiency performance of Li/GPE/LiFePO$_4$ batteries at 0° C., under different current rates.
Figure 7B:
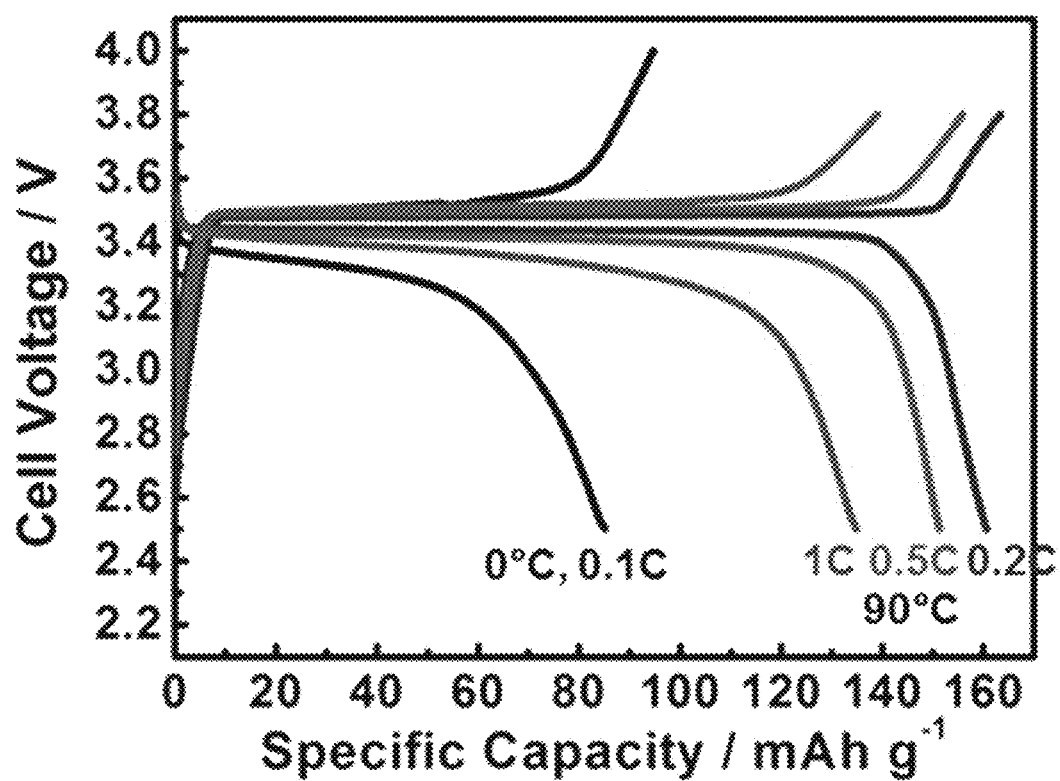
FIG. 7B shows the charge-discharge profile performance of Li/GPE/LiFePO$_4$ batteries at 0° C. and 90° C., under different current rates.
Figure 7C:
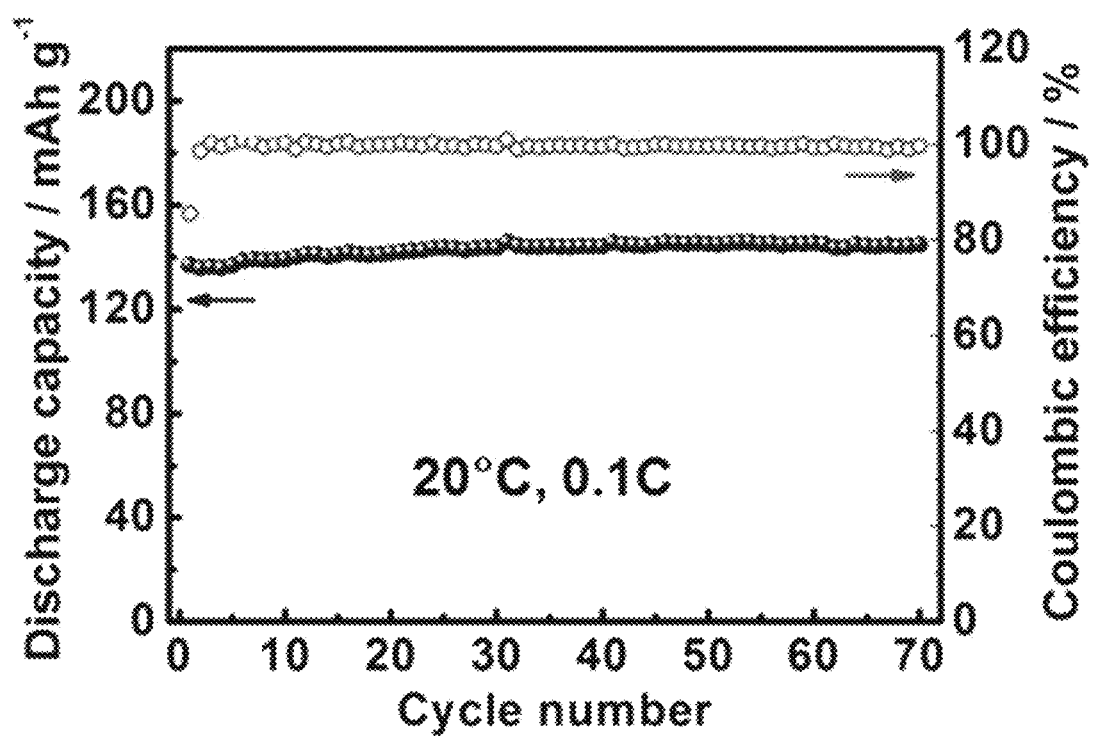
FIG. 7C shows the discharge capacity and Coulombic efficiency performance of Li/GPE/LiFePO$_4$ batteries at 20° C. under a 0.1C rate.

A wide applicable temperature range is needed for use in handheld devices and outdoor applications. To evaluate the application of as-prepared GPE in LMBs, Li/LiFePO$_4$ batteries were assembled with the 2PEG6k-83 GPE sample as the electrolyte and cycled at different temperatures, and the results are shown in FIG. 7A-7F. FIGS. 7A-7B show that the battery can deliver a discharge capacity of over 80 mAh g$^{-1}$ even at 0° C. under a 0.1 C rate, which is attributed to the high ionic conductivity (0.55 mS cm$^{-1}$ at 0° C.) of the 2PEG6k-83 GPE sample. When the temperature was increased to 90° C., discharge capacities of 160.6, 151.3 and 134.8 mAh g$^{-1}$ under 0.2 C, 0.5 C and 1 C were obtained, confirming the high thermal stability of the GPE and the LMB system. To date, reports on IL-based GPEs mainly focus on the battery application at around 40° C. (Table 3). These results show that the present invention can be used to significantly broaden the applicable temperature range of LMBs. When cycled at 20° C. under a 0.1 C rate (FIG. 7C, the battery delivered an initial discharge capacity of 137.0 mAh g$^{-1}$ and exhibited an 85.4% Coulombic efficiency. The initial capacity loss is ascribed to SEI film formation on the electrodes surface. The battery exhibited good capacity retention with a stable discharge capacity of about 145 mAh g$^{-1}$ over 70 cycles, and the average Coulombic efficiency was 99.7% after the initial two cycles, indicating highly reversible Li$^+$ extraction/insertion behavior during cycling. [54]

Figure 7D:
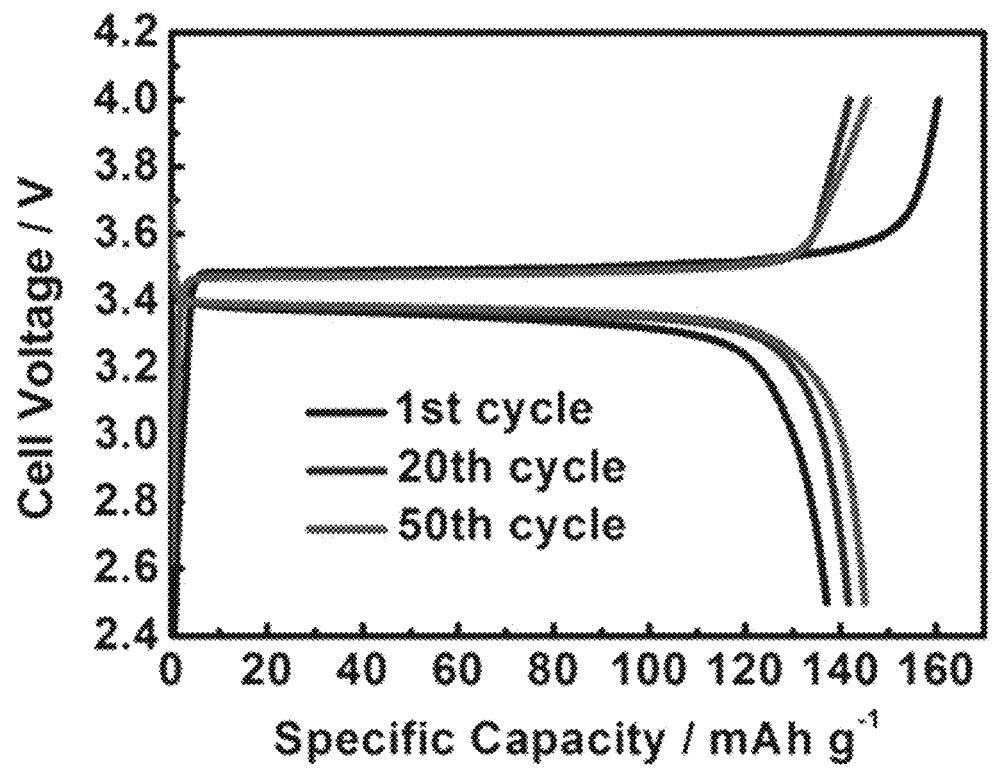
FIG. 7D shows the charge-discharge profile performance of Li/GPE/LiFePO$_4$ batteries at 90° C., under a 0.1C rate.
Figure 7E:
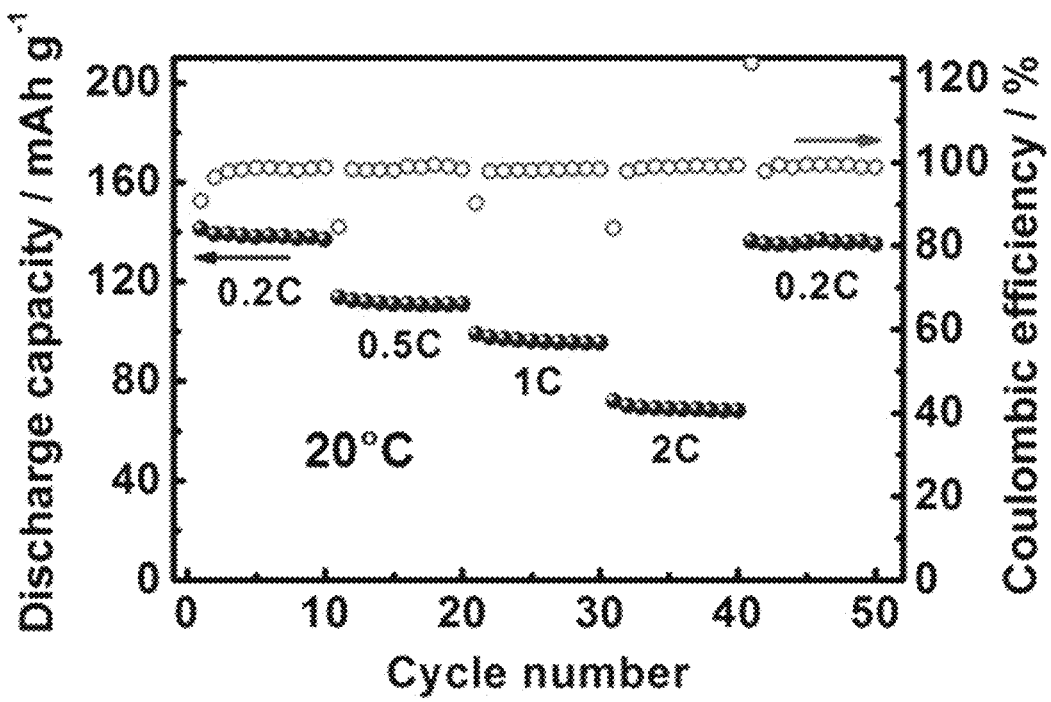
FIG. 7E shows the discharge capacity and Coulombic efficiency performance of Li/GPE/LiFePO$_4$ batteries at 20° C. under different current rates.
Figure 7F:
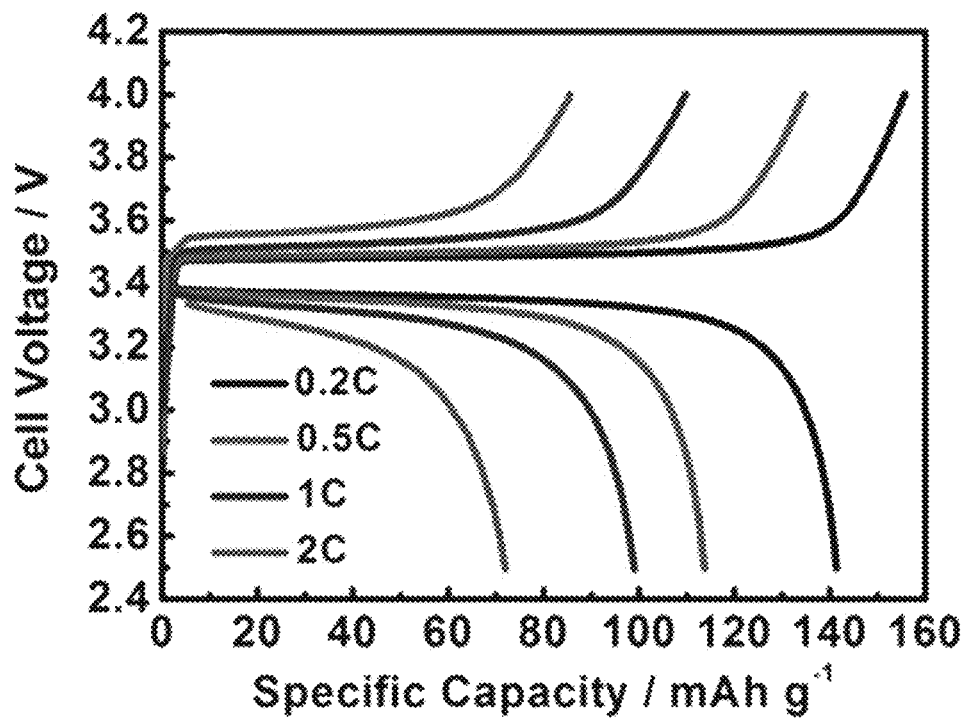
FIG. 7F shows the charge-discharge profile performance of Li/GPE/LiFePO$_4$ batteries at 20° C., under different current rates.
Figure 8A:
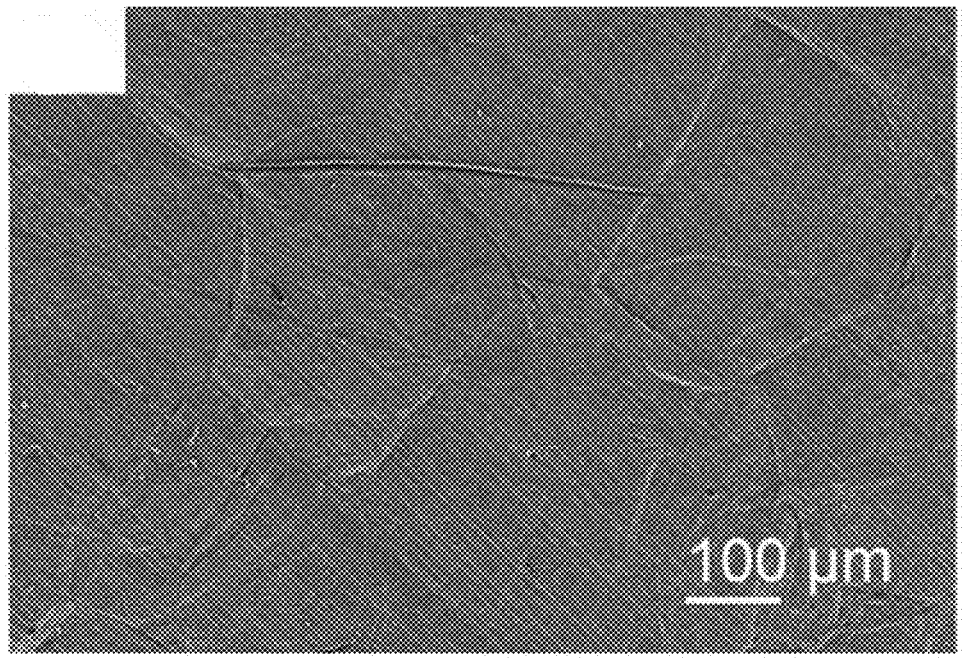
FIGS. 8A and 8B show SEM images of lithium surfaces before cycling.
Figure 8B:
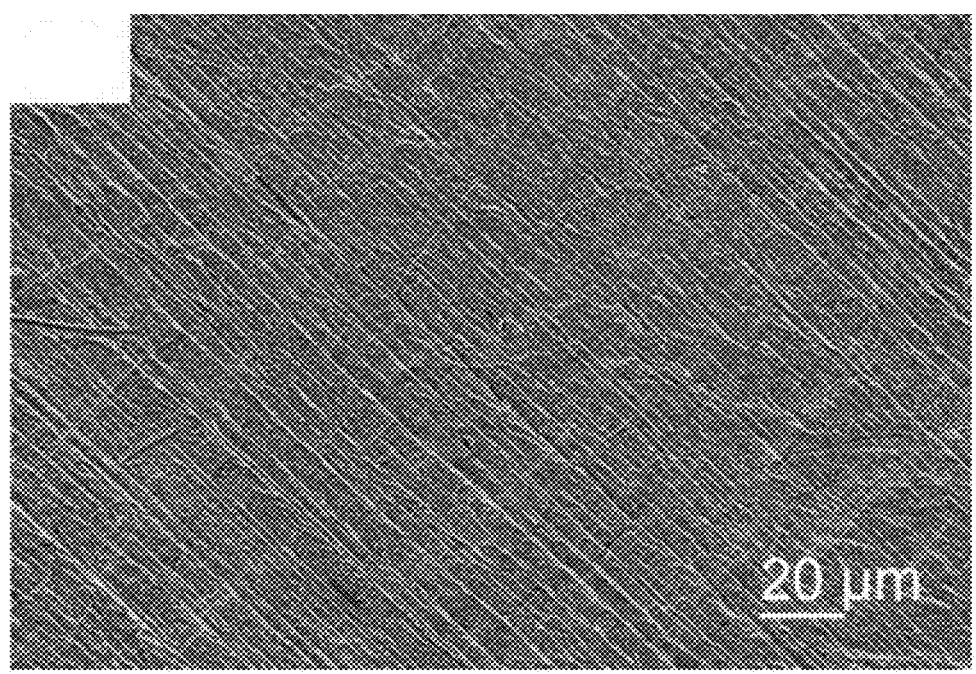
Figure 8C:
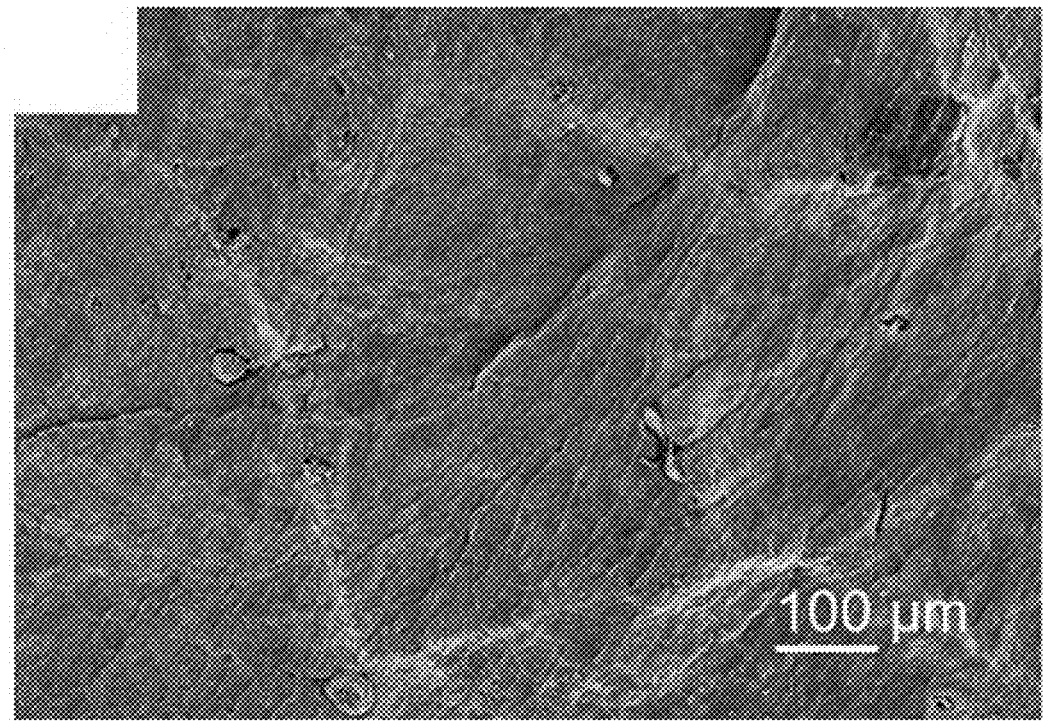
FIGS. 8C and 8D show SEM images of lithium surfaces after rate cycling at 20° C.
Figure 8D:
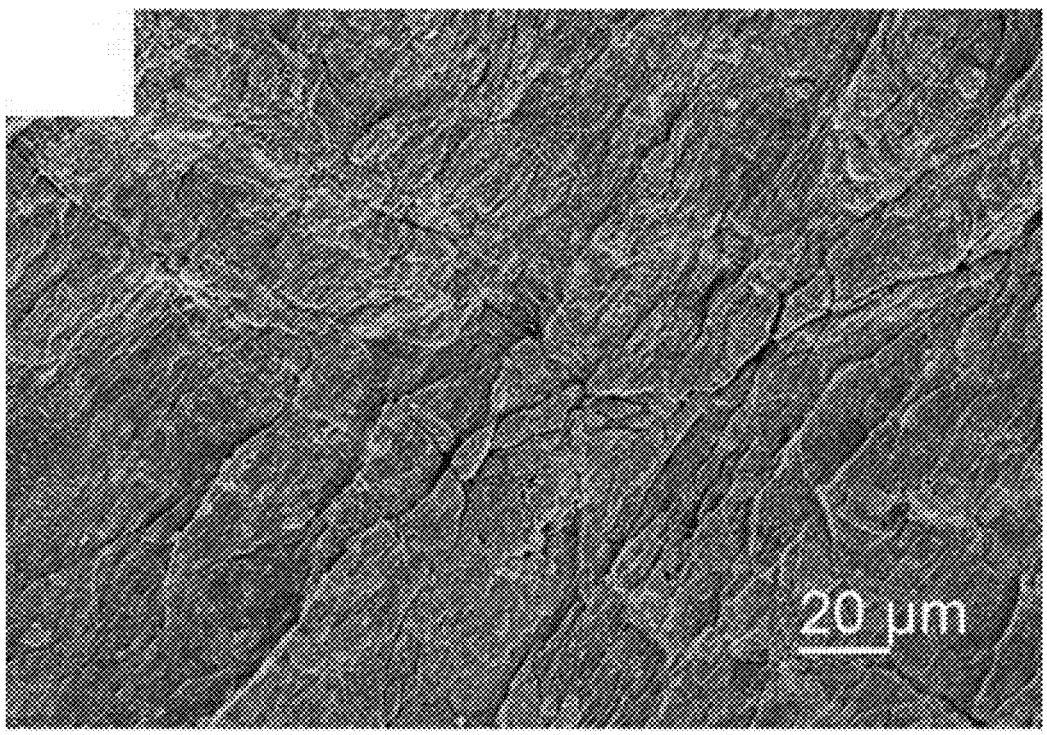
Figure 13:
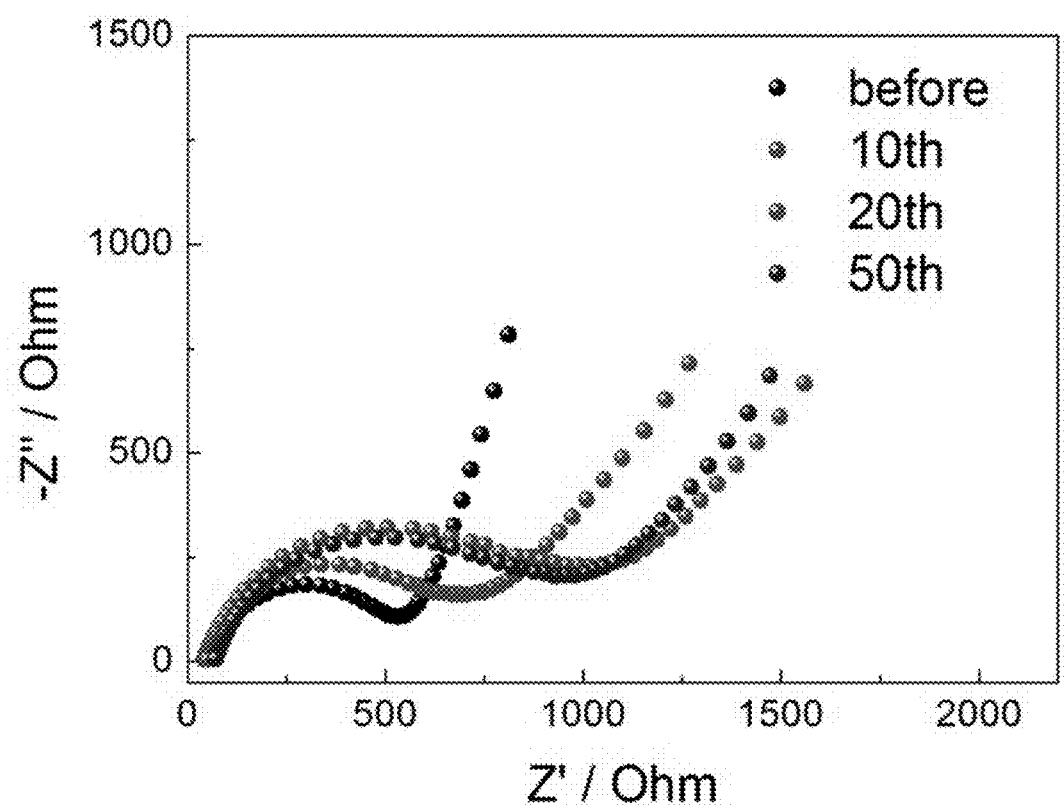
FIG. 13 shows Nyquist plots of the Li/GPE/LiFePO$_4$ cells after different numbers of cycles with a 0.1C rate at 20° C.
Figure 14A:
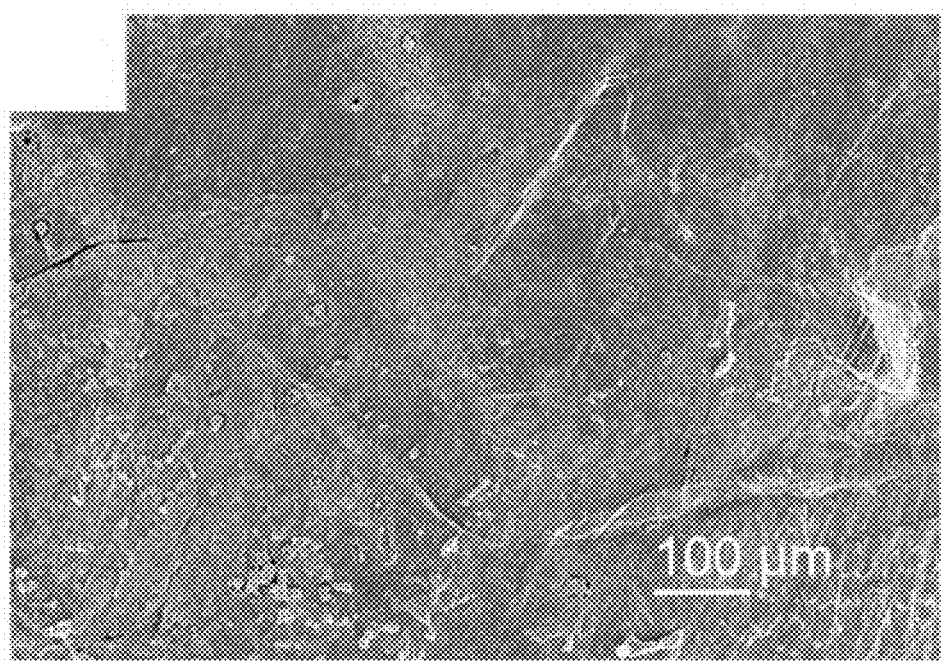
FIGS. 14A-14B show SEM images of lithium anode surfaces after cycling at 0° C.
Figure 14B:
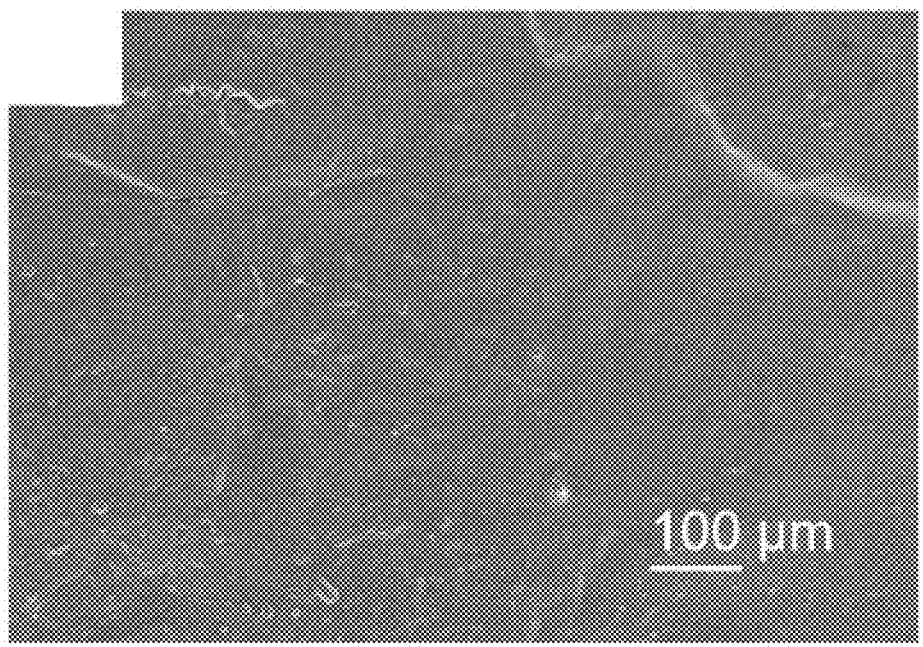

FIG. 7D shows voltage profiles under s 0.1C rate at different cycles. The charge/discharge potential plateaus were observed at 3.5/3.4 V (vs. Li/Li$^+$), a typical charge-discharge behavior for Li/LiFePO$_4$ batteries,[18, 44, 54] and remained unchanged with ongoing cycling. Electrochemical impedance spectra (FIG. 13) showed that the bulk resistance of the electrolyte, which corresponds to the intercept at the high frequency, remained constant during cycling, indicating good stability of the GPE. The interface resistance corresponding to the semicircle at the medium frequency first increases slowly, and then remains stable, indicating stable SEI films formed on the electrodes, which leads to favorable cycling performance FIGS. 7E and 7F show the rate capability test results at 20° C. Stable discharge capacity was obtained at each current rate with continued cycling. The discharge capacities were 141.4, 113.7, 99.0 and 72.0 mAh g$^{-1}$ at 0.2 C, 0.5 C, 1 C and 2 C, respectively, and the batteries recovered the initial value when the current rate returned to 0.2 C after cycling at higher rates. FIG. 7F also shows that the discharge plateau potentials declined slightly when the current rate was increased, and are located at 3.36, 3.35, 3.32 and 3.25 V (vs. Li/Li$^+$) at 0.2 C, 0.5 C, 1 C and 2 C, respectively, which results from the increased polarization potentials at high current rate. [44]

Figure 15:
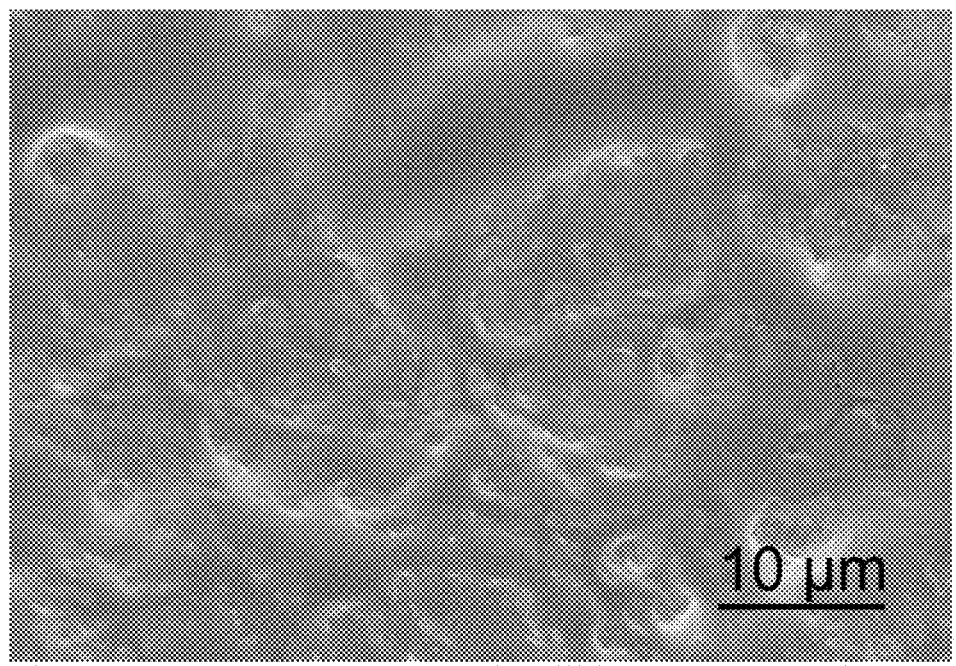
FIG. 15 shows an SEM image of the GPE surface after a rate test at 20° C.
Figure 16A:
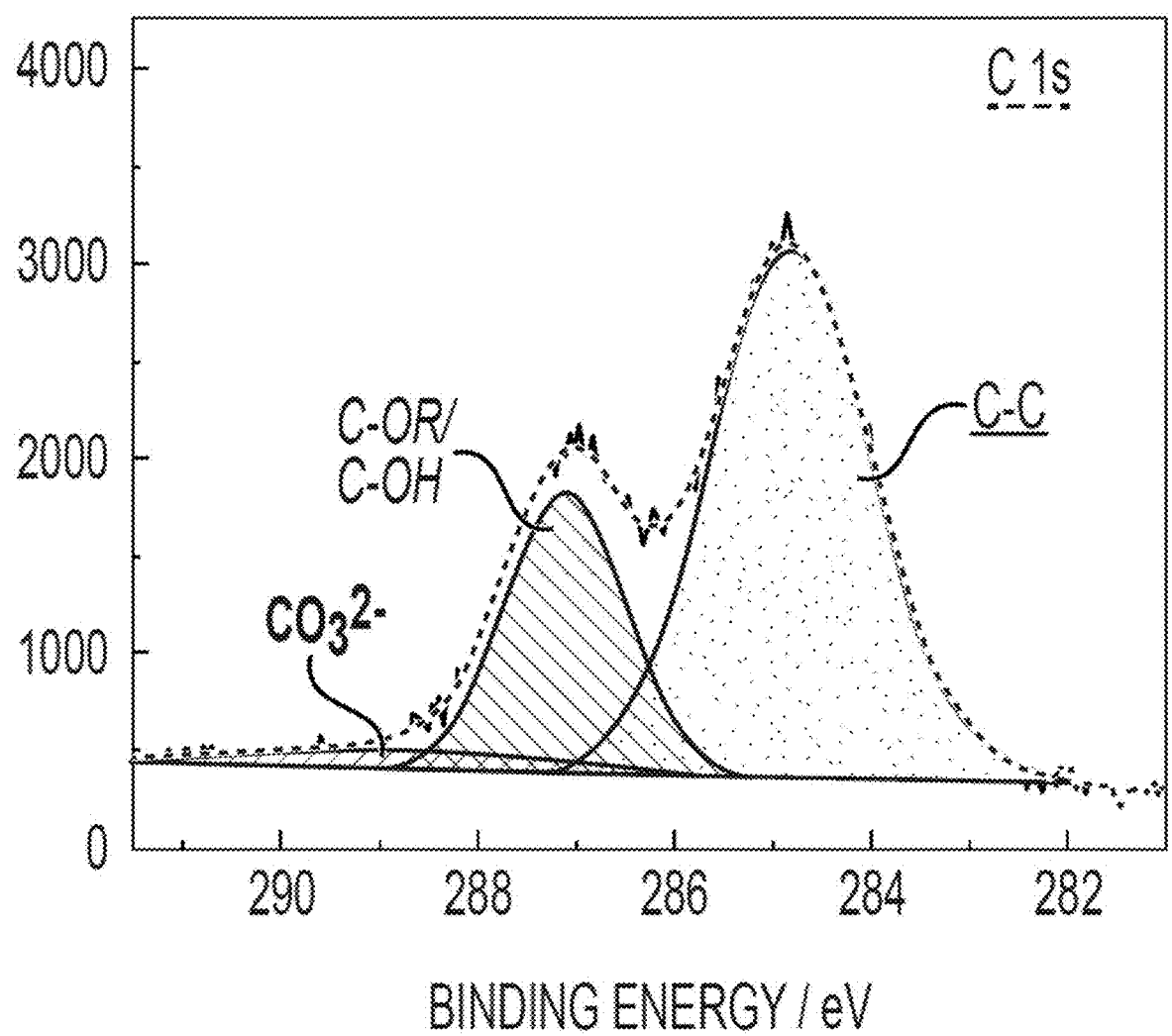
FIG. 16A shows C 1s XPS spectra of GPE surface after a rate test at 20° C.
Figure 16B:
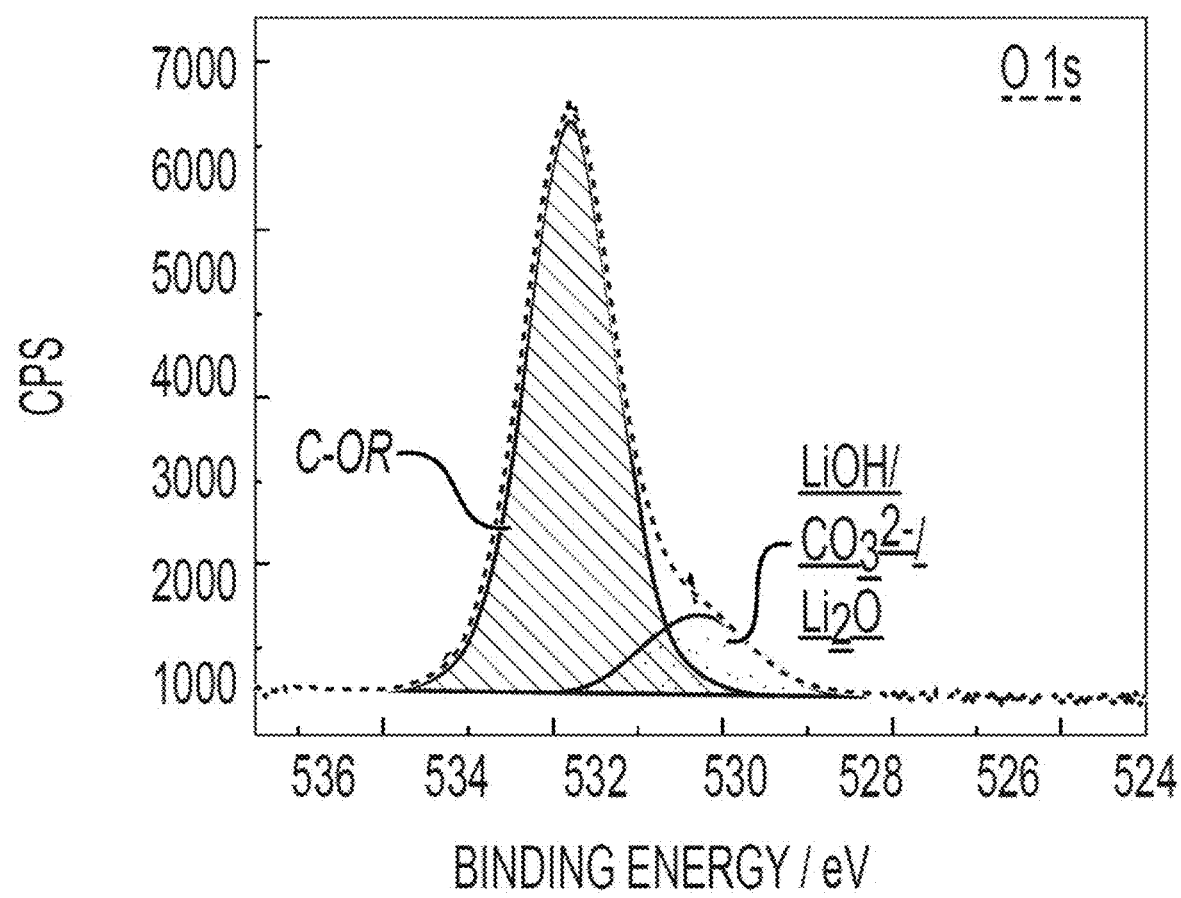
FIG. 16B shows O 1s XPS spectra of GPE surface after a rate test at 20° C.
Figure 16C:
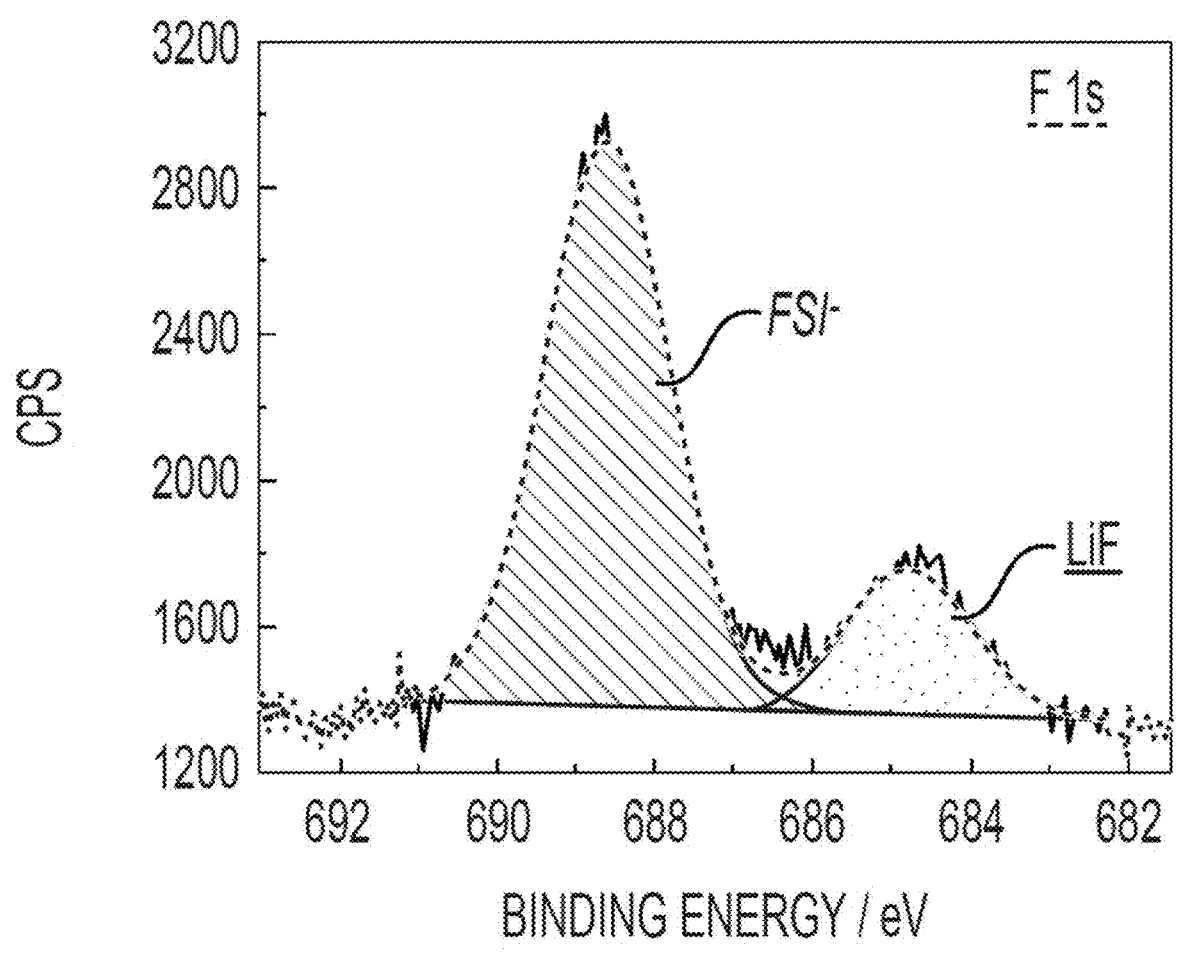
FIG. 16C shows F 1s XPS spectra of GPE surface after a rate test at 20° C.
Figure 16D:
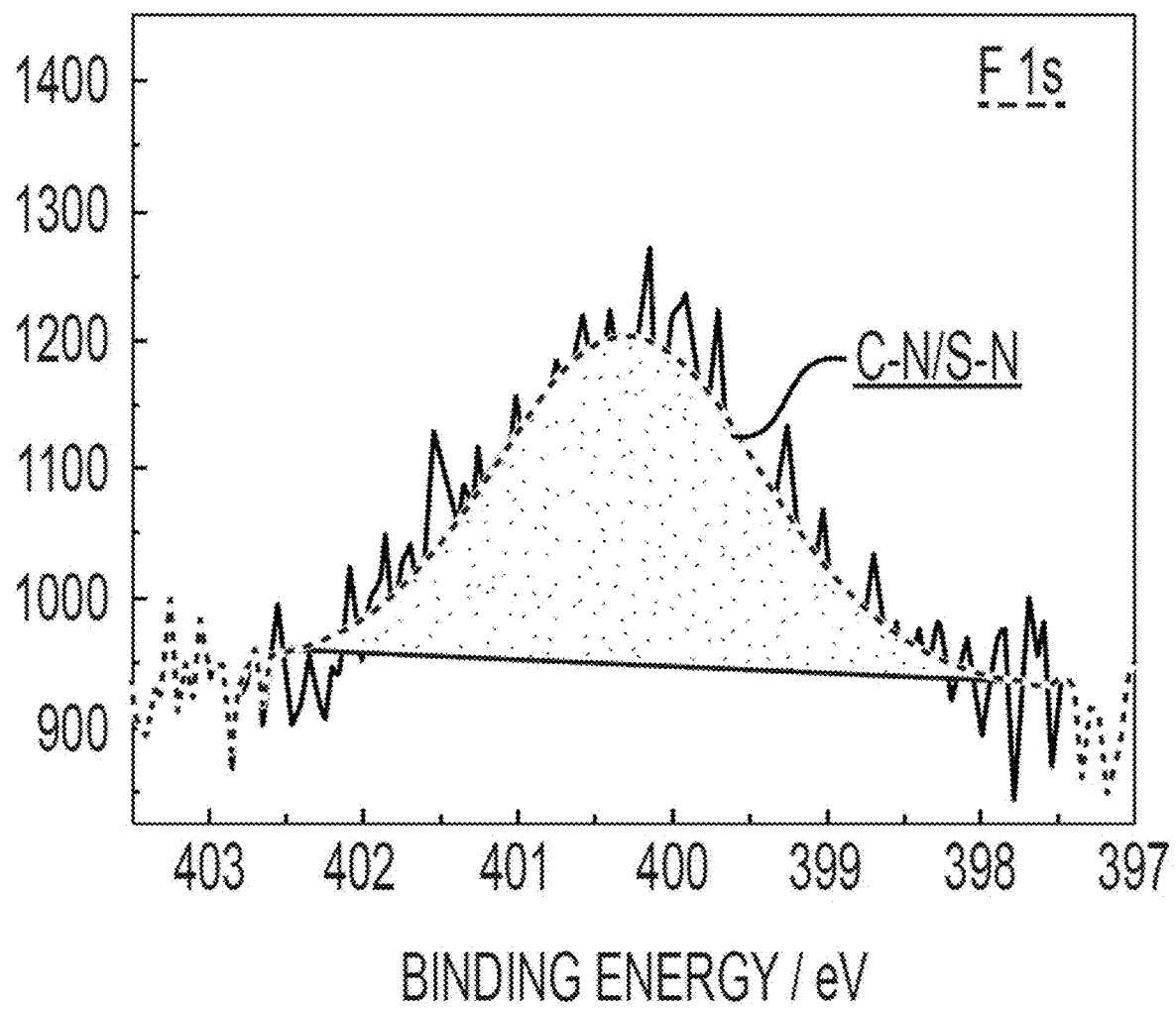
FIG. 16D shows N 1s XPS spectra of GPE surface after a rate test at 20° C.
Figure 16E:
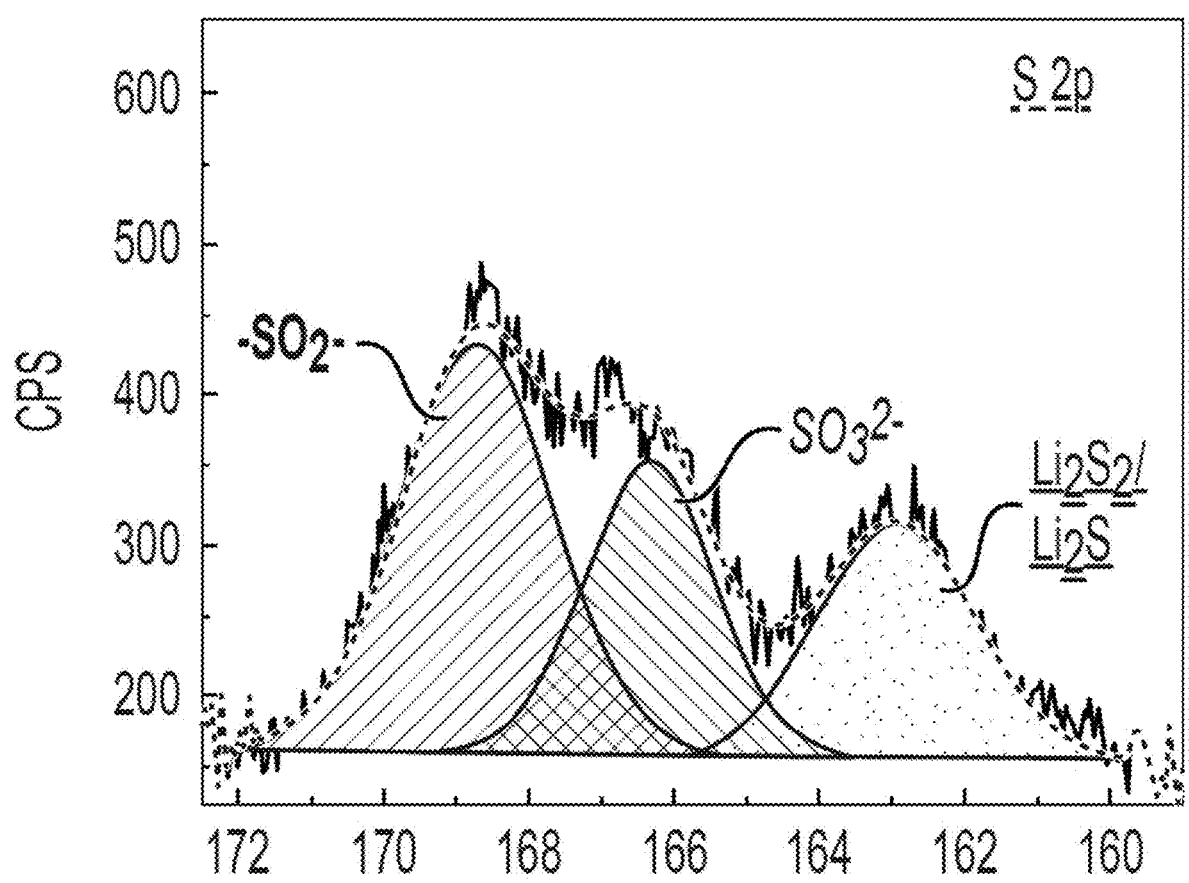
FIG. 16E shows S 2p XPS spectra of GPE surface after a rate test at 20° C.
Figure 17:
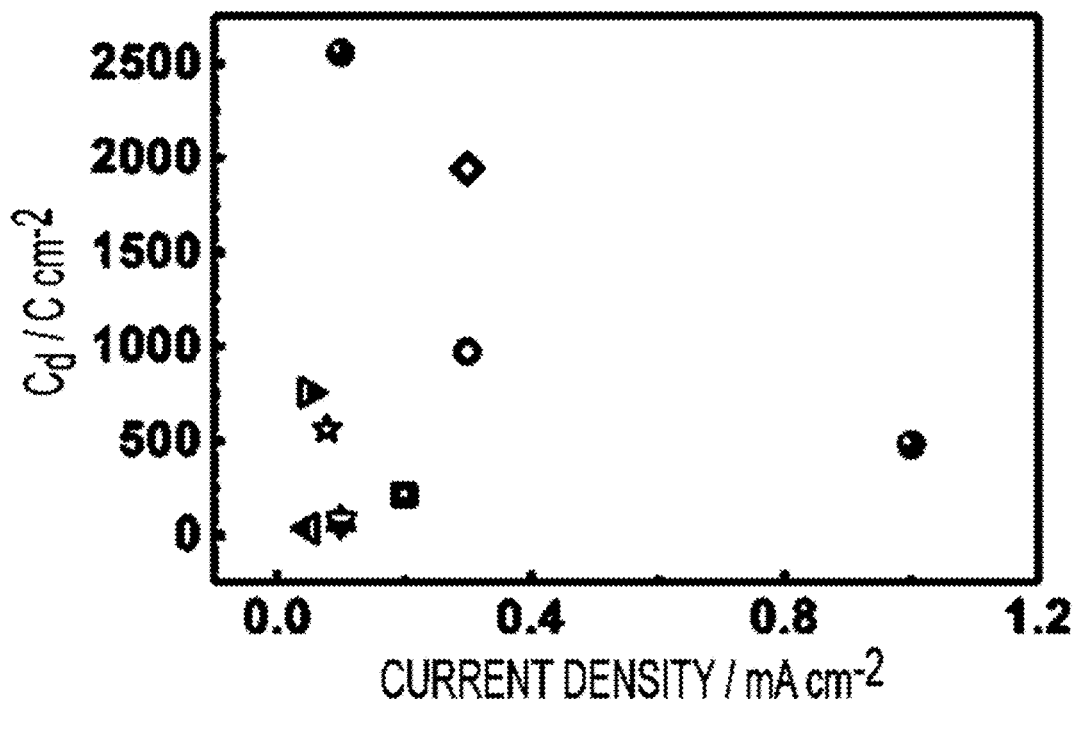
FIG. 17 shows a comparison of symmetrical lithium cell performance for a hybrid network-RTIL GPE with state-of-art ionic liquid-based GPEs.
Figure 18:
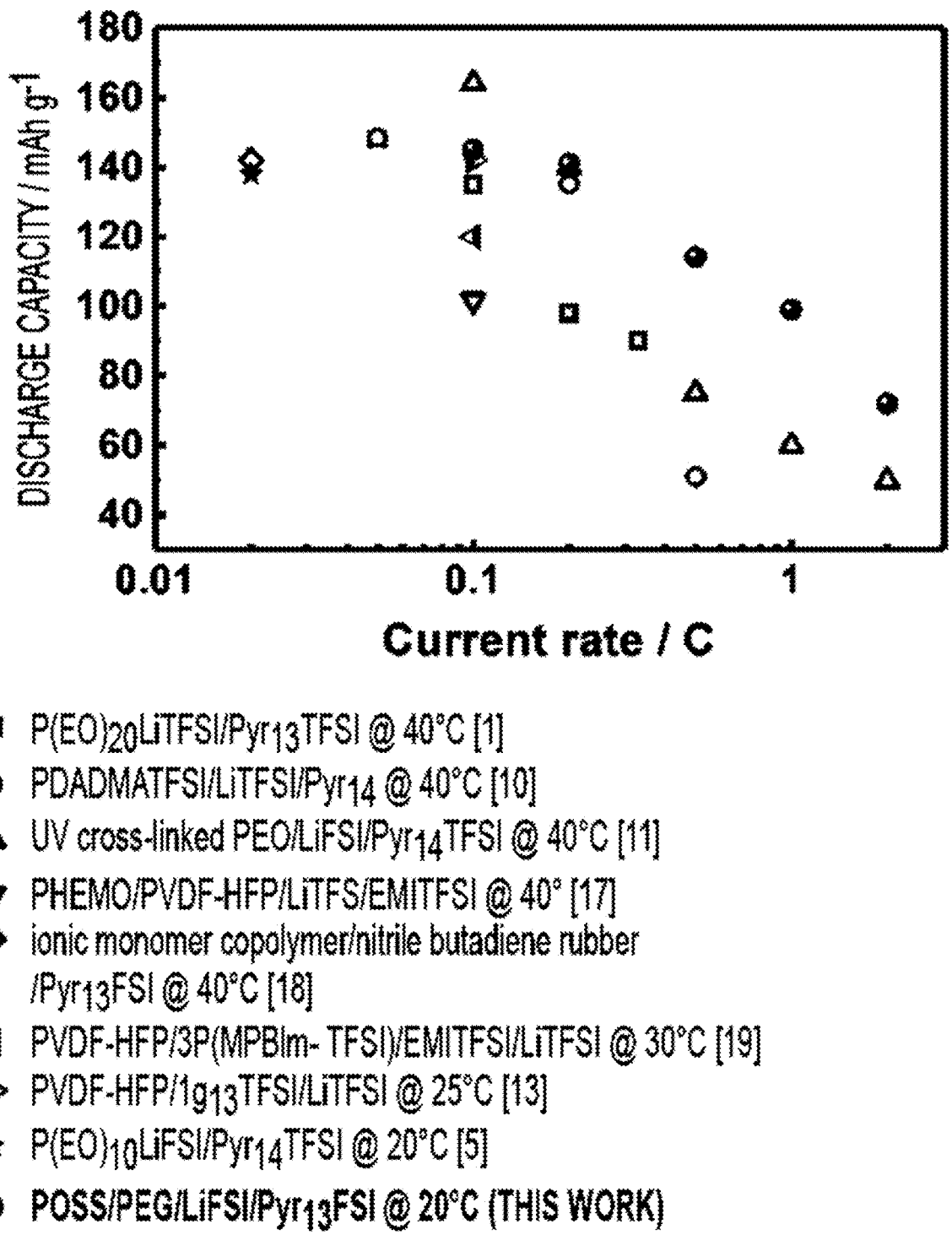
FIG. 18 shows a comparison of Li/LiFePO$_4$ battery performance for hybride network-RTIL GPE with state-of-art ionic liquid-based GPEs.

The lithium anode and GPE surface morphology after the battery test were investigated with SEM. As shown in FIGS. 8A-8D and FIG. 14, for the three lithium anodes after testing at different temperatures, the surfaces are uniform and there are no visible lithium dendrites. As the temperature increases, the lithium surface morphology becomes slightly smoother, which may be due to the more rapidly formed SEI layer and the faster repair of the defects on the SEI surface at higher temperature.[55, 56] Compared with the pristine one (FIG. 1C, the GPE surface after testing (FIG. 15) became slightly rougher, which can be attributed to the formation of SEI between the GPE and the lithium anode. The composition of the cycled GPE surface was investigated using XPS (FIG. 16). Besides the GPE components, there is a small amount of SEI components including ROCO$_2$Li, Li$_2$CO$_3$, Li$_2$O, LiOH, LiF, Li$_2$SO$_3$, Li$_2$S$_2$ and Li$_2$S, which is consistent with the XPS results for the lithium surface (FIG. 6A-6J). Compared with other reported IL-based GPEs (FIG. 17, FIG. 18 and Table 3), hybrid network-IL GPEs prepared of the present invention show superior lithium plating-stripping behavior and battery performance at room temperature, even surpassing most reported performances obtained at 40° C. or higher temperatures. This superior performance can be ascribed to the high ionic conductivity and excellent lithium electrodeposition stability.

Figure 19A:
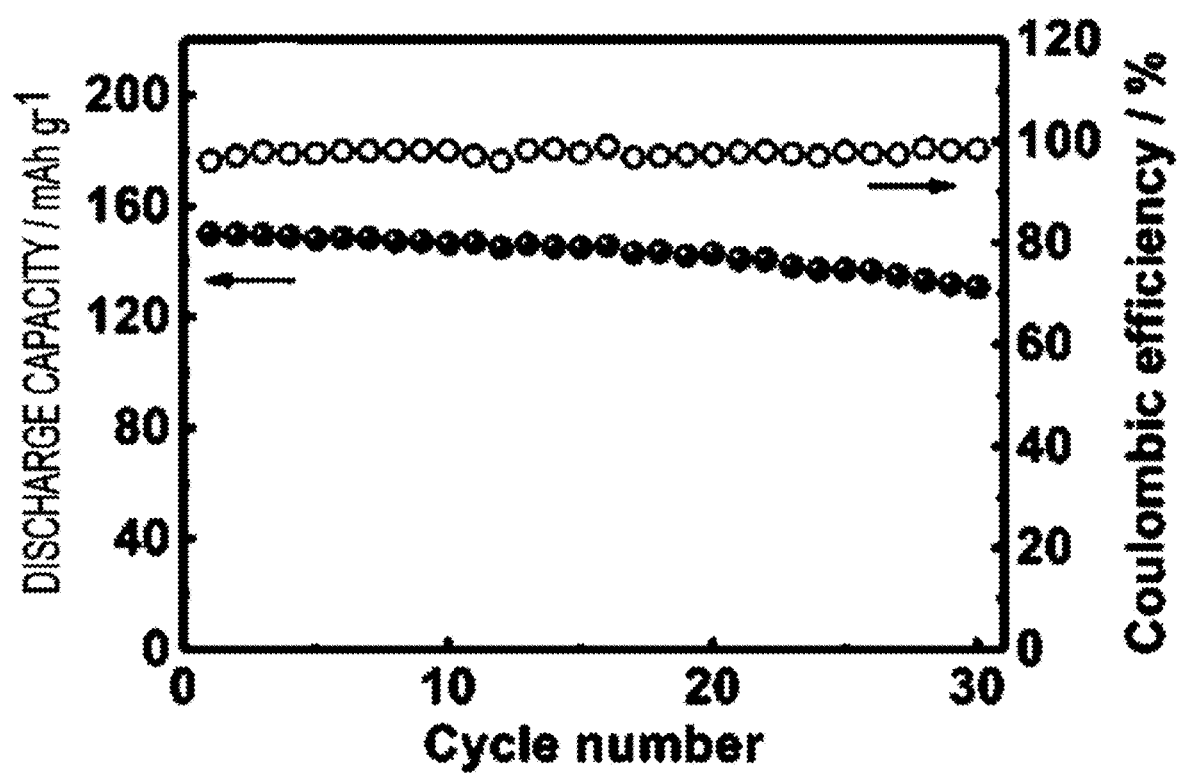
FIG. 19A shows the discharge capacity and Coulombic efficiency for Li/GPE/LiNi$_{0.6}$Mn$_{0.2}$Co$_{0.2}$O$_2$ batteries at 40° C. with a current density of 20 mA g$^{-1}$.
Figure 19B:
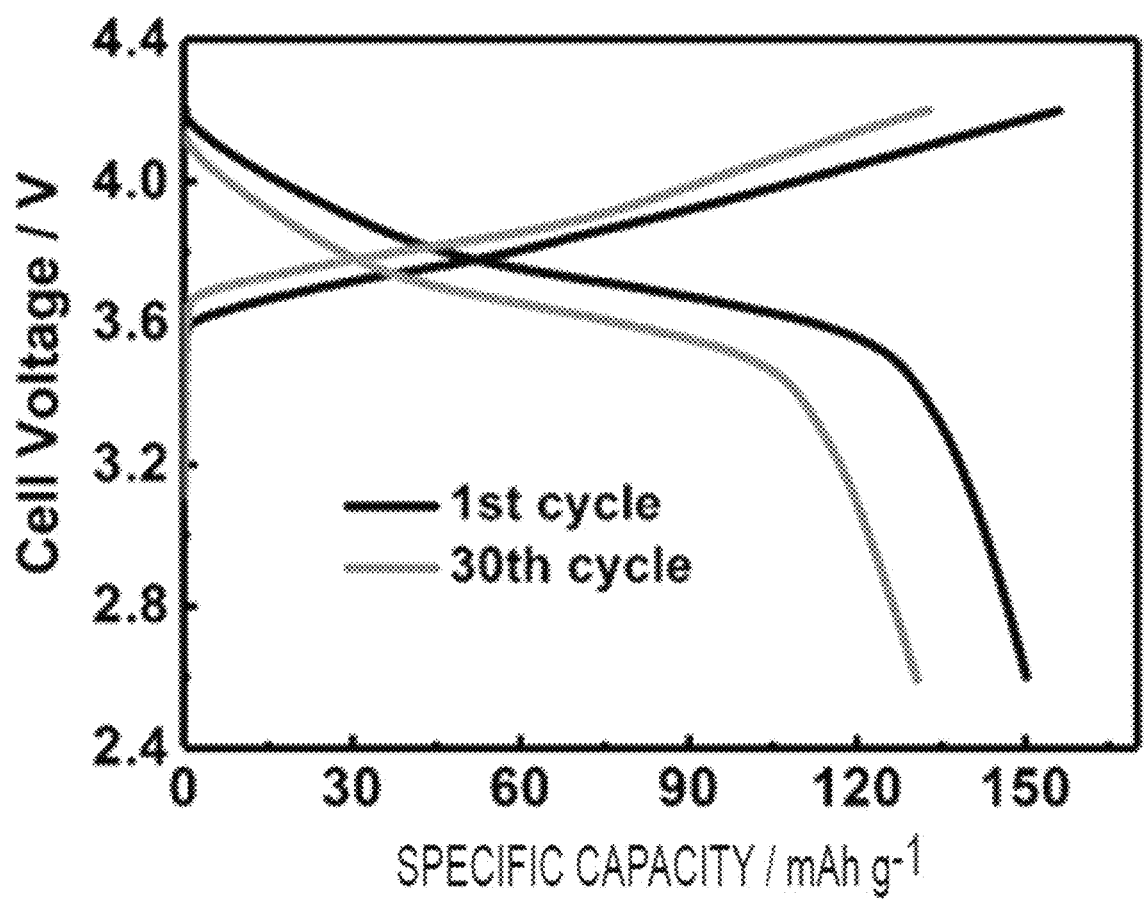
FIG. 19B shows the charge-discharge profiles for Li/GPE/ LiNi$_{0.6}$Mn$_{0.2}$Co$_{0.2}$O$_2$ batteries at 40° C. with a current density of 20 mA g$^{-1}$.

Since the GPE shows a superior electrochemical stability of higher than 5.3 V (vs. Li/Li$^+$) (FIG. 4B, the application of the GPE in high-energy-density LMBs was also evaluated using the high voltage cathode LiNi$_{0.6}$Mn$_{0.2}$Co$_{0.2}$O$_2$. As shown in FIG. 19, Li/LiNi$_{0.6}$Mn$_{0.2}$Co$_{0.2}$O$_2$ batteries with the GPE show successful cycling with a capacity retention of 87% after 30 cycles and an average Coulombic efficiency of about 98%, confirming their potential applicability in high-energy-density LMBs.

RTIL Pyr$_{13}$FSI was introduced in POSS-PEG hybrid network to synthesize a series of GPEs with controlled network structure. Mechanical and electrochemical properties of the GPEs were tuned by adjusting the polymer network mesh size and RTIL contents. The prepared GPEs exhibited an ionic conductivity over 1 mS cm$^{-1}$ at 20° C., excellent electrochemical stability, thermal stability and high flame resistance, which provides enhanced safety for LMBs. Galvanostatic cycling tests of symmetrical lithium cells showed that the GPEs exhibited superior lithium dendrite growth resistance even at 1 mA cm$^{-2}$, which can be attributed to the mechanical strength provided by the hybrid network structure and the lithium compatible Pyr$_{13}$FSI. For a current density of 0.1 mA cm$^{-2}$ with the areal capacity of 0.1 mAh cm$^{-2}$, the cycling life of symmetrical lithium cells was determined by the ionic conductivity of the GPE and SEI layer. When the areal capacity was increased to 0.3 mAh cm$^{-2}$, the cycling life was affected by the combination of the mechanical strength and conductivity of the GPEs and the GPE/Li interface. By employing the high-conducting, thermostable GPE, the operating temperature range of LMBs was significantly broadened, with a stable discharge capacity of over 80 mAh g$^{-1}$ at 0° C. and 160.6, 151.3 and 134.8 mAh g$^{-1}$ at 90° C. under 0.2C, 0.5C and 1C rates for Li/LiFePO$_4$ batteries. Meanwhile, the Li/LiFePO$_4$ batteries delivered stable discharge capacities of 145, 141.4, 113.7, 99.0 and 72.0 mA h g$^{-1}$ at 20° C. under current rates of 0.1 C, 0.2 C, 0.5 C, 1 C and 2 C, respectively. Li/LiNi$_{0.6}$Mn$_{0.2}$Co$_{0.2}$O$_2$ batteries with the GPE also exhibited stable cycling. These results demonstrate that the hybrid network-RTIL GPE system is promising for designing next generation higher performance LMBs suitable for operation in a wider range of application temperatures.

The newly developed GPEs show an ionic conductivity higher than 1 mS cm$^{-1}$ at room temperature, which is among the highest values for ionic liquid-based GPEs and sufficiently high for lithium metal battery applications. They are also flame-retardant and show excellent thermal and electrochemical stability as well as ultra-stability with lithium metal anode. Symmetrical lithium cells with the GPEs exhibit a stable cycling over 6800 h at a current density of 0.1 mA cm$^{-2}$ and stable lithium stripping-plating at 1 mA cm$^{-2}$, the highest current density reported for ionic liquid-based GPEs. Moreover, Li/LiFePO$_4$ batteries with the obtained GPEs exhibit desirable cycling stability and rate performance over a wide temperature range from 0° C. to 90° C., further suggesting that this new hybrid-network/ionic liquid GPE system has great potential for practical applications in next generation LMBs.

EXAMPLES

Materials: PSS-octa[(3-glycidyloxypropyl)dimethylsiloxy] substituted (POSS), poly(ethylene glycol)diamine (number average molar mass, M$_n$=2000 g mol$^{-1}$, PEG2k, and M$_n$=6000 g mol$^{-1}$, PEG6k) and tetrahydrofuran (THF) were purchased from Aldrich. Lithium bis(fluorosulfonyl) imide (LiF SI) and N-methyl-N-propylpyrrolidinium bis (fluorosulfonyl)imide (Pyr$_{13}$FSI) were purchased from TCI. LiFePO$_4$ and SUPER P® were provided by MTI Corporation. LiNi$_{0.6}$Mn$_{0.2}$Co$_{0.2}$O$_2$ was kindly provided by Prof. Junjie Niu of University of Wisconsin-Milwaukee. Lithium foil was obtained from Alfa Aesar. All materials were used as received.

Preparation of hybrid network-RTIL GPE membranes: Hybrid network-RTIL GPEs and corresponding SPEs were prepared according to the procedure described in previous work.[9] For SPE samples (denoted as nPEGm, in which n is the PEG/POSS molar ratio, and m is the PEG molecular weight), LiFSI was added with AN EO/Li$^+$ mole ratio of 16. For THE hybrid network-RTIL GPE samples (denoted as nPEGm-x, in which x is the Li-IL weight percentage), the composition was a combination of nPEGm SPE and 0.6 mol kg$^{-1}$ LiFSI in Pyr$_{13}$FSI (Li-IL) with different weight ratios.

Measurements: A Thermo Scientific Nicolet™ iS50 FTIR spectrometer was used to collect Fourier transform infrared spectroscopy (FTIR) spectra. The mechanical properties of the samples were tested with an Instron 3365 tensile tester at a speed of 10 mm min$^{-1}$. A TA Q2000 differential scanning calorimeter (DSC) was employed under a nitrogen atmosphere with a heating/cooling rate of 10° C. min$^{-1}$. The thermograms during the second heating scan were recorded. Thermal gravimetric analysis (TGA, Perkin Elmer TGA 7) scans were carried out under a nitrogen atmosphere with a heating rate of 20° C. min$^{-1}$. AC impedance spectroscopy measurements were used to investigate the ionic conductivity (σ) with the following equation:

$$\sigma = \frac{L}{R_b S} \quad (2)$$

L, $R_b$ and S are the thickness, bulk ohmic resistance and effective area of the membranes, respectively. Linear sweep voltammetry (LSV) was performed with a scan rate of 1 mV s$^{-1}$ using stainless steel and a lithium foil as the working and reference/counter electrode, respectively. Chronoamperometry and AC impedance spectroscopy measurements were used to test lithium ion transference number ($t_{Li+}$) with a 10 mV polarization voltage. The initial current $I_0$, the steady-state current $I_s$, the initial and steady-state interfacial resistances, $R_0$ and $R_s$ were recorded to calculate $t_{Li+}$ with the following equation $$t_{Li+} = \frac{I_s}{I_0} \frac{\Delta V - I_0 R_0}{\Delta V - I_s R_s} \quad (3)$$

Galvanostatic cycling tests of Li|GPE|Li symmetric cells were carried out using an Arbin battery tester at 20° C. with repeated three-hour or one-hour charge/discharge cycling. The thickness of the GPE membranes was about 200 μm. X-ray photoelectron spectroscopy (XPS) measurements were conducted with a VersaProbe 5000 (Physical Electronics). C1s at 284.8 eV was used to calibrate the binding energies of the spectra.

LiFePO$_4$/LiNi$_{0.6}$Mn$_{0.2}$Co$_{0.2}$O$_2$ electrodes were fabricated according to the previous work[9, 32] with a composition of 60/32/8 (wt. %) of active material/2PEG6k-60/SUPER P® and the active material loading was 1.5-2.5 mg cm$^{-2}$. The GPE precursor solution was cast onto the prepared electrodes and treated using the above-described GPE preparation procedure to obtain an intimate electrode/electrolyte interface. Li/LiFePO$_4$ and Li/LiNi$_{0.6}$Mn$_{0.2}$Co$_{0.2}$O$_2$ coin cells were assembled by contacting a GPE coated electrode and a lithium foil. A nominal capacity of 170 mAh g$^{-1}$ was used to determine the current rate for the Li/LiFePO$_4$ batteries, and the potential windows were 4.0-2.5 V for 0° C. and 20° C., and 3.8-2.5V for 90° C. For Li/LiNi$_{0.6}$Mn$_{0.2}$Co$_{0.2}$O$_2$ batteries, the current density was 20 mA g$^{-1}$, the potential window was 4.2-2.6 V, and the batteries were pre-cycled at 80° C. for two cycles before further testing.

REFERENCES

[1] C.-X. Zu, H. Li, Energy Environ. Sci., 4 (2011) 2614-2624.
[2] L. Grande, E. Paillard, J. Hassoun, J.-B. Park, Y.-J. Lee, Y.-K. Sun, S. Passerini, B. Scrosati, Adv. Mater., 27 (2015) 784-800.
[3] P. G. Bruce, S. A. Freunberger, L. J. Hardwick, J.-M. Tarascon, Nat. Mater., 11(2012) 19-29.
[4] F. Leng, C. M. Tan, M. Pecht, Sci. Rep., 5 (2015) 12967.
[5] P. Yan, J. Zheng, J. Liu, B. Wang, X. Cheng, Y. Zhang, X. Sun, C. Wang, J.-G. Zhang, Nat. Energy, 3 (2018) 600-605.
[6] H.-G. Jung, M. W. Jang, J. Hassoun, Y.-K. Sun, B. Scrosati, Nat. Commun., 2 (2011) 516.
[7] V. Etacheri, R. Marom, R. Elazari, G. Salitra, D. Aurbach, Energy Environ. Sci., 4 (2011) 3243-3262.
[8] L. Fan, S. Wei, S. Li, Q. Li, Y. Lu, Adv. Energy Mater., 8 (2018) 1702657.
[9] Q. Pan, D. M. Smith, H. Qi, S. Wang, C. Y. Li, Adv. Mater., 27 (2015) 5995-6001.
[10] R. Khurana, J. L. Schaefer, L. A. Archer, G. W. Coates, J. Am. Chem. Soc., 136 (2014) 7395-7402.
[11] X. Li, Y. Zheng, Q. Pan, C. Y. Li, ACS Appl Mater Interfaces, 11 (2019) 34904-34912.
[12] C. Sun, J. Liu, Y. Gong, D. P. Wilkinson, J. Zhang, Nano Energy, 33 (2017) 363-386.
[13] J. B. Goodenough, Y. Kim, Chem. Mater., 22 (2010) 587-603.
[14] Y. Zheng, Q. Pan, M. Clites, B. W. Byles, E. Pomerantseva, C. Y. Li, Adv. Energy Mater., 8 (2018) 1801885.
[15] K. Xu, Chem. Rev., 114 (2014) 11503-11618.
[16] M. Armand, F. Endres, D. R. MacFarlane, H. Ohno, B. Scrosati, Nat. Mater., 8 (2009) 621-629.
[17] J.-H. Shin, W. A. Henderson, S. Passerini, Electrochem. Commun., 5 (2003) 1016-1020.
[18] G. B. Appetecchi, G. T. Kim, M. Montanino, M. Carewska, R. Marcilla, D. Mecerreyes, I. De Meatza, J. Power Sources, 195 (2010) 3668-3675.
[19] G. T. Kim, G. B. Appetecchi, M. Carewska, M. Joost, A. Balducci, M. Winter, S. Passerini, J. Power Sources, 195 (2010) 6130-6137.
[20] M. Watanabe, S.-I. Yamada, K. Sanui, N. Ogata, J. Chem. Soc., Chem. Commun., (1993) 929-931.
[21] A. Noda, M. Watanabe, Electrochim Acta, 45 (2000) 1265-1270.
[22] J.-H. Shin, W. A. Henderson, S. Passerini, J. Electrochem. Soc., 152 (2005) A978-A983.
[23] J.-H. Shin, W. A. Henderson, S. Scaccia, P. P. Prosini, S. Passerini, J. Power Sources, 156 (2006) 560-566.
[24] J Kalhoff, G. G. Eshetu, D. Bresser, S. Passerini, ChemSusChem, 8 (2015) 2154-2175.
[25] T. E. Sutto, J. Electrochem. Soc., 154 (2007) P101-P107.
[26] P. Raghavan, X. Zhao, J. Manuel, G. S. Chauhan, J.-H. Ahn, H.-S. Ryu, H.-J. Ahn, K.-W. Kim, C Nah, Electrochim Acta, 55 (2010) 1347-1354.
[27] M. Que, Y. Tong, G. Wei, K. Yuan, J. Wei, Y. Jiang, H. Zhu, Y. Chen, J. Mater. Chem. A, 4 (2016) 14132-14140.
[28] D. M. Tigelaar, M. A. B. Meador, W. R. Bennett, Macromolecules, 40 (2007) 4159-4164.
[29] S. Liu, N. Imanishi, T. Zhang, A. Hirano, Y. Takeda, O. Yamamoto, J. Yang, J. Electrochem. Soc., 157 (2010) A1092-A1098.
[30] A. S. Fisher, M. B. Khalid, M. Widstrom, P. Kofinas, J. Power Sources, 196 (2011) 9767-9773.
[31] A. S. Fisher, M. B. Khalid, M. Widstrom, P. Kofinas, J. Electrochem. Soc., 159 (2012) A592-A597.
[32] Q. Pan, D. Barbash, D. M. Smith, H. Qi, S. E. Gleeson, C. Y. Li, Adv. Energy Mater., 7 (2017) 1701231.
[33] H. Matsumoto, H. Sakaebe, K. Tatsumi, M. Kikuta, E. Ishiko, M. Kono, J. Power Sources, 160 (2006) 1308-1313.
[34] J. Saint, A. S. Best, A. F. Hollenkamp, J. Kerr, J.-H. Shin, M. M. Doeff, J. Electrochem. Soc., 155 (2008) A172-A180.
[35] J. Salminen, N. Papaiconomou, R. A. Kumar, J.-M. Lee, J. Kerr, J. Newman, J. M. Prausnitz, Fluid Phase Equilib., 261 (2007) 421-426.
[36] A. I. Bhatt, A. S. Best, J. Huang, A. F. Hollenkamp, J. Electrochem. Soc., 157 (2010) A66-A74.
[37] H.-B. Han, S.-S. Zhou, D.-J. Zhang, S.-W. Feng, L.-F. Li, K. Liu, W.-F. Feng, J. Nie, H. Li, X.-J. Huang, M. Armand, Z.-B. Zhou, J. Power Sources, 196 (2011) 3623-3632.

[38] L. Grande, J. von Zamory, S. L. Koch, J. Kalhoff, E. Paillard, S. Passerini, ACS Appl. Mater. Interfaces, 7 (2015) 5950-5958.
[39] A. Budi, A. Basile, G. Opletal, A. F. Hollenkamp, A. S. Best, R. J. Rees, A. I. Bhatt, A. P. O'Mullane, S. P. Russo, J. Phys. Chem. C, 116 (2012) 19789-19797.
[40] Q. Zhou, W. A. Henderson, G. B. Appetecchi, M. Montanino, S. Passerini, J. Phys. Chem. B, 112 (2008) 13577-13580.
[41] B. Wunderlich, Thermal Analysis of Polymeric Materials, Springer Science & Business Media, 2005.
[42] W. Huang, Q. Pan, H. Qi, X. Li, Y. Tu, C. Y. Li, Polymer, 128 (2017) 188-199.
[43] X. Li, S. Cheng, Y. Zheng, C. Y. Li, Mol. Syst. Des. Eng., 4 (2019) 793-803.
[44] X. Li, Z. Zhang, S. Li, K. Yang, L. Yang, J. Mater. Chem. A, 5 (2017) 21362-21369.
[45] X. Li, S. Li, Z. Zhang, J. Huang, L. Yang, S.-i. Hirano, J. Mater. Chem. A, 4 (2016) 13822-13829.
[46] H. Wang, N. Imanishi, A. Hirano, Y. Takeda, O. Yamamoto, J. Power Sources, 219 (2012) 22-28.
[47] K. A. Murugesamoorthi, J. R. Owen, Br. Polym. J., 20 (1988) 227-231.
[48] R. Bouchet, S. Lascaud, M. Rosso, J. Electrochem. Soc., 150 (2003) A1385-A1389.
[49] P. C. Bruce, F. Krok, Electrochim Acta, 33 (1988) 1669-1674.
[50] X. Wang, H. Zhu, Gaetan M. A. Girard, R. Yunis, D. R. MacFarlane, D. Mecerreyes, A. J. Bhattacharyya, P. C. Howlett, M. Forsyth, J. Mater. Chem. A, 5 (2017) 23844-23852.
[51] Y. Lu, Z. Tu, L. A. Archer, Nat. Mater., 13 (2014) 961-969.
[52] W. Li, H. Yao, K. Yan, G. Zheng, Z. Liang, Y.-M. Chiang, Y. Cui, Nat. Commun., 6 (2015) 7436.
[53] L. Suo, W. Xue, M. Gobet, S. G. Greenbaum, C. Wang, Y. Chen, W. Yang, Y. Li, J. Li, Proc. Natl. Acad. Sci., 115 (2018) 1156-1161.
[54] X. Li, Z. Zhang, S. Li, L. Yang, S.-i. Hirano, J. Power Sources, 307 (2016) 678-683.
[55] R. Mogi, M. Inaba, T. Abe, Z. Ogumi, J. Power Sources, 97-98 (2001) 265-268.
[56] Z. Li, J. Huang, B. Yann Liaw, V. Metzler, J. Zhang, J. Power Sources, 254 (2014) 168-182.
[57] J.-H. Shin, W. A. Henderson, S. Passerini, Electrochem. Commun., 5 (2003) 1016-1020.
[58] J.-H. Shin, W. A. Henderson, S. Passerini, J. Electrochem. Soc., 152 (2005) A978-A983.
[59] J.-H. Shin, W. A. Henderson, S. Passerini, Electrochem. Solid-State Lett., 8 (2005) A125-A127.
[60] J.-H. Shin, W. A. Henderson, S. Scaccia, P. P. Prosini, S. Passerini, J. Power Sources, 156 (2006) 560-566.
[61] J.-H. Shin, W. A. Henderson, C. Tizzani, S. Passerini, S.-S. Jeong, K.-W. Kim, J. Electrochem. Soc., 153 (2006) A1649-A1654.
[62] D. M. Tigelaar, M. A. B. Meador, W. R. Bennett, Macromolecules, 40 (2007) 4159-4164.
[63] T. E. Sutto, J. Electrochem. Soc., 154 (2007) P101-P107.
[64] E. H. Cha, S. A. Lim, J. H. Park, D. W. Kim, D R Macfarlane, J. Power Sources, 178 (2008) 779-782.
[65] P. Raghavan, X. Zhao, J. Manuel, G. S. Chauhan, J.-H. Ahn, H.-S. Ryu, H.-J. Ahn, K.-W. Kim, C Nah, Electrochim Acta, 55 (2010) 1347-1354.
[66] G. B. Appetecchi, G. T. Kim, M. Montanino, M. Carewska, R. Marcilla, D. Mecerreyes, I. De Meatza, J. Power Sources, 195 (2010) 3668-3675.
[67] G. T. Kim, G. B. Appetecchi, M. Carewska, M. Joost, A. Balducci, M. Winter, S. Passerini, J. Power Sources, 195 (2010) 6130-6137.
[68] S. Liu, N. Imanishi, T. Zhang, A. Hirano, Y. Takeda, O. Yamamoto, J. Yang, J. Electrochem. Soc., 157 (2010) A1092-A1098.
[69] M. Li, L. Yang, S. Fang, S. Dong, Y. Jin, S.-i. Hirano, K. Tachibana, J. Power Sources, 196 (2011) 6502-6506.
[70] S. Liu, H. Wang, N. Imanishi, T. Zhang, A. Hirano, Y. Takeda, O. Yamamoto, J. Yang, J. Power Sources, 196 (2011) 7681-7686.
[71] A. S. Fisher, M. B. Khalid, M. Widstrom, P. Kofinas, J. Power Sources, 196 (2011) 9767-9773.
[72] A. S. Fisher, M. B. Khalid, M. Widstrom, P. Kofinas, J. Electrochem. Soc., 159 (2012) A592-A597.
[73] T. Feng, F. Wu, C. Wu, X. Wang, G. Feng, H. Yang, Solid State Ionics, 221 (2012) 28-34.
[74] A. S. Shaplov, D. O. Ponkratov, P. S. Vlasov, E. I. Lozinskaya, L. V. Gumileva, C. Surcin, M. Morcrette, M. Armand, P.-H. Aubert, F. Vidal, Y. S. Vygodskii, J. Mater. Chem. A, 3 (2015) 2188-2198.
[75] M. Que, Y. Tong, G. Wei, K. Yuan, J. Wei, Y. Jiang, H. Zhu, Y. Chen, J. Mater. Chem. A, 4 (2016) 14132-14140.
[76] T. Blensdorf, A. Joenathan, M. Hunt, U. Werner-Zwanziger, B. D. Stein, W. E. Mahmoud, A. A. Al-Ghamdi, J. Carini, L. M. Bronstein, J. Mater. Chem. A, 5 (2017) 3493-3502.
[77] X. Wang, H. Zhu, Gaetan M. A. Girard, R. Yunis, D. R. MacFarlane, D. Mecerreyes, A. J. Bhattacharyya, P. C. Howlett, M. Forsyth, J. Mater. Chem. A, 5 (2017) 23844-23852.

What is claimed is:
1. A lithium gel polymer electrolyte composition comprising:
a crosslinked network formed by a cross-linking reaction comprising reacting an inorganic polyhedral oligomeric silsesquioxane with either:
a) a functionalized poly(ethylene glycol), or
b) a functionalized poly(ethylene oxide);
an ionic liquid that is N-methyl-N-propylpyrrolidinium bis(fluorosulfonyl)imide; and
one or more lithium salts.
2. The composition of claim 1, wherein the inorganic polyhedral oligomeric silsesquioxane has a structure:

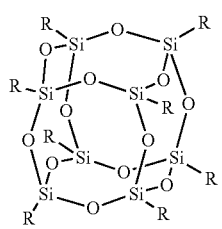

wherein each R group is independently selected from the group consisting of hydrogen, hydrocarbyl, reactive functional groups and functionalized hydrocarbyl groups and at least one of the R groups contains a functional group suitable for the cross-linking reaction.
3. The composition of claim 1, wherein the inorganic polyhedral oligomeric silsesquioxane is selected from the group consisting of octakis(3-glycidyloxypropyldimethylsiloxy)octasilsesquioxane, epoxycyclohexylethyl polysilsesquioxane, glycidyl polyhedral oligomeric silsesquioxane, and octa epoxycyclohexyldimethylsilyl polyhedral oligomeric silsesquioxane.

4. The composition of claim 1, wherein the ionic liquid is present in an amount of from about 1 wt. % to about 90 wt. %, based on a total weight of the lithium gel polymer electrolyte.

5. The composition of claim 1, wherein the lithium salt is present in an amount of from 50 wt % to about 90 wt %, based on a total weight of the lithium gel polymer electrolyte.

6. The composition of claim 1,
wherein the lithium salt is a lithium salt with an anion of bis(trifluoromethane)sulfonamide, hexafluoroarsenate, hexafluorophosphate, perchlorate, tetrafluoroborate, tris(pentafluoroethyl)trifluorophosphate, trifluoromethanesulfonate, bis(fluorosulfonyl)imide, cyclo-difluoromethane-1,1-bis(sulfonyl)imide, cyclo-hexafluoropropane-1,1-bis(sulfonyl)imide, bis(perfluoroethanesulfonyl)imide, bis(oxalate)borate, difluoro(oxalato)borate, tetracyanoborate, dicyanotriazolate, dicyano-trifluoromethyl-imidazole, and dicyano-pentafluoroethyl-imidazole.

7. The composition of claim 1, further comprising a solvent selected from the group consisting of tetrahydrofuran, diethyl ether, acetonitrile, ethyl acetate, and methyl acetate.

8. The composition of claim 1, wherein an overall ionic conductivity is 1 mS cm$^{-1}$ or greater at 20° C.

9. The composition of claim 1, wherein the polyhedral oligomeric silsesquioxane is reacted with the functionalized poly(ethylene oxide) and the functionalized poly(ethylene oxide) is an amine-terminated diterminal functionalized (polyethylene oxide).

10. The composition of claim 1, where the inorganic polyhedral oligomeric silsesquioxane is reacted with the functionalized poly(ethylene glycol) in a molar ratio of from about 1:100 to about 10:1.

11. The composition of claim 1, wherein the inorganic polyhedral oligomeric silsesquioxane is reacted with the functionalized poly(ethylene glycol) in a molar ratio of from about 1:4 to about 1:2.

12. The composition of claim 1, wherein the polyhedral oligomeric silsesquioxane is reacted with the functionalized poly(ethylene glycol) and the functionalized poly(ethylene glycol) is an amine-terminated diterminal functionalized poly(ethylene glycol).

13. The composition of claim 12, wherein the amine-terminated poly(ethylene glycol), has a number average molecular weight of from about 2,000 g/mol to about 6,000 g/mol.

14. A battery comprising the composition of claim 8 and a metal anode.

15. The battery of claim 14, wherein the metal anode is lithium.

16. The battery of claim 14, wherein the battery delivers stable cycling performance over 6800 hours at a current density of 0.1 mA cm$^{-2}$ and a charge-discharge cycle takes a total of about 3 hours, or
the battery delivers a stable cycling performance over at least 2250 charge-discharge steps, at a current density of 0.1 mA cm$^{-2}$, and
wherein stable cycling performance means having a repeatable voltage profile with no insubstantial noise attributable to pulverization, delamination, corrosion, or other side reactions and one cycle equals 1 charge plus 1 discharge.

17. A process of preparing the lithium gel polymer electrolyte of claim 1, comprising reacting the inorganic polyhedral oligomeric silsesquioxane with either:
a) the functionalized poly(ethylene glycol); or
b) the functionalized poly(ethylene oxide),
in a presence of the ionic liquid, and the one or more lithium salts to form the crosslinked network in a single-step polymerization process.

18. The process of claim 17, wherein the polyhedral oligomeric silsesquioxane is reacted with the functionalized poly(ethylene glycol) and the functionalized poly(ethylene glycol) is an amine-terminated diterminal functionalized poly(ethylene glycol).

19. The process of claim 17, wherein the polyhedral oligomeric silsesquioxane is reacted with the functionalized poly(ethylene oxide) and the functionalized poly(ethylene oxide) is an amine-terminated diterminal functionalized poly(ethylene oxide).

* * * * *